United States Patent
Kondo et al.

(10) Patent No.: US 7,590,397 B2
(45) Date of Patent: Sep. 15, 2009

(54) SIGNAL PROCESSING APPARATUS AND SIGNAL PROCESSING METHOD, PROGRAM, AND RECORDING MEDIUM

(75) Inventors: Tetsujiro Kondo, Tokyo (JP); Takashi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 10/936,772

(22) Filed: Sep. 9, 2004

(65) Prior Publication Data

US 2005/0101251 A1    May 12, 2005

(30) Foreign Application Priority Data

Sep. 10, 2003 (JP) ............... P2003-317710
Sep. 10, 2003 (JP) ............... P2003-317711

(51) Int. Cl.
    *H04B 1/18*    (2006.01)
(52) U.S. Cl. .............. 455/161.2; 455/164.2; 455/234.2; 455/84; 235/492; 235/380; 375/354
(58) Field of Classification Search ............. 455/161.2, 455/164.2, 234.2, 84; 235/492, 380; 375/354
    See application file for complete search history.

(56) References Cited

U.S. PATENT DOCUMENTS

| | | | |
|---|---|---|---|
| 5,754,948 A | | 5/1998 | Metze |
| 6,384,610 B1 * | | 5/2002 | Wilson ................. 324/663 |
| 6,480,699 B1 | | 11/2002 | Lovoi |
| 6,542,720 B1 | | 4/2003 | Tandy |
| 6,942,157 B2 * | | 9/2005 | Nozawa et al. ........... 235/492 |
| 7,106,339 B1 * | | 9/2006 | Grindstaff et al. ........ 345/543 |
| 7,263,148 B2 * | | 8/2007 | Chang et al. ............ 375/354 |
| 7,368,318 B2 * | | 5/2008 | Yamazaki .............. 438/106 |
| 2002/0183003 A1 | | 12/2002 | Chang et al. |
| 2003/0052176 A1 | | 3/2003 | Nozawa et al. |
| 2004/0019717 A1 | | 1/2004 | Kondo et al. |
| 2004/0073321 A1 | | 4/2004 | Kondo |
| 2005/0157668 A1 * | | 7/2005 | Sivan .................. 370/312 |
| 2006/0099738 A1 * | | 5/2006 | Yamazaki .............. 438/114 |
| 2006/0278716 A1 * | | 12/2006 | Fujita et al. ........... 235/472.02 |
| 2007/0028194 A1 * | | 2/2007 | Kurokawa ............. 716/1 |
| 2007/0147151 A1 * | | 6/2007 | Kurokawa ............. 365/205 |
| 2008/0002454 A1 * | | 1/2008 | Inoue et al. ............ 365/104 |

FOREIGN PATENT DOCUMENTS

| | | |
|---|---|---|
| JP | 01-101037 | 4/1989 |
| JP | 4-25046 | 1/1992 |

(Continued)

OTHER PUBLICATIONS

U.S. Appl. No. 10/936,772, filed Sep. 9, 2004, Kondo et al.

*Primary Examiner*—Matthew D Anderson
*Assistant Examiner*—Minh D Dao
(74) *Attorney, Agent, or Firm*—Oblon, Spivak, McClelland, Maier & Neustadt, P.C.

(57) ABSTRACT

An IC chip allows first communication for performing communication with all of the other IC chips, and second communication for performing communication while restricting communication parties. That is to say, the IC chip performs sending/receiving signals with a new communication arrangement with both the first communication which is a broadcasting arrangement and the second communication which is a communicatory arrangement. This enables the function upgrading electronic equipment to be performed easily, and enables flexible signal processing with a new communication arrangement.

28 Claims, 33 Drawing Sheets

FOREIGN PATENT DOCUMENTS

| | | |
|---|---|---|
| JP | 6-243117 | 9/1994 |
| JP | 7-129533 | 5/1995 |
| JP | 8-110854 | 4/1996 |
| JP | 08-288885 | 11/1996 |
| JP | 09-162842 | 6/1997 |
| JP | 10-173631 | 6/1998 |
| JP | 10-256478 | 9/1998 |
| JP | 10-285181 | 10/1998 |
| JP | 11-306299 | 5/1999 |
| JP | 2000-68904 | 3/2000 |
| JP | 2000-124406 | 4/2000 |
| JP | 2000-187538 | 7/2000 |
| JP | 2000-222065 | 8/2000 |
| JP | 2001-060130 | 3/2001 |
| JP | 2001-60130 | 3/2001 |
| JP | 2001-126037 | 5/2001 |
| JP | 2001-326328 | 11/2001 |
| JP | 2003-7958 | 1/2003 |
| JP | 2003-86698 | 3/2003 |
| WO | WO 99/33108 | 7/1999 |

\* cited by examiner

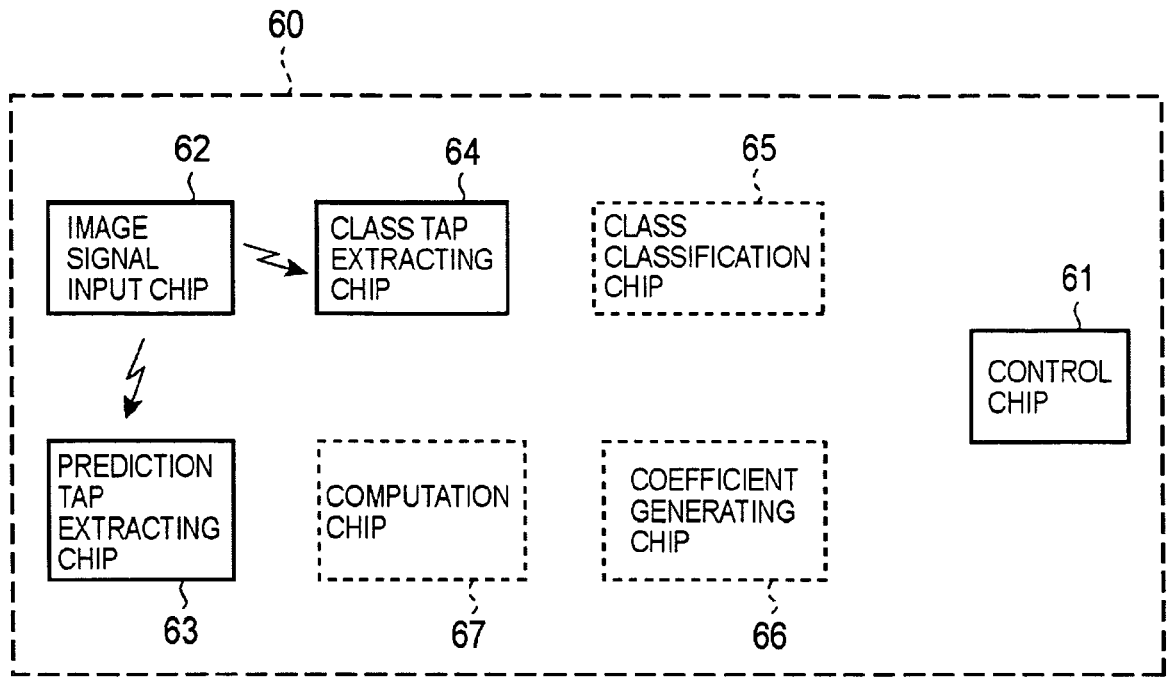
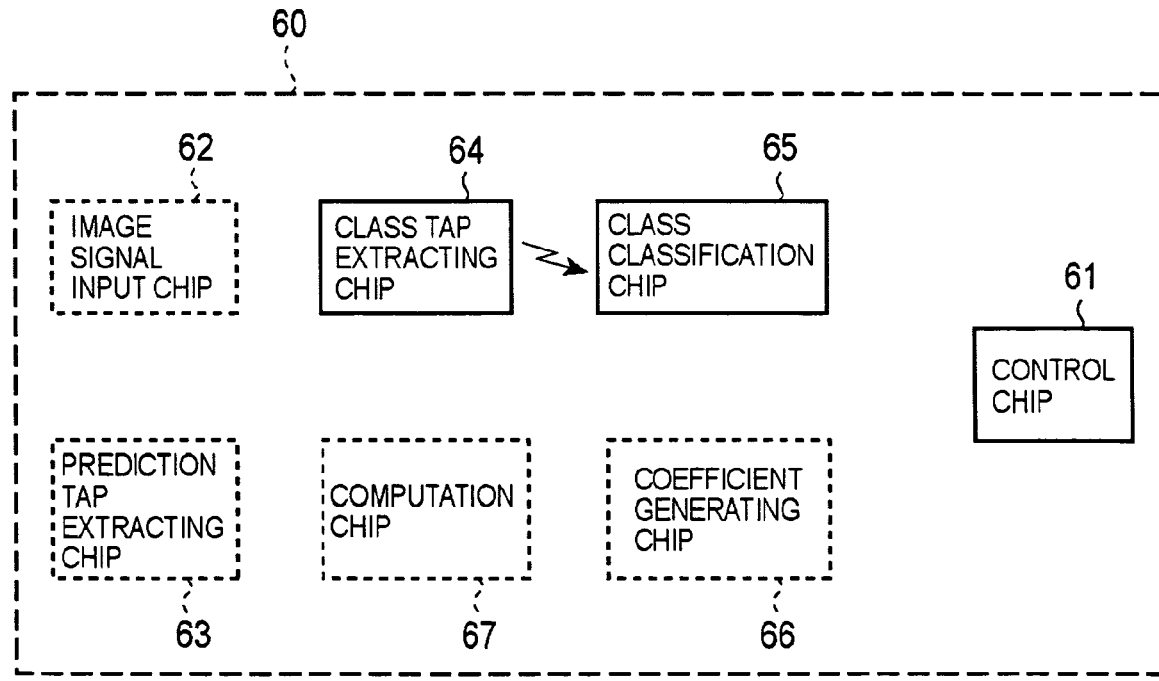

FIG. 27

| COMMAND CODE | CONTENTS OF SIGNAL PROCESSING (TASK INFORMATION) |
|---|---|
| 1 | .... |
| 2 | .... |
| 3 | .... |
| ⋮ | ⋮ |
| N | .... |

SIGNAL PROCESSING APPARATUS AND SIGNAL PROCESSING METHOD, PROGRAM, AND RECORDING MEDIUM

BACKGROUND OF THE INVENTION

1. Field of the Invention

The present invention relates to a signal processing apparatus and signal processing method, program, and a recording medium, and more specifically, relates to a signal processing apparatus and signal processing method, program, and a recording medium which enable the function of electronic equipment to be upgraded easily, and enable flexible signal processing by performing communication according to a new arrangement.

2. Description of the Related Art

Audio and video equipment, such as television receivers or disk devices, communication equipment such as phones or facsimile apparatuses, and further, computers and other equipment, often include circuit boards on which various semiconductor chips are mounted within the housing thereof, and the functions thereof as electronic equipment are provided by performing various processing in the semiconductor chips on the circuit boards.

Wiring for electrically connecting semiconductor chips is provided on the circuit boards, and the semiconductor chips exchange various signals via the wiring. In recent years, in accordance with increased performance and integration of semiconductor chips, wiring for connecting such semiconductor chips has become complex, so that circuit boards for performing wiring do not have enough space. Consequently, with circuit boards called multi-layer boards, wiring has been provided on multiple layers so as to connect semiconductor chips.

However, in the days ahead, it is anticipated that the performance and integration of semiconductor chips will become more advanced, and wiring become even more complex.

Accordingly, techniques wherein semiconductor chips exchange (send and receive) signals with wireless communication are disclosed in Japanese Unexamined Patent Application Publication No. 10-285181 and Japanese Unexamined Patent Application Publication No. 2001-060130. More specifically, techniques wherein specific semiconductor chips exchange (send and receive) signals by assigning certain frequency band or coding to multiple semiconductor chips respectively, and performing frequency division multiplex communication with the assigned frequency band or coding division multiplex communication with the assigned coding, are disclosed in Japanese Unexamined Patent Application Publication No. 10-285181 and Japanese Unexamined Patent Application Publication No. 2001-060130.

Also, technique wherein specific semiconductor chips exchange signals by performing coding division multiplex communication with a cable and the assigned coding, is disclosed in Japanese Unexamined Patent Application Publication No. 2000-187538.

With the techniques disclosed in these Publications, one-on-one communication is performed by specifying a communication party. Accordingly, for example, in the event that a certain semiconductor chip sends a command or signal to be subjected to signal processing to multiple semiconductor chips, the certain semiconductor chip must send the same signal many times corresponding to the number of the multiple semiconductor chips. In this case, it takes a great deal of time to exchange signals, and this might restrict available signal processing. Thus, restrictions in available signal processing result in restricting function upgrades of electronic equipment.

On the other hand, an arrangement wherein replacing or addition of a semiconductor chip could enable the function upgrades of electronic equipment would be convenient.

SUMMARY OF THE INVENTION

Accordingly, the present invention has been made in light of such a situation, the object of the present invention is to allow flexible signal processing by carrying out a new communication arrangement, and further, enable the function upgrade of electronic equipment to be performed easily.

According to a first aspect of the present invention, a signal processing apparatus comprises: three or more signal processing means, each of which include a communication unit for performing communication with the other signal processing means, and a signal processing unit for performing signal processing based on the signal received at the communication unit, wherein at least one of the three or more signal processing means perform first communication with all of the other signal processing means at the same time.

The communication unit of other signal processing means may receive a signal for controlling the signal processing, with the signal processing unit of the other signal processing means performing signal processing corresponding to the signal received at the communication unit.

The communication unit of the other signal processing means may receive a signal for controlling the signal processing, with, according to the signal received at the communication unit, a part of the other signal processing means enter a state for performing the signal processing, and the rest of the other signal processing means entering a state for nonperforming the signal processing, wherein the other signal processing means in the state for performing the signal processing perform signal processing corresponding to the signal received at the communication unit.

At least one of the three or more signal processing means may perform the first communication, and second communication for performing communication while restricting communication parties among the other signal processing means. The communication unit may performs communication with electromagnetic waves, and the communication unit may send or receive a signal for controlling the signal processing. Also, the communication unit may send or receive a signal to be subjected to the signal processing. Further, the signal processing means may be disposed within a housing shielding electromagnetic waves.

At least one of the three or more signal processing means may perform the first communication, and second communication for performing communication while restricting communication parties among the other signal processing means, wherein the second communication is performed while restricting communication parties with frequency division.

The three or more signal processing means may each further comprise an antenna, with the communication unit performing communication with electromagnetic waves via the antenna.

At least one of the three or more signal processing means may allow the first communication, and second communication for performing communication while restricting communication parties among the other signal processing means, wherein the second communication is performed while restricting communication parties with coding division.

At least one of the three or more signal processing means may allow the first communication, and second communication for performing communication while restricting communication parties among the other signal processing means, wherein the second communication is performed while restricting communication parties by adjustment of the polarization of the electromagnetic waves.

According to a second aspect of the present invention, a signal processing method comprises: a step of first communication for allowing at least one of three or more signal processing means including a communication unit for performing communication with the other signal processing means, and a signal processing unit for performing signal processing based on the signal received at the communication unit, to perform communication with all of the other signal processing means at the same time.

According to a third aspect of the present invention, a program comprises: a step of first communication for allowing at least one of three or more signal processing means including a communication unit for performing communication with the other signal processing means, and a signal processing unit for performing signal processing based on the signal received at the communication unit, to perform communication with all of the other signal processing means at the same time.

According to a fourth aspect of the present invention, a recording medium storing a program comprises: a step of first communication for allowing at least one of three or more signal processing means including a communication unit for performing communication with the other signal processing means, and a signal processing unit for performing signal processing based on the signal received at the communication unit, to perform communication with all of the other signal processing means at the same time.

At least one of the three or more signal processing means may include the step of first communication, and a step of second communication for performing communication while restricting communication parties among the other signal processing means.

According to a fifth aspect of the present invention, a signal processing apparatus comprises: a communication unit for performing communication with the other signal processing apparatus; and a signal processing unit for performing signal processing based on the signal received at the communication unit, wherein first communication is performed with all of the other signal processing apparatuses at the same time.

The first communication, and second communication for performing communication while restricting communication parties among the other signal processing apparatuses, may be allowed, with the second communication being performed while restricting communication parties with frequency division.

The signal processing apparatus may further comprise an antenna, with the communication unit performing communication with electromagnetic waves via the antenna. The communication unit may send or receive a signal for controlling the signal processing, and the communication unit may send or receive a signal to be subjected to the signal processing.

The first communication, and second communication for performing communication while restricting communication parties among the other signal processing apparatuses, may be allowed, with the second communication being performed while restricting communication parties with coding division.

The first communication, and second communication for performing communication while restricting communication parties among the other signal processing apparatuses, may be allowed, with the second communication being performed while restricting communication parties by adjustment of the polarization of the electromagnetic waves.

According to a sixth aspect of the present invention, a signal processing method comprises: a step of first communication for a signal processing apparatus including a communication unit for performing communication with the other signal processing apparatus, and a signal processing unit for performing signal processing based on the signal received at the communication unit, performing communication with all of the other signal processing apparatuses at the same time.

The step of first communication for performing communication with all of the other signal processing apparatuses at the same time, and a step of second communication for performing communication while restricting communication parties among the other signal processing apparatuses, may be allowed, with the step of second communication being performed while restricting communication parties with frequency division.

The step of first communication for performing communication with all of the other signal processing apparatuses at the same time, and a step of second communication for performing communication while restricting communication parties among the other signal processing apparatuses, may be allowed, with the step of second communication being performed while restricting communication parties with coding division.

The step of first communication for performing communication with all of the other signal processing apparatuses at the same time, and a step of second communication for performing communication while restricting communication parties among the other signal processing apparatuses, may be allowed, with the step of second communication being performed while restricting communication parties by adjustment of the polarization of the electromagnetic waves.

According to a seventh aspect of the present invention, a program comprises: a step of first communication for allowing a signal processing apparatus including a communication unit for performing communication with the other signal processing apparatus, and a signal processing unit for performing signal processing based on the signal received at the communication unit, to communicate with all of the other signal processing apparatuses at the same time.

According to an eighth aspect of the present invention, a recording medium storing a program comprises: a step of first communication for allowing a signal processing apparatus including a communication unit for performing communication with the other signal processing apparatus, and a signal processing unit for performing signal processing based on the signal received at the communication unit, to communicate with all of the other signal processing apparatuses at the same time.

According to a ninth aspect of the present invention, a signal processing apparatus comprises: first wireless communication means for performing first wireless communication; signal processing means for performing signal processing based on the signal received by the first wireless communication; second wireless communication means for performing second wireless communication with the other apparatuses; and control means for performing function control of the first wireless communication or the signal processing according to the signal received by the second wireless communication.

The first wireless communication means may send or receive an image signal or a signal necessary for the signal processing of the image signal. Also, the first wireless communication means may send or receive a signal for controlling the signal processing, and the first wireless communication means may send or receive a signal to be subjected to the signal processing.

The first wireless communication means may further comprise an antenna for performing the first wireless communication, with the control means disabling the functions of the first wireless communication by grounding the antenna. The first or second wireless communication means may each comprise an antenna for performing the first or second wireless communication.

The signal processing apparatus may be configured of a one-chip semiconductor, and may be disposed within a housing shielding electromagnetic waves.

The first wireless communication means may receive a signal to be subjected to signal processing by the signal processing means with the first wireless communication, and also send function information representing functions to be provided by the signal processing means to the other apparatuses.

The first wireless communication means may receive a signal to be subjected to signal processing by the signal processing means with the first wireless communication, and also receive a signal processing instruction signal for instructing signal processing to be performed by the signal processing means, with the signal processing means performing signal processing following the signal processing instruction signal.

The first wireless communication means may receive a signal to be subjected to signal processing by the signal processing means with the first wireless communication, and also send a signal to be subjected to signal processing by the other signal processing apparatuses to the other signal processing apparatuses.

According to a tenth aspect of the present invention, a signal processing method comprises: a signal processing step for performing signal processing based on the signal received by the first wireless communication of a signal processing apparatus including first wireless communication means for performing first wireless communication, and second wireless communication means for performing second wireless communication with other apparatuses; and a control step for performing function control of the first wireless communication or the signal processing according to the signal received by the second wireless communication.

According to another aspect of the present invention, a program comprises: a signal processing step for performing signal processing based on the signal received by the first wireless communication of a signal processing apparatus including first wireless communication means for performing first wireless communication, and second wireless communication means for performing second wireless communication with other apparatuses; and a control step for performing function control of the first wireless communication or the signal processing according to the signal received by the second wireless communication.

According to another aspect of the present invention, a recording medium storing a program comprises: a signal processing step for performing signal processing based on the signal received by the first wireless communication of a signal processing apparatus including first wireless communication means for performing first wireless communication, and second wireless communication means for performing second wireless communication with other apparatuses; and a control step for performing function control of the first wireless communication or the signal processing according to the signal received by the second wireless communication.

According to yet another aspect of the present invention, a signal processing apparatus comprises: wireless communication means for performing wireless communication; signal processing means for performing signal processing based on a part of the signal received by the wireless communication; and control means for performing function control of the signal processing according to another part of the signal received by the wireless communication.

The signal processing apparatus may be configured of a one-chip semiconductor, and may be disposed within a housing shielding electromagnetic waves.

The wireless communication means may further send a signal obtained by the signal processing with wireless communication.

According to yet another aspect of the present invention, a signal processing method for a signal processing apparatus having wireless communication means for performing wireless communication, comprises: a signal processing step for performing signal processing based on a part of the signal received by the wireless communication; and a control step for performing function control of the signal processing according to another part of the signal received by the wireless communication.

According to yet another aspect of the present invention, a program for a signal processing apparatus having wireless communication means for performing wireless communication, comprises: a signal processing step for performing signal processing based on a part of the signal received by the wireless communication; and a control step for performing function control of the signal processing according to another part of the signal received by the wireless communication.

According to yet another aspect of the present invention, a recording medium storing a program for a signal processing apparatus having wireless communication means for performing wireless communication, comprises: a signal processing step for performing signal processing based on a part of the signal received by the wireless communication; and a control step for performing function control of the signal processing according to another part of the signal received by the wireless communication.

According to yet another aspect of the present invention, a signal processing apparatus comprises: three or more signal processing units, each of which include a communication section for performing communication with the other signal processing means, and a signal processing section for performing signal processing based on the signal received at the communication section, wherein at least one of the three or more signal processing units performs first communication with all of the other signal processing units at the same time.

As described above, the present invention is based on a concept quite different from those of the prior art, wherein sending/receiving signals can be performed with a new communication arrangement made up of a first communication arrangement, which is a broadcasting arrangement, and a second communication arrangement, which is a communicatory arrangement, thereby enabling flexible signal processing with high-degree of freedom, and enabling the function upgrade of electronic equipment to be performed easily.

BRIEF DESCRIPTION OF THE DRAWINGS

FIG. 9 is an explanatory diagram describing control of respective operating modes of an image signal input chip 62 through a computation chip 67;

FIG. 10 is an explanatory diagram describing control of respective operating modes of the image signal input chip 62 through the computation chip 67;

FIG. 27 is a diagram illustrating a command LUT;

DESCRIPTION OF THE PREFERRED EMBODIMENTS

Figure 1:
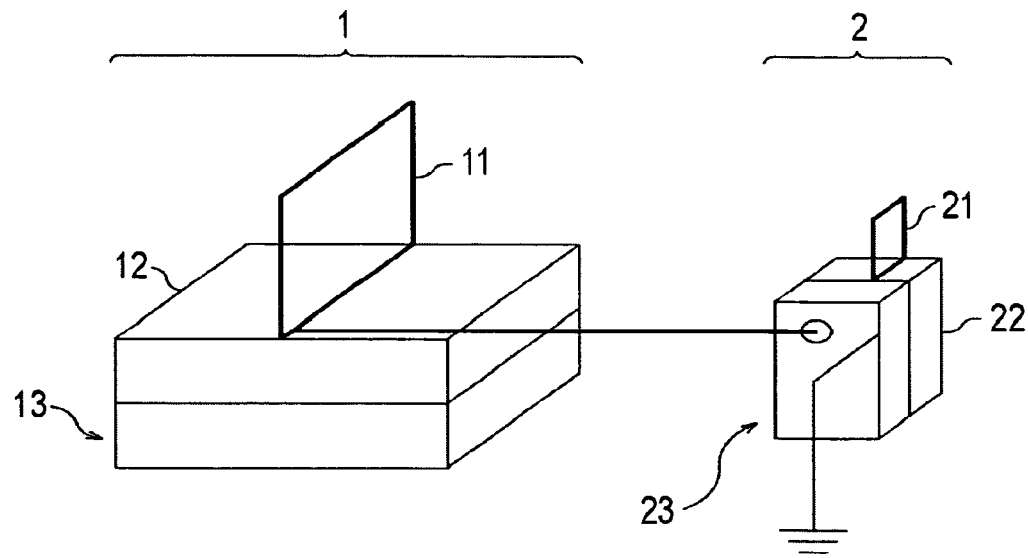
FIG. 1 is a perspective view illustrating a configuration example of an embodiment of a semiconductor chip to which the present invention is applied.

Description will be made regarding an embodiment of the present invention below with reference to the drawings. FIG. 1 is a perspective view schematically representing a semiconductor chip to which the present invention is applied. In FIG. 1, the semiconductor chip is made up of a signal processing block 1 and a control block 2, which are configured on a one-chip CMOS (Complementary Metal Oxide Semiconductor), for example. Accordingly, the semiconductor chip in FIG. 1 is a one-chip IC (Integrated Circuit) or an LSI (Large Scale Integration).

Figure 2:
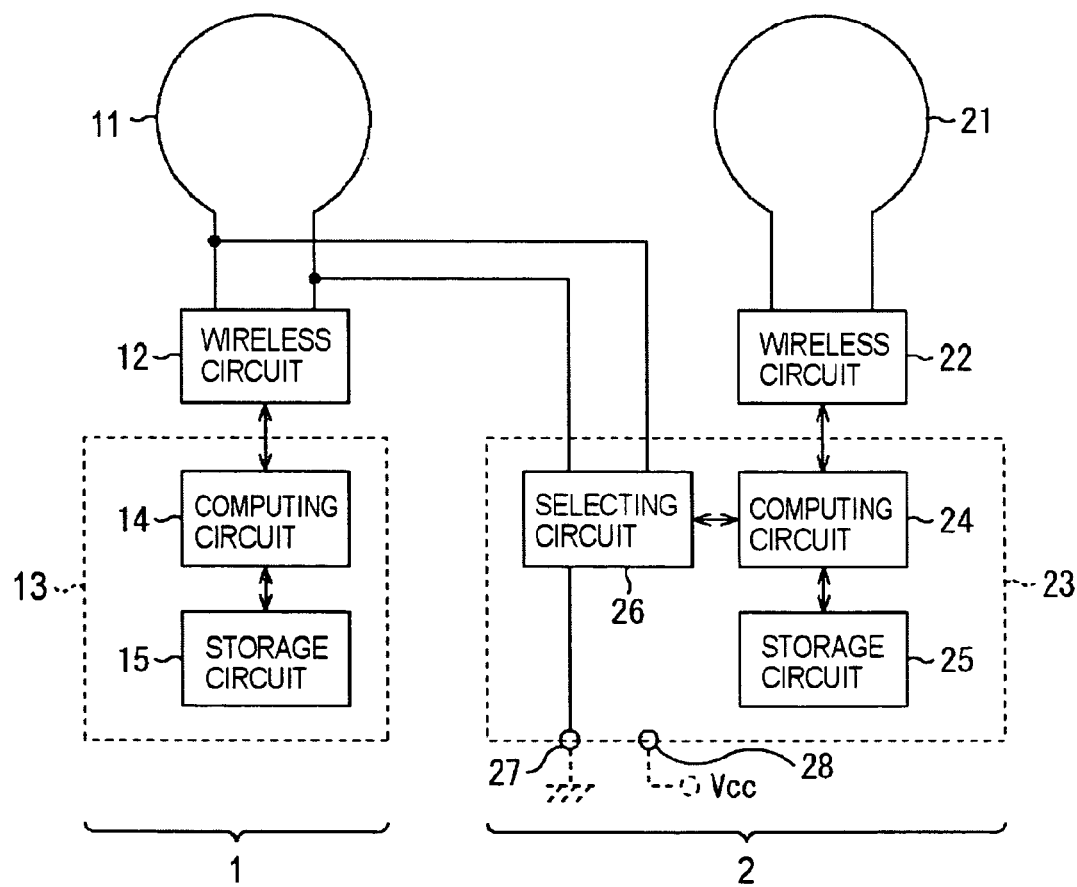
FIG. 2 is a block diagram illustrating a configuration example of an embodiment of a semiconductor chip to which the present invention is applied.

In the semiconductor chip in FIG. 1, signal terminals (pins) for inputting/outputting signals between the chip and outside of the chip can be provided. However, with the present embodiment, signal terminals are not provided on the semiconductor chip except for the power supply terminal and ground terminal for connecting to the power supply source and the ground (ground). In other words, a ground terminal 27 and power supply terminal 28 described later in FIG. 2 are only provided as a signal terminal on the semiconductor chip in FIG. 1.

The signal processing block 1 comprises an antenna 11, wireless circuit 12, and signal processing circuit 13. The antenna 11 receives a wireless signal (airwaves (electromagnetic waves)) sent from the outside, and supplies the corresponding received signal to the wireless circuit 12. Also the antenna 11 sends the signal supplied from the wireless circuit 12 as airwaves. Note that with the present embodiment, while the antenna 11 is a loop antenna, the shape of the antenna 11 is not restricted to any particular shape.

The wireless circuit 12 performs wireless communication with the outside thereof. That is to say, the wireless circuit 12 performs processing necessary for wireless communication such as modulation of carriers according to the signal supplied from the signal processing circuit 13, and supplies the modulated signal obtained as a result thereof to the antenna 11 so as to send the signal with airwaves. Also, the wireless circuit 12 subjects the signal (modulated signal) received from the outside thereof with airwaves to processing necessary for wireless communication such as demodulation, and supplies the signal (demodulated signal) obtained as a result thereof to the signal processing circuit 13.

The signal processing circuit 13 performs signal processing based on the signal supplied from the wireless circuit 12, and further, supplies the signal obtained as a result of the signal processing to the wireless circuit 12 as necessary.

The control block 2 comprises an antenna 21, wireless circuit 22, and signal processing circuit 23. The antenna 21 receives wireless signals transmitted externally, and supplies the corresponding received signal to the wireless circuit 22. Note that while the antenna 21 is a loop antenna with the embodiment in FIG. 1, the shape (type) of the antenna 21 is not restricted to a particular shape. Also, the antenna 21 can send the signal supplied from the wireless circuit 22 as airwaves as necessary.

While the antenna 11 is different from the antenna 21 in size in FIG. 1, this is because the antennas 11 and 21 receive (send) airwaves with different frequencies from each other. That is to say, the antennas 11 and 21 are designed so as to receive airwaves with different frequencies, thereby preventing the signal processing block 1 and control block 2 from interference, i.e., enabling the signal processing block 1 and control block 2 to perform independent wireless communication.

Note that while independent wireless communication can be performed by the signal processing block 1 and control block 2 performing wireless communication (frequency division method wireless communication) with airwaves having a different frequency band as described above, in addition, independent wireless communication can also be performed by the signal processing block 1 and control block 2 performing spread spectrum method wireless communication with different spread coding (PN (Pseudo-random Noise) coding), for example.

The wireless circuit 22 performs wireless communication with the outside thereof. That is to say, the wireless circuit 22 subjects the signal (modulated signal) received from the outside thereof with airwaves supplied from the antenna 21 to processing necessary for wireless communication such as demodulation, and supplies the signal (demodulated signal) obtained as a result thereof to the signal processing circuit 23. Note that the wireless circuit 22 subjects the signal supplied from the signal processing circuit 23 to processing necessary for wireless communication such as modulation of carriers as necessary, and supplies the demodulated signal obtained as a result thereof to the antenna 21 so as to send the signal with airwaves.

The signal processing circuit 23 controls the wireless communication with the wireless circuit 12 or the function of signal processing with the signal processing circuit 13 to be enabled or disabled according to the signal supplied from the wireless circuit 22.

FIG. 2 illustrates an electrical configuration example of the semiconductor chip in FIG. 1. The signal processing circuit 13 of the signal processing block 1 includes a computing circuit 14 and storage circuit 15.

The computing circuit 14 subjects the signal supplied from the wireless circuit 12 to predetermined signal processing, supplies the signal obtained as a result of the signal processing to the storage circuit 15, which stores the signal, or wireless circuit 12 so as to send the signal from the antenna 11 as airwaves. Also, the computing circuit 14 supplies the signal (data) stored in the storage circuit 15 to the wireless circuit 12 so as to send the signal from the antenna 11 as airwaves. The storage circuit 15 stores the signal and the like necessary for processing of the computing circuit 14.

Note that the computing circuit 14 is made up of a logic circuit such as a NAND gate, or other dedicated hardware, and predetermined signal processing can be performed by the dedicated hardware. Also, an arrangement may be made wherein the computing circuit 14 is made up of a processor (computer) capable of executing a program, and predetermined signal processing is performed by the processor executing the program.

In the case that the computing circuit 14 is made up of a processor, the program executed by the processor can be stored in the storage circuit 15 beforehand.

Alternatively, the program can be temporarily or eternally stored (recorded) in a removable recording medium such as a flexible disk, CD-ROM (Compact Disc Read Only Memory), MO (Magneto Optical) disk, DVD (Digital Versatile Disc), magnetic disk, semiconductor memory, and the like. Such a removable recording medium can be provided as so-called packaged software.

Note that the program may be transferred to a semiconductor chip from a download site via a satellite for Digital Satellite Broadcasting, or a network such as a LAN (Local Area Network) or the Internet. The semiconductor chip receives the program thus transferred at the antenna 11, and can install the program in the storage circuit 15 via the wireless circuit 12 and computing circuit 14.

With the present specification, processing steps for describing the program for causing the computing circuit 14 to perform various processing are not always performed sequentially following the order described in a later-described flowchart, and processing executed in parallel or individually (for example, parallel processing or processing with an object) is also included.

Also, the program may be processed by the one computing circuit 14, or may be processed separately by multiple computing circuits. Further, the program may be transferred to another computing circuit so as to execute the program.

The signal processing circuit 23 of the control block 2 includes a computing circuit 24 and storage circuit 25. The computing circuit 24 controls a selecting circuit 26 according to the signal supplied from the wireless circuit 22, and thus, controls the function of wireless communication by the wireless circuit 12 to be enabled or disabled. Note that while the computing circuit 24 controls the function of wireless communication to be enabled or disabled, the computing circuit 24 may control the function of a block so as to be enabled or disabled. The storage circuit 25 stores the signals and the like necessary for processing of the computing circuit 24.

Note that the computing circuit 24 is configured of dedicated hardware in the same way as the computing circuit 14, and signal processing for controlling the selecting circuit 26 can be performed. Also, the computing circuit 24 can execute the program to perform signal processing for controlling the selecting circuit 26. The program executed by the computing circuit 24 can be stored in the storage circuit 25 beforehand in the same way as the program executed by the computing circuit 14.

The selecting circuit 26 selects a connection state of both ends of the antenna 11 on a loop of the signal processing block 1, i.e., the selecting circuit 26 connects both ends of the antenna 11 to the ground terminal 27 so as to be grounded, or places both ends of the antenna in a high-impedance state.

In the case that both ends of the antenna 11 are connected to the ground terminal 27 in the selecting circuit 26 so as to be grounded, the potential of both ends of the antenna 11 is always equal to the ground potential, so that the antenna 11 cannot perform send or receive airwaves, and accordingly, the function of wireless communication with the wireless circuit 12 is disabled.

On the other hand, in the case that both ends of the antenna 11 are placed in a high-impedance state at the selecting circuit 26, a current flows (a voltage occurs) through the antenna 11, serving as the received signal corresponding to the received airwaves, and is supplied to the wireless circuit 12, and also, a current flows (a voltage occurs) serving as the signal output from the wireless circuit 12, and then airwaves corresponding to the signal are emitted. Accordingly, the antenna 11 can send and receive airwaves, so that the function of wireless communication with the wireless circuit 12 is enabled.

The ground terminal 27 and power supply terminal 28 are terminals exposing outside of the package of the semiconductor chip, which are connected to the ground GND and the power source Vcc respectively.

Note that while the ground terminal 27 and power supply terminal 28 are connected to blocks necessary for configuring the semiconductor chip, the connection lines thereof are omitted in the drawing so as to prevent the drawing from becoming complicated. Also, exchanging signals can be performed between the computing circuits 14 and 24 as necessary.

With the semiconductor chip thus configured, airwaves are received at the antenna 21, and the received signal corresponding to the airwaves are supplied to the computing circuit 24 via the wireless circuit 22. The computing circuit 24 controls the selecting circuit 26 according to the received signal supplied via the wireless circuit 22. The selecting circuit 26 connects both ends of the antenna 11 to the ground terminal 27, or places both ends of the antenna in a high-impedance state.

In a case wherein both ends of the antenna 11 are connected to the ground terminal 27 in the selecting circuit 26, as described above, the antenna 11 cannot send and receive airwaves, so that the function of wireless communication with the wireless circuit 12 is disabled. Accordingly, even if airwaves are received at the antenna 11, the signal processing circuit 13 does not perform any processing as to the signal corresponding to the airwaves. That is to say, in this case, the signal processing circuit 13 is placed in a state for performing no response as to the airwaves from the outside thereof.

On the other hand, in the case that both ends of the antenna 11 are placed in a high-impedance state by the selecting circuit 26, as described above, the received signal corresponding to the airwaves received at the antenna 11 is supplied to the wireless circuit 12, or the airwaves corresponding to the signal output from the wireless circuit 12 are emitted from the antenna 11, so that the function of wireless communication with the wireless circuit 12 is enabled. In this case, the received signal corresponding to the airwaves received at the antenna 11 are supplied to the signal processing circuit 13 via the wireless circuit 12, and the signal processing circuit 13 performs signal processing of the received signal. Further, the signal processing circuit 13 supplies the signals obtained as a result of signal processing to the antenna 11 via the wireless circuit 12 as necessary, so as to send the signals with airwaves.

Now, an operating mode of the semiconductor chip in a state wherein the signal processing circuit 13 does not perform any processing as to the signal corresponding to the airwaves from the outside thereof by the function of wireless communication with the wireless circuit 12 being disabled or the like, is called as a sleep mode. On the other hand, an operating mode of the semiconductor chip in a state wherein the signal processing circuit 13 can perform signal processing based on the signal corresponding to the airwaves from the outside thereof by the function of wireless communication with the wireless circuit 12 being enabled or the like, is called as an active mode.

Note that in the event that the semiconductor chip enters the sleep mode, the signal processing circuit 13 does not perform any processing as to the signal corresponding to the airwaves from the outside thereof, and this does not mean that the signal processing circuit 13 does not perform any signal processing. That is to say, even if the semiconductor chip is in the sleep mode, the signal processing circuit 13 can perform some signal processing by itself. However, an arrangement may be made wherein, in the sleep mode, the signal processing circuit 13 performs no processing.

Also, as described above, wireless communication with airwaves having a different frequency band is performed between the signal processing block 1 and control block 2 so as to prevent interference. Now, let us say that the airwaves of a frequency band wherein wireless communication is performed between the signal processing block 1 and control block 2 are airwaves for signal processing and airwaves for control. The control block 2 receives the airwaves for control from the outside thereof, and switches the function of wireless communication with the wireless circuit 12 to be enabled or disabled according to the received signal. In the case that the function of wireless communication with the wireless circuit 12 is enabled, i.e., in the case that the operating mode of the semiconductor chip is in the active mode, with the signal processing block 1, the antenna 11 receives the airwaves for signal processing, and supplies these to the signal processing circuit 13 via the wireless circuit 12. The signal processing circuit 13 subjects the signal corresponding to the airwaves for signal processing supplied via the wireless circuit 12 to signal processing, and further, and emits the signal obtained as a result of signal processing from the antenna 11 via the wireless circuit 12 as the airwaves for signal processing.

Figure 3:
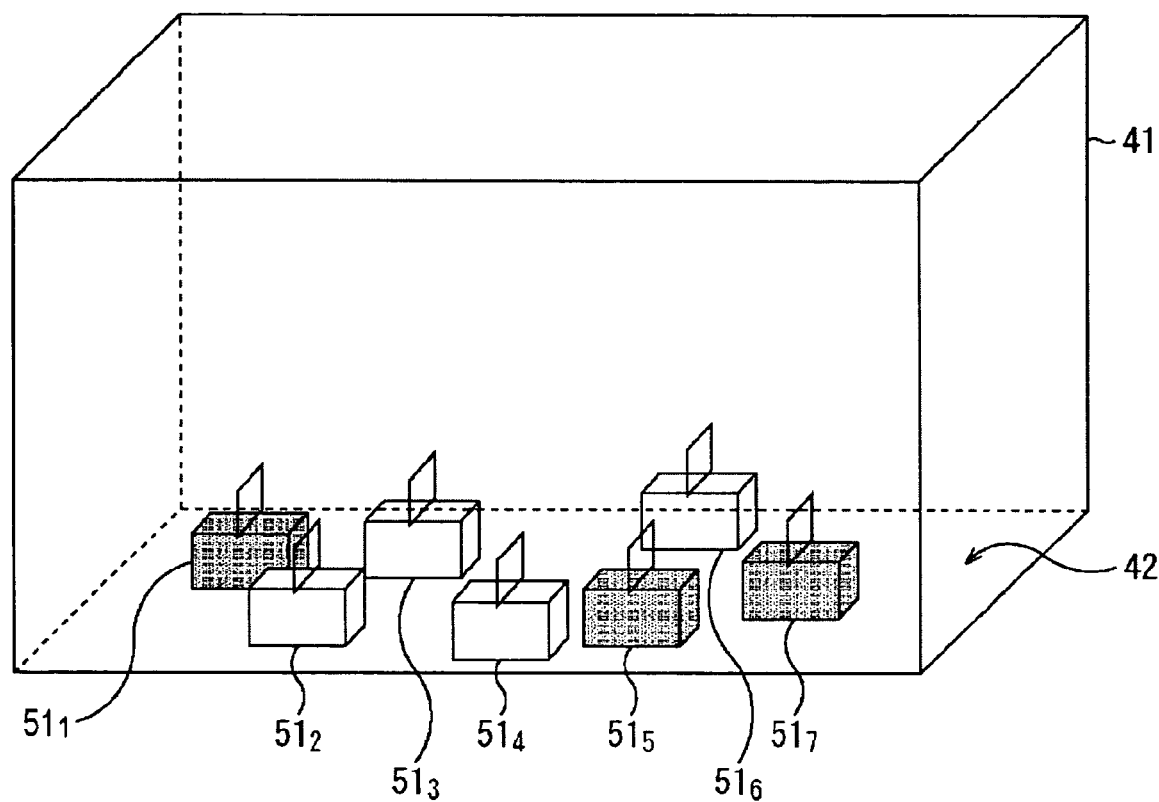
FIG. 3 is a perspective view illustrating a configuration example of an embodiment of a signal processing system to which the present invention is applied.

FIG. 3 is a perspective view illustrating an embodiment of a signal processing system to which the semiconductor chip in FIGS. 1 and 2 is applied. The signal processing system in FIG. 3 is configured wherein multiple chips are disposed within a shielded housing 41. In other words, the shielded housing 41 is a general-rectangular-solid-shaped housing with a hollow interior, of which the inside of the bottom is a contact face 42.

The shielded housing 41 shields electromagnetic waves. That is to say, the shielded housing 41 is configured such that a conductor is disposed so as to form a closed surface for example, the airwaves of the outside thereof are shielded so as not to enter, and also the airwaves of the inside thereof are shielded so as not to leak the outside thereof.

On the contact face 42, multiple sets of the ground terminal and power supply terminal (not shown in the drawing) are provided, and an IC chip $51_i$ (i=1, 2, and so on) is disposed.

The IC chip $51_i$ is configured as with the semiconductor chip described in FIGS. 1 and 2. Accordingly, the IC chip $51_i$ includes the ground terminal 27 and power supply terminal 28. The IC chip $51_i$ is disposed on the contact face 42 such that the ground terminal 27 and power supply terminal 28 thereof are connected to an arbitrary set of the ground terminal and power supply terminal on the contact face 42 respectively.

Accordingly, the IC chip $51_i$ can be mounted and detached easily since the ground terminal 27 and power supply terminal 28 are preferably disposed so as to connect to the ground terminal and power supply terminal on the contact face 42 respectively. Further, the IC chip $51_i$ can be disposed with a high degree of freedom on the contact face 42 since the terminals to be connected to the contact face 42 are only the two terminals of the ground terminal 27 and power supply terminal 28.

In FIG. 3, seven IC chips $51_1$ through $51_7$ are disposed on the contact face 42. Here, the shielded housing 41 and contact face 42 can be easily separated, the user can easily dispose the IC chips $51_1$ through $51_7$ on the contact face 42 in the separated state. Note that the shielded housing 41 can be configured such that one surface thereof can be easily opened and closed. In this case, the IC chips $51_1$ through $51_7$ can be easily disposed on the contact face 42 such that one surface of the shielded housing 41 capable of being opened and closed is reserved.

The IC chips $51_1$ through $51_7$ each provide a predetermined function by the signal processing circuit 13 performing predetermined signal processing. With the respective IC chips $51_1$ through $51_7$, the functions provided by the signal processing circuit 13 may be one function or multiple functions. Also, with the respective IC chips $51_1$ through $51_7$, the function information representing the functions provided by the signal processing circuit 13 are stored in the storage circuit 15 beforehand. Accordingly, the functions to be provided by the IC chip $51_i$ can be confirmed by referring to the function information stored in the storage circuit 15.

Now, in the case of selling the IC chip $51_i$ for example, the function manual, which describes the functions of the IC chip $51_i$, can be packed with the IC chip $51_i$. The functions to be realized with the IC chip $51_i$ and one or more other IC chips, and further, information such as a model number for identifying one or more other IC chips necessary for realizing the function, can be described in the function manual as well as the functions of the IC chip $51_i$.

With the signal processing system in FIG. 3, a predetermined function is provided by sending and receiving a signal to be required in the two or more IC chips of the seven IC chips $51_1$ through $51_7$ with the airwaves for signal processing and performing signal processing.

The IC chips of the seven IC chips $51_1$ through $51_7$, which perform signal processing, enter the active mode, and send and receive the signals to be subjected to the signal processing with the airwaves for signal processing. At this time, the IC chips of the seven IC chips $51_1$ through $51_7$, which do not perform signal processing, enter the sleep mode, and do not send and receive (cannot send and receive) the airwaves for signal processing. Accordingly, in this case, the certain IC chip sends the same signal to the other multiple IC chips at the same time, and the other multiple IC chips can receive the same signal at the same time. Further, the IC chip $51_i$, which does not perform signal processing, receives the airwaves for signal processing, and prevents unnecessary signal processing from being performed, and so forth. Note that FIG. 3 illustrates that the IC chips $51_1$, $51_5$, and $51_7$, which are shaded, are in the active mode, and the IC chips $51_2$, $51_3$, $51_4$, and $51_6$, which are not shaded, are in the sleep mode.

Now, as described above, only the IC chip $51_i$ which performs signal processing can receive the signal necessary for signal processing, or can send the signal obtained as a result of the signal processing as the airwaves for signal processing, by the operating mode of the IC chip $51_i$ being changed to the active mode or sleep mode. Accordingly, there is no need to synchronize between the certain IC chip $51_i$ and the other IC chips $51_j$ (j=1, 2, and so forth) so as to perform signal processing, and send or receive a signal. In other words, the certain IC chip $51_i$ and the other IC chips $51_j$ can operate asynchronously (without a clock for synchronization).

The IC chip $51_i$ further exchanges signals necessary for signal processing with wireless communication, so that upgrade such as increase/decrease of the number of signals to be exchanged with the other IC chips $51_j$, or variation of the signal (for example, the signal to be exchanged is changed from an audio signal having relatively few amount of data to an image signal having relatively much amount of data) can be easily handled.

Note that the shielded housing 41 shields electromagnetic waves as described above, and accordingly, the airwaves emitted by the IC chip $51_i$ disposed within the shielded housing 41 never leak to the outside of the shielded housing 41, so consequently, interference due to the airwaves sent or received by IC chips in another signal processing system existing outside thereof does not occur. Also, the airwaves sent or received by IC chips in another signal processing system existing outside thereof never enter inside of the shielded housing 41, so consequently, interference with the airwaves emitted by the IC chip $51_i$ within the shielded housing 41 does not occur. Accordingly, we may say that the signal processing system in which the IC chips $51_1$, $51_2$, and so forth are disposed within the shielded housing 41 is completely independent from the other signal processing systems having the same configuration.

However, the signal processing system in FIG. 3 may be configured such that the IC chips making up the signal processing system and the IC chips in another signal processing system can send and receive the airwaves for signal processing.

Next, with the signal processing system in FIG. 3, a certain IC chip $51_k$ (k=1, 2, and so on) can be easily disposed on the contact face 42, and further, signals can be sent and received with wireless communication (airwaves for signal processing) between the IC chip $51_k$ and the other IC chips $51_j$ disposed on the contact face 42. Accordingly, the user can easily modify the functions of the entire signal processing system by disposing a new IC chip $51_k$ on the contact face 42, replacing the IC chip $51_i$ disposed on the contact face 42 with another IC chip $51_k$, removing the IC chip $51_i$, or the like.

Briefly speaking, the user can add the function of the IC chip $51_k$ to the functions of the signal processing system by disposing a new IC chip $51_k$ on the contact face 42.

More specifically, with the signal processing system, in the case that the function as a decoder for MPEG streaming is provided by the IC chips $51_1$ through $51_7$ already disposed on the contact face 42 for example, upon an IC chip for providing the function as a filter for reducing block distortion as a result of decoding of MPEG streams being newly disposed, the signal processing system can decode the MPEG streams so as to reduce the block distortion as a result of the decoding.

In this case, with the signal processing system, the function to be provided by the IC chip newly disposed on the contact face 42 is added to the original functions. In other words, the functions of the signal processing system are modified (added) by the function provided by the IC chip newly disposed on the contact face 42.

Examples of modifying the functions of the signal processing system include a method for modifying the functions of the signal processing system according to the function to be provided by the IC chip newly disposed, and a method for modifying the entire signal processing system by the functions of the IC chips $51_1$ through $51_7$ already disposed on the contact face 42 changing according to the function to be provided by the IC chip newly disposed.

With the signal processing system, in the case that an IC chip is newly disposed on the contact face 42, the functions exceeding the functions obtained by simply adding the functions of the IC chips $51_1$ through $51_7$ already disposed on the contact face 42 with the function of the new IC chip can be provided.

That is to say, with the signal processing system, the entire signal processing system can be modified such that the functions of the IC chips $51_1$ through $51_7$ already disposed on the contact face 42 are changed according to the available function provided by the IC chip newly disposed, so as to speak, such that the IC chip newly disposed and the IC chips $51_1$ through $51_7$ already disposed collaborate on sharing signal processing.

As described above, in the case that collaboration on sharing signal processing is performed with the multiple IC chips disposed within the shielded housing 41, a large variety of functions can be modified.

Note that such a modification of the signal processing system can be performed in the case that an IC chip is removed from the contact face 42, in the case that an IC chip disposed on the contact face 42 is replaced with another IC chip, in the case that a modification occurs regarding an IC chip disposed on the contact face 42, as well as the case wherein an IC chip is newly disposed on the contact face 42.

Next, description will be made regarding the processing of the IC chips $51_1$ through $51_7$ making up the signal processing system in FIG. 3. Now, let us say that at least one of the IC chips $51_1$ through $51_7$ making up the signal processing system is an IC chip for controlling the entire system, and the IC chip is described as a control chip $51_C$ as appropriate, hereinafter. Also, of the IC chips $51_1$ through $51_7$, the chips controlled by the control chip $51_C$ is described as a slave chip $51_N$ as appropriate, hereinafter.

Figure 4:
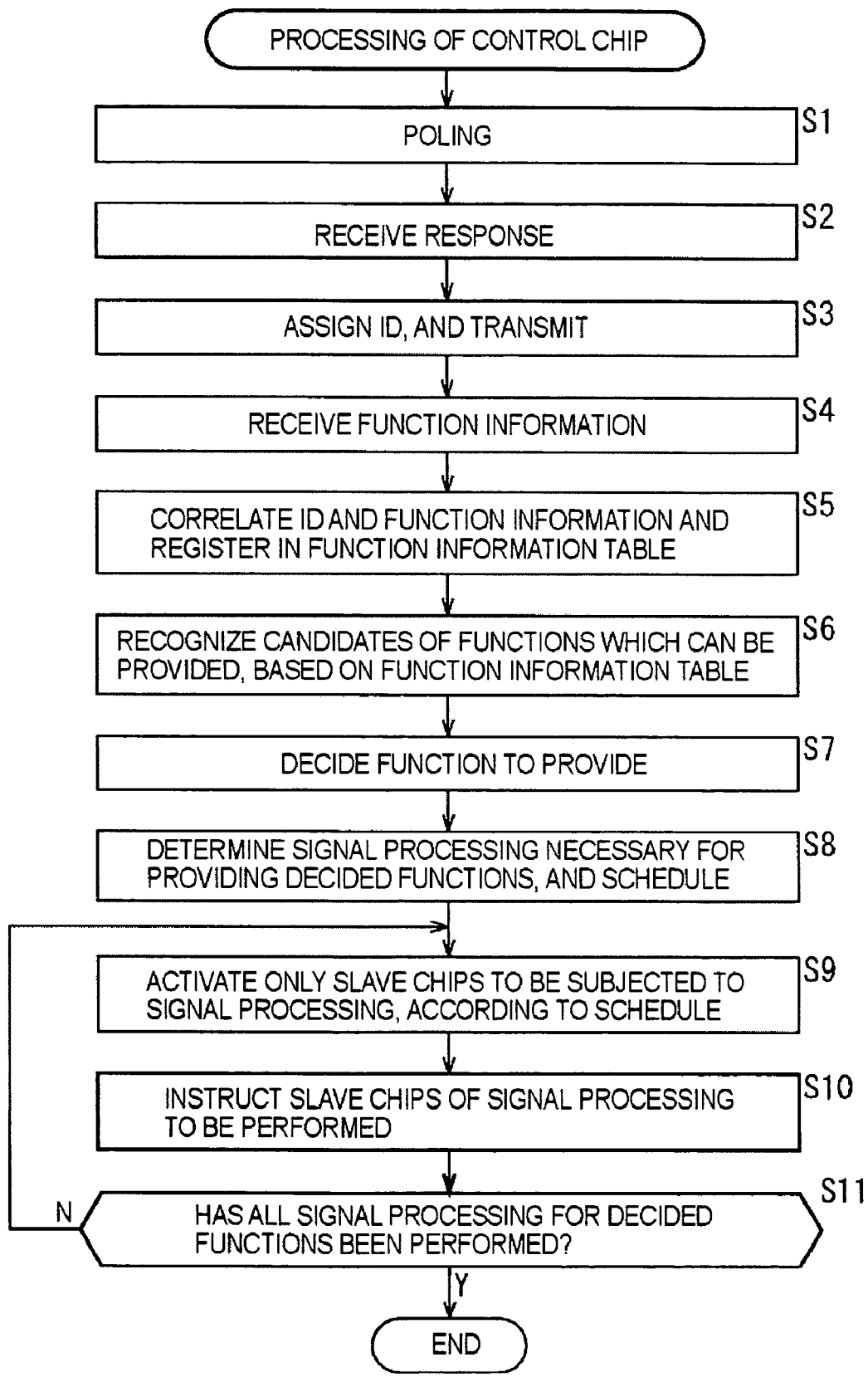
FIG. 4 is a flowchart describing the processing of a control chip $51_C$.

First, description will be made regarding the processing of the control chip $51_C$ with reference to the flowchart in FIG. 4. Note that the control chip $51_C$ starts the processing shown in the flowchart in FIG. 4 periodically or occasionally, or according to the instructions from the user or the occurrence of another event, for example. Also, let us say that the control chip $51_C$ and slave chips $51_N$ are in the active mode.

First, the signal processing block 1 of the control chip $51_C$ performs poling in Step S1. That is to say, the signal processing block 1 of the control chip $51_C$ sends a signal for requesting a response to comprehend the slave chips $51_N$ existing within the shielded housing 41 in Step S1. More specifically, with the signal processing block 1 of the control chip $51_C$, the computing circuit 14 controls the wireless circuit 12 to emit the airwaves for signal processing from the antenna 11. Subsequently, the signal processing block 1 of the control chip $51_C$ awaits until the response as to the poling in Step S1 is sent from the slave chip $51_N$ with the airwaves for signal processing, the flow proceeds to Step S2 from Step S, and the signal processing block 1 of the control chip $51_C$ receives the response.

The response sent from the slave chip $51_N$ includes a random number generated by the slave chip $51_N$, and the control chip $51_C$ identifies the slave chip $51_N$ with the random number included in the response.

In the case that the responses are sent from the multiple slave chips $51_N$, interference occurs, and in some cases, the control chip $51_C$ cannot properly receive the respective responses from the multiple slave chips $51_N$. Consequently, the slave chips $51_N$ generates a random number separately from the random number included in the response for example, and sends the response following awaiting delay time of period correspond to the random number after receiving the poling from the control chip $51_C$. This prevents interference due to the multiple slave chips $51_N$ sending a response simultaneously.

Nevertheless, in some cases, in the event that interference due to the responses being sent from the multiple slave chips $51_N$ simultaneously occurs, in this case, i.e., in the case that the control chip $51_C$ cannot receive the respective responses from the multiple slave chips $51_N$ normally, the control chip $51_C$ redoes the processing from Step S1, for example.

Also, even if the respective responses from the multiple slave chips $51_N$ are properly received, in some cases, two or more responses from the multiple slave chips $51_N$ include the same random number. In this case, the control chip $51_C$ cannot identify the two or more slave chips $51_N$ which sent the same random number, and accordingly, as described above, the control chip $51_C$ redoes the processing from Step S1.

In the case that the computing circuit 14 of the control chip $51_C$ can receive the respective responses from the multiple slave chips $51_N$ normally, the random numbers included in the respective responses have no the same value, the flow proceeds to Step S3 from Step S2, the control chip $51_C$ identifies the multiple slave chips $51_N$ respectively by the random numbers included in the respective responses from the multiple slave chips $51_N$, and assigns a unique ID (Identification) such as sequential integer values as to the multiple slave chips $51_N$ respectively, for example. Furthermore, in Step S3, the computing circuit 14 of the control chip $51_C$ correlates the ID assigned to the slave chip $51_N$ with the random number included in the response received from the slave chip $51_N$, and sends the ID with the airwaves for signal processing.

Here, the slave chip $51_N$ receives the airwaves for signal processing from the control chip $51_C$, and recognizes the ID correlated with the random number included in the response which the slave chip $51_N$ itself sent as the ID assigned to the slave chip $51_N$ itself.

Note that examples of the ID of the slave chip $51_N$ may include the random number included in the response which the slave chip $51_N$ sends as it is as well as the sequential integer values.

Also, examples of the ID of the slave chip $51_N$ may include unique information such as the manufacturing number attached to the slave chip $51_N$. However, in the case that the manufacturing number attached to the slave chip $51_N$ is employed as the ID of the slave chip $51_N$, the number of digits of the manufacturing number sometimes varies according to the manufactured number of the slave chip $51_N$.

Subsequently, the computing circuit 14 of the control chip $51_C$ awaits until the function information of the slave chip $51_N$ is sent from the slave chip $51_N$ to which the ID is assigned, the flow proceeds to Step S4 from Step S3, and the computing circuit 14 of the control chip $51_C$ acquires the function information corresponding to the multiple slave chips $51_N$ by receiving the function information. The function information is information representing the function that each chip can proceed.

In other words, upon the slave chip $51_N$ receiving the ID from the control chip $51_C$, the slave chip $51_N$ reads out the function information stored in the storage circuit 15, correlates the function information with the ID assigned to the slave chip $51_N$ itself, and sends the function information with the airwaves for signal processing. In Step S4, the control chip $51_C$ receives the function information sent from the slave chip $51_N$ with the airwaves for signal processing, thereby recognizing the function of the slave chip $51_N$ (of the signal processing circuit 13).

Here, in the event that the function information is sent from the multiple slave chips $51_N$ at the same time, interference occurs, and in some cases, the control chip $51_C$ cannot properly receive the function information from the multiple slave chips $51_N$ respectively. Consequently, the slave chips $51_N$ generates a random number as with the case of sending a response, and sends the function information following awaiting delay time of period corresponding to the random number after receiving the ID from the control chip $51_C$, thereby preventing the interference due to the multiple slave chips $51_N$ sending the function information simultaneously.

Nevertheless, in some cases, in the event that interference due to the multiple slave chips $51_N$ sending the function information simultaneously occurs, i.e., in the case that the control chip $51_C$ cannot properly receive the function information from the multiple slave chips $51_N$ respectively, the control chip $51_C$ sends a request for resending the function information with the airwaves for signal processing, awaits until the slave chip $51_N$ sends the function information in response to the request, and then repeats the processing from Step S4, for example.

Also, the control chip $51_C$ handles the IDs assigned to the multiple slave chips $51_N$ in Step S3 (hereinafter, referred to as assigned ID as appropriate) sequentially as the ID of interest, and can send the mode signal for making only the slave chips $51_N$ having the ID of interest the active mode, and also making the other slave chips $51_N$ the sleep mode with the airwaves for signal processing. Furthermore, the control chip $51_C$ sends a request for sending the function information to the slave chips $51_N$ having the ID of interest with the airwaves for signal processing, and receives the function information sent from the slave chip $51_N$ with the airwaves for signal processing in response to the request. In this case, the function information is sent from only the slave chips $51_N$ having the ID of interest in the active mode, thereby preventing the interference due to the multiple slave chips $51_N$ sending the function information simultaneously.

Upon the computing circuit 14 of the control chip $51_C$ receiving all of the function information from the multiple slave chips $51_N$ to which the IDs are assigned, the flow proceeds to Step S5 from Step S4, the computing circuit 14 of the control chip $51_C$ creates a function information table in which the function information corresponding to the multiple slave chips $51_N$ is correlated with the ID of the slave chip $51_N$ thereof, registers (stores) this in the storage circuit 15, and then the flow proceeds to Step S6. Note that the function information table is removed from the storage circuit 15 when completing the series of the processing shown in FIG. 4.

In Step S6, the computing circuit 14 of the control chip $51_C$ recognizes the function information corresponding to each of the multiple slave chips $51_N$ making up the signal processing system from the function information described in the function information table, and further, recognizes the candidates of the functions available as the entire signal processing system from these functions, and the flow proceeds to Step S7. In Step S7, the computing circuit 14 of the control chip $51_C$ determines the function available in reality from the candidates of the functions available as the entire signal processing system.

That is to say, the control chip $51_C$ displays the candidates of the functions available as the entire signal processing system on a monitor (not shown) provided on the shielded housing 41, and the user selects one of the candidates thereof, for example. Subsequently, the control chip $51_C$ determines the candidate selected by the user as the function available in reality. Also, in the case that the candidates of the functions available as the entire signal processing system are only one, the control chip $51_C$ determines the candidate as the function to be provided in reality.

Now, as described above, the function manual, which describes the functions of the IC chip $51_i$, the functions to be realized with the IC chip $51_i$ and other one or more IC chips, and further, information such as a model number for identifying other one or more IC chips necessary for realizing the function, can be packed with the IC chip $51_i$ for shipping. The user can obtain the desired function by referring to the function manual, preparing for the IC chips necessary for the desired function, and disposing the IC chips on the contact face 42.

In Step S7, upon the function to be provided in reality being determined, the flow proceeds to Step S8, the computing circuit 14 of the control chip $51_C$ identifies the signal processing to be performed by the multiple slave chips $51_N$ making up the signal processing system, and further, performs scheduling for making a schedule for performing these signal processing.

That is to say, the control chip $51_C$ identifies one or more set of signal processing necessary for providing the determined function, and further, assigns the slave chip $51_N$ to perform each of the signal processing (the slave chip $51_N$ to be able to perform the signal processing) while referring to the function information table. Subsequently, the control chip $51_C$ performs scheduling for making a schedule on which the order (timing) of the signal processing performed by the slave chip $51_N$ assigned with signal processing is described.

Subsequently, the flow proceeds to Step S9 from Step S8, where the control chip $51_C$ recognizes one or more slave chips $51_N$ to perform the signal processing now following the schedule (scheduling results) obtained by scheduling in Step S8, and sends the mode signal for making the one or more slave chips $51_N$ the active mode, and also making the other slave chips $51_N$ the sleep mode. In other words, the computing circuit 24 of the control chip $51_C$ supplies the mode signal for correlating the IDs of the one or more slave chips $51_N$ with the command to be the active mode (hereinafter, referred to as an active command as appropriate), and also correlating the IDs of the other slave chips $51_N$ with the command to be the sleep mode (hereinafter, referred to as a sleep command as appropriate) to the wireless circuit 22 so as to emit the mode signal as the airwaves for control from the antenna 21.

The mode signal by means of the airwaves for control is received at all of the multiple slave chips $51_N$ making up the signal processing system. Subsequently, of the multiple slave chips $51_N$ making up the signal processing system, only the one or more slave chips $51_N$ to perform the signal processing now enter the active mode, and the other slave chips $51_N$ enter the sleep mode, according to the mode signal.

Subsequently, the flow proceeds to Step S10 from Step S9, the control chip $51_C$ sends the signal processing instruction signal representing the signal processing to be performed by the respective one or more slave chips $51_N$ in the active mode now with the airwaves for signal processing, and the flow proceeds to Step S11.

Here, the signal processing instruction signal can include, for example, the ID of the slave chip $51_N$, and the code representing the signal processing to be performed by the slave chip $51_N$, i.e., the code for controlling the signal processing of the slave chip $51_N$, which are correlated. In this case, the slave chip $51_N$ which has received the signal processing instruction signal can recognize the signal processing to be performed by itself from the code correlated with the ID of itself.

In Step S11, the computing circuit 14 of the control chip $51_C$ determines whether or not the signal processing necessary for providing the determined function is completed by referring to the schedule. In the event that the signal processing is not completed, the flow returns to Step S9, and subsequently, the same processing is repeated.

On the other hand, in Step S11, in the event that determination is made that the signal processing necessary for providing the determined function is completed, the control chip $51_C$ ends the processing.

Figure 5:
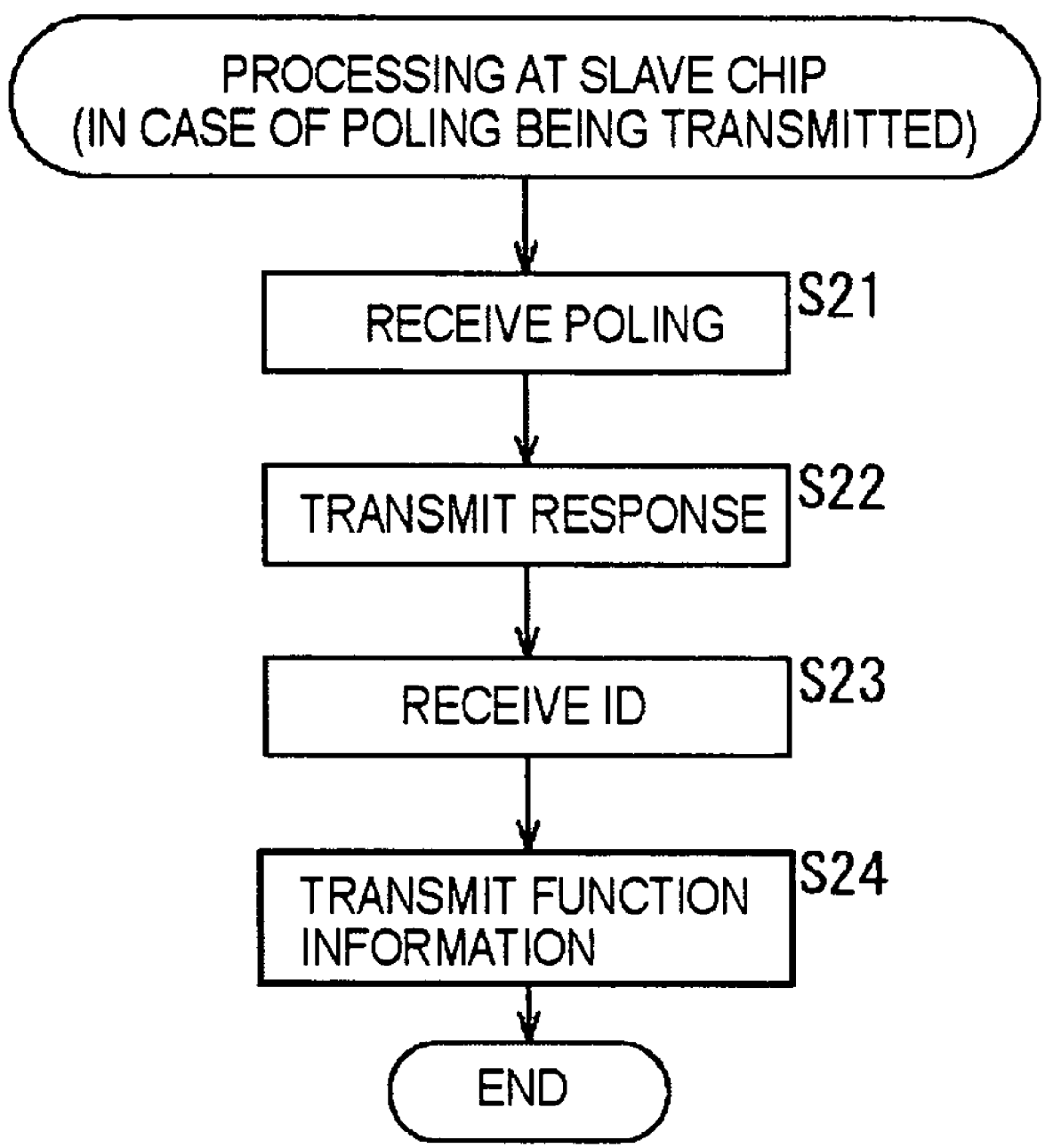
FIG. 5 is a flowchart describing the processing performed by a slave chip $51_N$.
Figure 6:
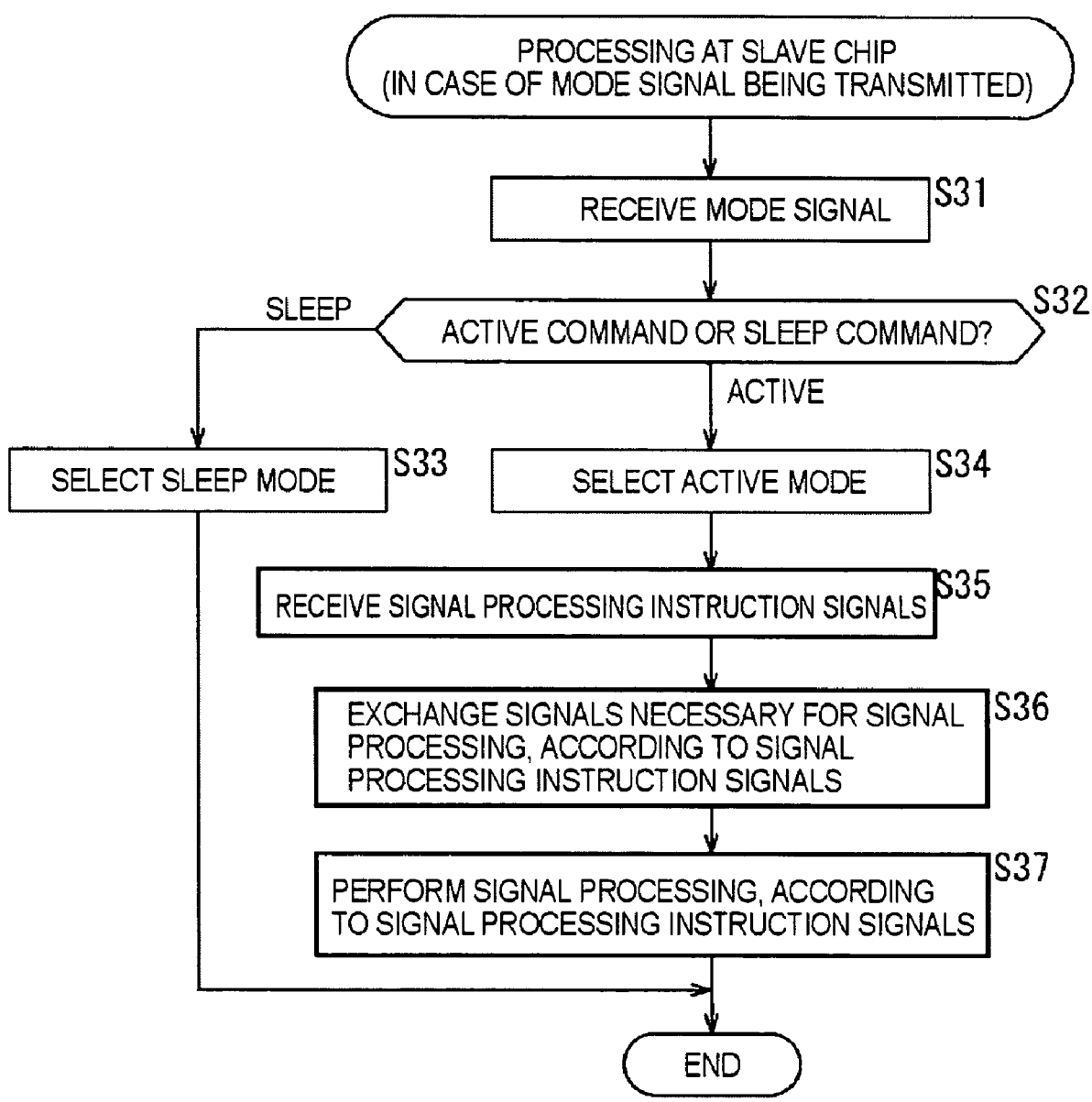
FIG. 6 is a flowchart describing the processing performed by the slave chip $51_N$.

Next, description will be made regarding the processing of the slave chip $51_N$ with reference to the flowcharts in FIGS. 5 and 6. First, description will be made regarding the processing performed by the slave chip $51_N$ in a case wherein the control chip $51_C$ sends the poling to the slave chip $51_N$ with the airwaves for signal processing with reference to the flowchart in FIG. 5.

In Step S21, the slave chip $51_N$ receives the poling sent from the control chip $51_C$. That is to say, with the slave chip $51_N$, the airwaves for signal processing are received at the antenna 11, and the received signal is supplied to the wireless circuit 12. Furthermore, with the slave chip $51_N$, the wireless circuit 12 subjects the signal received from the antenna 11 to predetermined processing, and supplies the poling signal obtained as a result thereof to the computing circuit 14.

Upon the computing circuit 14 of the slave chip $51_N$ thus receiving the poling signal supplied from the wireless circuit 12, the flow proceeds to Step S22 from Step S21, and the computing circuit 14 of the slave chip $51_N$ sends the response including a random number with the airwaves for signal processing. In other words, the computing circuit 14 of the slave chip $51_N$ generates two random numbers, includes one random number in the response, and supplies this to the wireless circuit 12. The wireless circuit 12 awaits for time of period corresponding to the other random number of the two random numbers generated by the computing circuit 14, and then emits the response from the computing circuit 14 from the antenna 11 as the airwaves for signal processing.

Subsequently, the computing circuit 14 of the slave chip $51_N$ awaits the ID sent from the control chip $51_C$ with the airwaves for signal processing, as described above, the flow proceeds to Step S23 from Step S22, where the computing circuit 14 of the slave chip $51_N$ receives the ID with the airwaves for signal processing, and thus, recognizes the own ID, and then the flow proceeds to Step S24.

In Step S24, the computing circuit 14 of the slave chip $51_N$ reads out the function information from the storage circuit 15, correlates the function information with the ID assigned to itself, sends this information with the airwaves for signal processing, and then the processing ends.

Next, description will be made regarding the processing performed by the slave chip $51_N$ in a case that the control chip $51_C$ sends the mode signal with the airwaves for control to the slave chip $51_N$ with reference to the flowchart in FIG. 6.

In Step S31, the slave chip $51_N$ receives the mode signal sent from the control chip $51_C$. In other words, with the slave chip $51_N$, the airwaves for control are received at the antenna 21, and the received signal is supplied to the wireless circuit 22. Furthermore, with the slave chip $51_N$, the wireless circuit 22 subjects the signal received from the antenna 21 to predetermined processing, and supplies the mode signal obtained as a result thereof to the computing circuit 24.

Subsequently, the flow proceeds to Step S32 from Step S31, where the computing circuit 24 of the slave chip $51_N$ determines whether the command correlated with the own ID in the mode signal is the active command or sleep command. In Step S32, in the event that determination is made that the command correlated with the own ID is the sleep command, the flow proceeds to Step S33, where the slave chip $51_N$ selects the sleep mode as the operating mode, and then the processing ends. In other words, the computing circuit 24 places the antenna 11 in a grounded state by controlling the selecting circuit 26, disables the function of wireless communication with the wireless circuit 12, and then the processing ends.

On the other hand, in Step S32, in the event that determination is made that the command correlated with the own ID is the active command, the flow proceeds to Step S34, where the slave chip $51_N$ selects the active mode as the operating mode. In other words, the computing circuit 24 places the antenna 11 in a high-impedance state by controlling the selecting circuit 26, and enables the function of wireless communication with the wireless circuit 12.

Subsequently, the computing circuit 14 of the slave chip $51_N$ in the active mode awaits the signal processing instruction signal sent from the control chip $51_C$ with the airwaves for signal processing as described above, and the flow proceeds to Step S35 from Step S34, where the computing circuit 14 of the slave chip $51_N$ receives the signal processing instruction signal with the airwaves for signal processing, and then the flow proceeds to Step S36.

In Step S36, the computing circuit 14 of the slave chip $51_N$ in the active mode recognizes the signal processing to be performed by itself from the code correlated with the own ID in the signal processing instruction signal received, and sends or receives the signal necessary for the signal processing with the airwaves for signal processing between the chip and the other slave chip $51_N$ in the active mode, and then the flow proceeds to Step S37.

In Step S37, the computing circuit 14 of the slave chip $51_N$ in the active mode subjects the signal received in Step S37, or the signal stored in the storage circuit 15 to signal processing corresponding to the code included in the received signal processing instruction signal, and sends the results of the signal processing, as necessary, with the airwaves for signal processing, and then the processing ends.

As described above, the multiple slave chips $51_N$ making up the signal processing system perform wireless communication with the other slave chips $51_N$ with the airwaves for signal processing respectively, and then subject the signal received with the airwaves for signal processing to signal processing. Furthermore, the slave chips $51_N$ perform wireless communication with the control chip $51_C$ with the airwaves for control, and enables or disables the function of wireless communication with the airwaves for signal processing according to the mode signal received with the airwaves for control. On the other hand, the control chip $51_C$ acquires the function information from the multiple slave chips $51_N$ respectively, and recognizes the candidates of the one or more available functions based on the function information. Furthermore, the control chip $51_C$ determines the available functions (determined functions) from the candidates of the one or more functions, and performs the scheduling of the signal processing to be performed by the multiple slave chips $51_N$ respectively to provide the determined functions. Subsequently, the control chip $51_C$ sends the signal for enabling or disabling the function of wireless communication with the airwaves for signal processing, with wireless communication by the airwaves for control, according to the results of the scheduling, and also sends the signal processing instruction signal for instructing the signal processing to be performed by the slave chip $51_N$ with wireless communication by the airwaves for signal processing.

Accordingly, the slave chip $51_N$ can receive the airwaves for signal processing without interference, and can perform the signal processing necessary for providing the determined functions, thereby providing the determined functions as the entire signal processing system.

With the signal processing system in FIG. 3, the IC chip $51_i$ includes the wireless circuits 12 and 22 for performing communication with the other IC chips $51_j$, the signal processing circuits 13 and 23 for performing signal processing based on the signal received at the wireless circuit 12 or 22 respectively, and can perform communication with all of the other IC chips $51_j$ using the airwaves for control. Furthermore, in the case that all of the other IC chips $51_j$ are in the active mode, the IC chip $51_i$ can perform communication with all of the other IC chips $51_j$ even using the airwaves for signal processing.

Also, in the case that a part of the other IC chips $51_j$ are in the active mode, and the rest are in the sleep mode, the IC chip $51_i$ can perform communication using the airwaves for signal processing by restricting the communication parties. In other words, the IC chip $51_i$ can perform communication to the other IC chips $51_j$ in the active mode by restricting them as the communication parties.

Accordingly, the IC chip $51_i$ can perform communication with all of the other IC chips $51_j$ at the same time, and also can perform communication by restricting the communication parties among the other IC chips $51_j$.

Furthermore, as described above, the restriction of communication parties can be performed by controlling the function of signal processing with the signal processing circuit 13 as well as by controlling the function of wireless communication with the wireless circuit 12. In other words, the restriction of communication parties can be performed by enabling or disabling the function of signal processing with the signal processing circuit 13. With the IC chip $51_i$ including the signal processing circuit 13 of which the function of signal processing is disabled, the signal processing based on the signal received at the wireless circuit 12 is not performed, and also the IC chip $51_i$ does not respond to the signal received at the wireless circuit 12, so is actually (equivalently) restricted from as a communication party (excluded from the communication parties).

Also, the airwaves sent and received at the IC chip $51_i$ making up the signal processing system in FIG. 3 include the airwaves for signal processing and airwaves for control. Accordingly, with the signal processing circuit 13 of the IC chip $51_i$, we may say that signal processing is performed based on the airwaves for signal processing which are part of the airwaves received at the IC chip $51_i$. Furthermore, with the signal processing circuit 23 of the IC chip $51_i$, we may say that control of enabling or disabling the function of signal processing with the signal processing circuit 13 is performed based on the airwaves for control which are another part of the airwaves received at the IC chip $51_i$.

Figure 7:
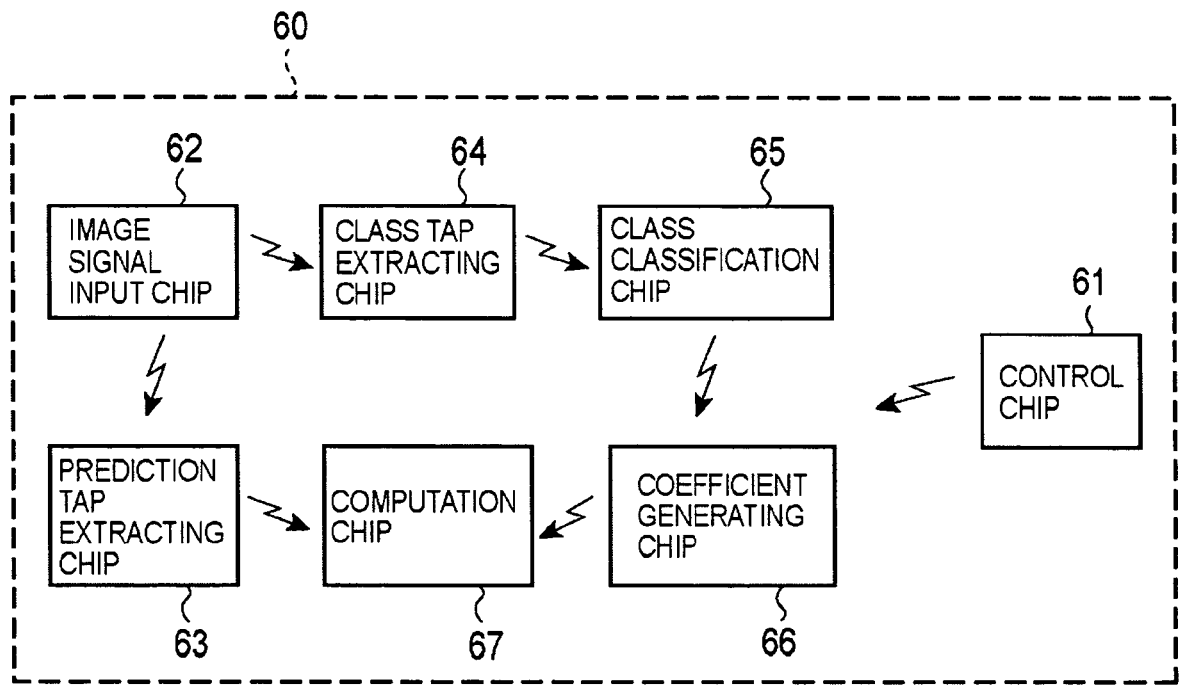
FIG. 7 is a block diagram illustrating a configuration example of an embodiment of a signal processing system as an image conversion apparatus to which the present invention is applied.

FIG. 7 illustrates a configuration example of the signal processing system 60 which functions as an image conversion apparatus for performing image conversion processing for converting a first image signal to a second image signal, for example.

Now, let us say that the first image signal is a low-resolution image signal, and the second image signal is a high-resolution image signal, for example. In this case, we may say that the image conversion processing is resolution improvement processing for improving resolution. Also, let us say that the first image signal is a low-S/N (Signal/Noise) image signal, and the second image signal is a high-S/N image signal, for example. In this case, we may say that the image conversion processing is noise removal processing for removing noise. Furthermore, let us say that the first image signal is a image signal in a predetermined size, and the second image signal is an image signal obtained by magnifying or reducing the first image signal in size, for example. In this case, we may say that the image conversion processing is resizing for resizing (magnifying or reducing) an image.

In FIG. 7, the signal processing system as an image conversion apparatus is configured with a control chip 61, image signal input chip 62, prediction tap extracting chip 63, class tap extracting chip 64, class classification chip 65, coefficient generating chip 66, and computation chip 67 disposed on the contact face 42. Note that the control chip 61 through computation chip 67 are respectively configured in the same way as those of the semiconductor chip shown in FIGS. 1 and 2.

The control chip 61 is equivalent to the above-described control chip $51_C$, and controls all of the image signal input chip 62, prediction tap extracting chip 63, class tap extracting chip 64, class classification chip 65, coefficient generating chip 66, and computation chip 67, which make up the signal processing system.

The image signal input chip 62 includes a function for inputting (providing) the first image signal which is the target of the image conversion processing. That is to say, the image signal input chip 62 stores the first image signal which is the target of image conversion processing, for example. Furthermore, the image signal input chip 62 handles the pixels making up the second image signal as pixels of interest, and provides the several pixels (pixel values) making up the first image signal to be employed for obtaining the pixel values of the pixels of interest with the image conversion processing from the first image signal stored.

More specifically, the image signal input chip 62 extracts the multiple pixels spatially and temporally located close to the pixels of the first image signal corresponding to the pixels of interest (for example, the pixels of the first image signal spatially and temporally located the closest to the pixels of interest) from the first image signal, and provides them.

Note that the image signal input chip 62 may acquire the first image signal from the outside thereof with wireless or cable communication, and provide the acquired first image signal, for example.

The prediction tap extracting chip 63 includes a function for extracting the several pixels (pixel values) to be employed for predicting the pixels (pixel values) of interest from the first image signal provided by the image signal input chip 62 as a prediction tap.

The class tap extracting chip 64 includes a function for extracting several pixels (pixel values) to be employed for classifying the pixels of interest from the first image signal provided by the image signal input chip 62 as a class tap.

Note that the same tap configuration of the pixels may be employed as the prediction tap or class tap of the pixels of interest, or different pixels may be employed as well.

The class classification chip 65 includes a function for classifying the pixels of interest into any one of multiple classes based on the class tap of the pixels of interest extracted by the class tap extracting chip 64, and outputting the class code corresponding to the class obtained as a result of the classification.

Here, the class classification chip 65 can output the value obtained by performing ADRC (Adaptive Dynamic Range Coding) on the class tap of the pixels of interest as a class code, for example.

Now, with K-bit ADRC, the maximum value MAX and minimum value MIN of the pixel values of the pixels making up the class tap of the pixels of interest are detected, an aggregate local dynamic range DR is obtained by subtracting MIN from MAX, and the pixel values of the pixels making up the class tap of the pixels of interest are quantized to K-bits again based on this dynamic range DR. In other words, the minimum value MIN is subtracted from the pixel value of the respective pixels making up the class tap of the pixels of interest, and the subtractive value thereof is divided (quantized) by $DR/2^K$. The bit string on which the k-bit pixel values of the respective pixels making up the class tap of the pixels of interest thus obtained are arrayed in predetermined order is output as an ADRC code. Accordingly, in the case that the class tap of the pixels of interest is subjected to 1-bit ARDC processing for example, the pixel values of the respective pixels making up the class tap of the pixels of interest are divided by the average value of the maximum value MAX and minimum value MIN (round down to the nearest whole number), thus the pixel values of the respective pixels are converted to one bit (binarized). Subsequently, the bit string on which the 1-bit pixel values are arrayed in predetermined order is output as an ADRC code. The class classification chip 65 outputs the ADRC code obtained by the class tap of the pixels of interest being subjected to ADRC processing as the class code of the pixels of interest, for example.

The coefficient generating chip 66 includes a function for generating and outputting the class tap coefficient of the class code of the pixels of interest output from the class classification chip 65. That is to say, the coefficient generating chip 66 stores the tap coefficient for each class, and outputs the class tap coefficient of the class code of the pixels of interest output by the class classification chip 65, of the tap coefficients stored. Here, the term "tap coefficient" corresponds to the coefficient to be multiplied by input data in the so-called tap of a digital filter.

The computation chip 67 includes a function for performing a predetermined prediction computation for obtaining the true value of the pixels of interest with the prediction tap of the pixels of interest extracted by the prediction tap extracting chip 63 and the class tap coefficient of the pixels of interest output by the coefficient generating chip 66. In other words, the computation chip 67 includes a function for obtaining and outputting (the prediction value of) the pixel value of the pixels of interest, i.e., the pixel value of the pixels making up the second image signal.

Next, description will be made regarding the prediction computation at the computation chip 67 in FIG. 7, and the learning of the tap coefficient employed for the prediction computation.

Now, let us say that a high-quality image signal is the second image signal, and a low-quality image signal obtained by deteriorating the high-quality image signal such as filtering the high-quality image signal with an LPF (Low Pass Filter) is the first image signal, a prediction tap is extracted from the low-quality image signal, and the pixel values of the high-quality pixels are obtained (predicted) with the prediction tap and tap coefficient, by a predetermined prediction computation. Let us say that a linear prediction computation is employed as a predetermined prediction computation for example. The pixel value y of the high-quality pixel is obtained with the following linear expression.

$$y = \sum_{n=1}^{N} w_n x_n \tag{1}$$

However, with Expression (1), $x_n$ represents the pixel value of the pixel (hereinafter, referred to as "low-quality pixel" as appropriate) of the n numbered low-quality image signal making up the prediction tap as to the high-quality pixel y, and $w_n$ represents the n numbered tap coefficient to be multiplied by (the pixel value of) the n numbered low-quality pixel. Let us say that with expression (1), the prediction tap is made up of N low-quality pixels $x_1$, $x_2$, and so forth through $x_N$.

Here, the pixel value y of the high-quality pixel may be obtained with expression of higher degree than a linear expression instead of the linear expression shown in Expression (1).

Now, if the true value of the pixel value of the high-quality pixel of No. k sample is represented by $y_k$, and also the prediction value of the true value $y_k$ obtained by Expression (1) is represented by $y_k'$, the prediction error $e_k$ thereof is represented by the following expression.

$$e_k = y_k - y_k' \tag{2}$$

Now, the prediction value $y_k'$ of Expression (2) is obtained in accordance with Expression (1), and accordingly, if $y_k'$ of Expression (2) is substituted in accordance with Expression (1), the following expression is obtained.

$$e_k = y_k - \left( \sum_{n=1}^{N} w_n x_{n,k} \right) \tag{3}$$

However, with Expression (3), $x_{n,k}$ represents the n numbered low-quality pixel making up the prediction tap as to the high-quality pixel of No. k sample.

The tap coefficient $w_n$ making the prediction error $e_k$ of Expression (3) (or Expression (2)) zero is the most appropriate for predicting the high-quality pixel. However, it is difficult to obtain such the prediction error $e_k$ as to all of the high-quality pixels.

Consequently, in the event of employing the least square method as a norm representing that the tap coefficient $w_n$ is the most appropriate, the most appropriate tap coefficient $w_n$ can be obtained by minimizing the sum E of square error represented by the following expression.

$$E = \sum_{k=1}^{K} e_k^2 \tag{4}$$

However, with Expression (4), K represents the number of samples (the number of samples for learning) made up of a set of the high-quality pixel $y_k$ and the low-quality pixels $x_{1,k}$, $x_{2,k}$, and so forth, $x_{N,k}$ making up the prediction tap as to the high-quality pixel $y_k$.

The minimum value of the sum E of square error in Expression (4) is obtained by the tap coefficient $w_n$ making the result obtained by partial-differentiating the sum E with the tap coefficient $w_n$ zero, as shown in Expression (5).

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \ (n = 1, 2, \ldots, N) \quad (5)$$

Consequently, the following expression is obtained by partial-differentiating Expression (3) with the tap coefficient $w_n$.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, (k = 1, 2, \ldots, K) \quad (6)$$

The following expression is obtained from Expressions (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

Expression (7) can be represented with a normal equation shown in Expression (8) by substituting $e_k$ of Expression (7) with Expression (3).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equation of Expression (8) can be solved regarding the tap coefficient $w_n$ by employing a sweep-out method (Gauss-Jordan elimination) or the like, for example.

The most appropriate tap coefficient (here, the tap coefficient making the sum E of square error the minimum) can be obtained for each-class by providing and solving the normal equation of Expression (8) for each class of a great number of high-quality pixels.

The coefficient generating chip 66 in FIG. 7 stores beforehand the tap coefficient $w_n$ for each class obtained by performing the learning of the tap coefficient fro providing and solving the normal equation of Expression (8) for each class on the assumption that the image signal having quality equivalent to the second image signal is tutor data to become the tutor (true value) of learning, and also the image signal of which resolution is deteriorated from that of the tutor data to that of the first image signal.

As described above, in the event that the learning of the tap coefficient is performed on the assumption that the image signal having quality equivalent to the second image signal is tutor data to become the tutor (true value) of learning, and also the image signal of which resolution is deteriorated from that of the tutor data to that of the first image signal, the tap coefficient for performing image conversion processing for converting the first image signal to the high-resolution second image signal can be obtained.

Here, the tap coefficient for performing the various types of image conversion processing can be obtained depending on a method for selecting the image signal which is student data corresponding to the first image signal or the image signal which is tutor data corresponding to the second image signal.

In other words, the tap coefficient for performing the image conversion processing serving as noise removal processing for converting the first image signal to the second image signal which is the first image signal of which noise is removed (reduced) can be obtained by performing learning processing on the assumption that the high-quality image signal is tutor data, and also the image signal which is the high-quality image signal as the tutor data with which noise is superimposed is student data, for example.

Also, the tap coefficient for performing the image conversion processing serving as resizing for converting the first image signal to the second image signal which is the first image signal of which size is magnified or reduced can be obtained by performing learning processing on the assumption that a certain image signal is tutor data, and also the image signal which is the image signal as the tutor data of which the number of pixels are thinned out is student data, or a predetermined image signal is student data, and also the image signal which is the image signal as the student data of which pixels are thinned out with a predetermined thinned-out ratio is tutor data, for example. In addition, the tap coefficient for performing the conversion of the number of pixels, conversion of an aspect ratio, or other arbitrary image conversion can be obtained on the assumption that the image signals serving as tutor data and student data are predetermined image signals.

Next, description will be made regarding the image conversion processing performed in the signal processing system serving 60 as the image conversion apparatus in FIG. 7 with reference to the flowchart in FIG. 8.

In Step S51, the image signal input chip 62 selects one of the pixels making up the second image signal which have not been handled as the pixel of interest, further extracts some of (the pixel values of) the pixels making up the first image signal to be employed for obtaining the pixel value of the selected pixel of interest with the image conversion processing from the first image signal stored, and sends these with the airwaves for signal processing.

Subsequently, the flow proceeds to Step S52 from Step S51, where the prediction tap extracting chip 63 receives the first image signal to be sent from the image signal input chip 62, and extracts some of (the pixel values of) the pixels to be employed for predicting the pixel value of the pixel of interest from the first image signal as a prediction tap. Furthermore, in Step S52, the class tap extracting chip 64 receives the first image signal to be sent from the image signal input chip 62, and extracts some of (the pixel values of) the pixels to be employed for classifying the pixel of interest from the first image signal as a class tap.

In other words, the prediction tap extracting chip 63 and class tap extracting chip 64 respectively extract the multiple pixels located spatially close to the pixel of the first image signal corresponding to the pixel of interest (for example, the pixel of the first image signal located spatially and temporarily the closest to the pixel of interest) as a prediction tap and a class tap.

Subsequently, the flow proceeds to Step S53 from Step S52, where the class tap extracting chip 64 sends the class tap of the pixel of interest with the airwaves for signal processing. Furthermore, in Step S53, the class classification chip 65 receives the class tap of the pixel of interest to be sent from the class tap extracting chip 64, obtains the class of the pixel of interest by classifying the pixel of interest to any class of the multiple classes based on the class tap, and the flow proceeds to Step S54.

In Step S54, the class classification chip 65 sends the class code representing the pixel of interest with airwaves for signal processing. Furthermore, in Step S54, the coefficient generating chip 65 receives the class code of the pixel of interest to be sent from the class classification chip 65, generates the class tap coefficient of the class code, and the flow proceeds to Step S55. That is to say, the coefficient generating chip 66 reads out the tap coefficient of the class of the pixel of interest from the tap coefficients stored.

In Step S55, the prediction extracting chip 63 sends the prediction tap of the pixel of interest with the airwaves for signal processing, and also the coefficient generating chip 66 sends the class tap coefficient of the pixel of interest with the airwaves for signal processing. Furthermore, in Step S55, the computation chip 67 receives the prediction tap to be sent from the prediction tap extracting chip 63 and the tap coefficient to be sent from the coefficient generating chip 66, obtains (the pixel value of) the pixel of interest by performing the computation of Expression (1) with the prediction tap and tap coefficient, and then the processing ends.

Note that with the signal processing system 60, the above-described processing in Step S51 through S55 is performed on the assumption that all the pixels of the second image signal of one screen (frame or field) are sequentially handled as the pixel of interest, for example.

The control chip 61 performs the image conversion processing such as described above as the entire signal processing system, and accordingly, sends the signal processing instruction signal for instructing the signal processing to be performed by the image signal input chip 62 through computation chip 67 respectively with the airwaves for signal processing, and also sends the mode signal for instructing the above respective chips to enter the sleep mode or active mode with the airwaves for control.

Figure 8:
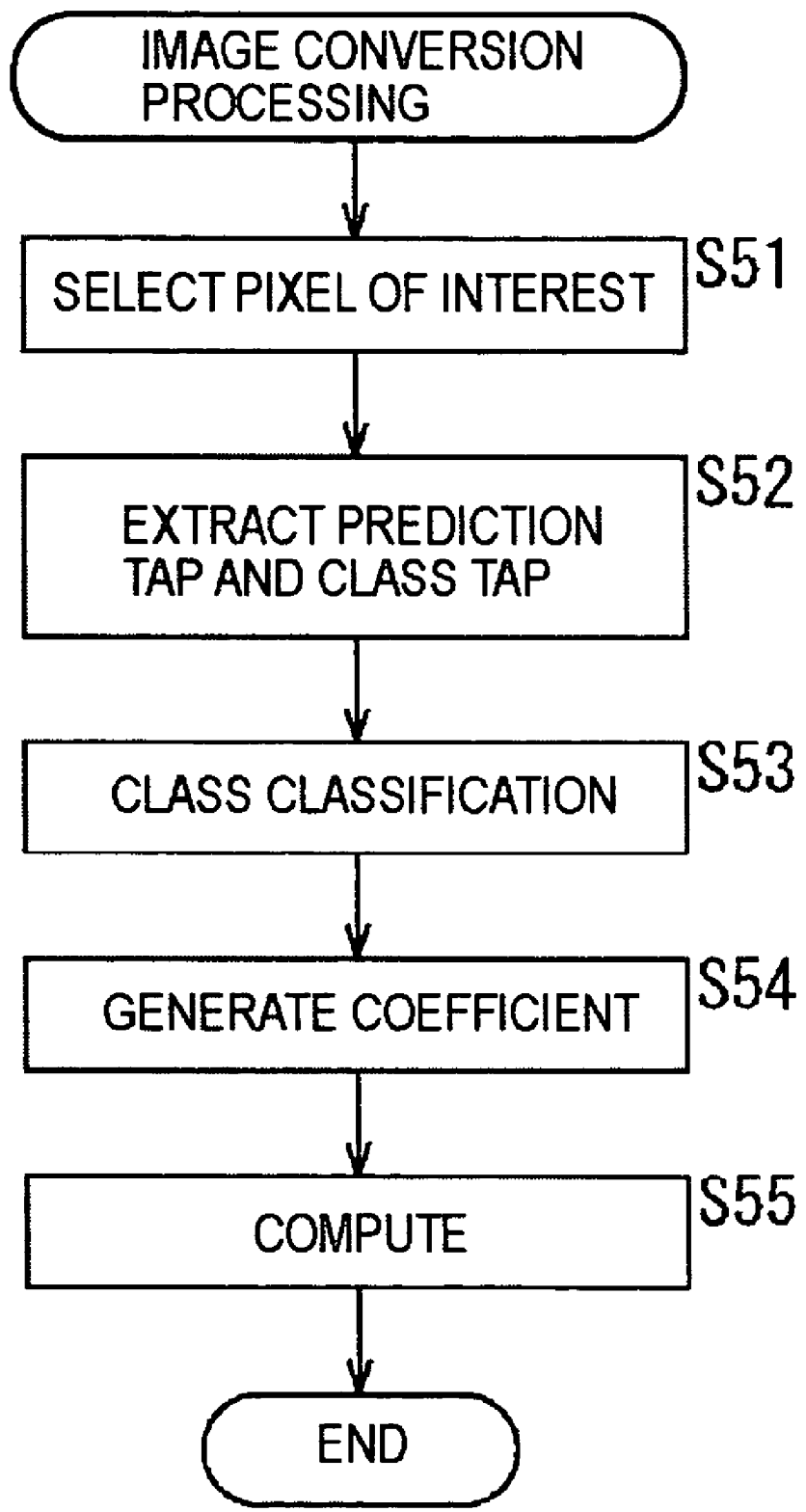
FIG. 8 is a flowchart describing image conversion processing.

Now, description will be made regarding the control of the respective operating modes of the image signal input chip 62 through computation chip 67 with the mode signal in a case that the image conversion processing in FIG. 8 is performed in the signal processing system 60 in FIG. 7.

When the processing in Step S51 of FIG. 8 is performed, the control chip 61 places the image signal input chip 62, prediction tap extracting chip 63, and class tap extracting chip 64, in the active mode, and places the other class classification chip 65, coefficient generating chip 66, and computation chip 67, in the sleep mode, as shown in FIG. 9. Thus, in Step S52, only the prediction tap extracting chip 63 and class tap extracting chip 64 in the active mode receive the first image signal sent with the airwaves for signal processing by the image signal input chip 62 in Step S51.

Here, in FIG. 9 (as well as in later-described FIGS. 10 through 12, and FIGS. 15 through 19), the semiconductor chips (IC chips) in the active mode are represented with solid lines, and the semiconductor chips in the sleep mode are represented with dotted lines.

When the processing in Step S53 of FIG. 8 is performed, the control chip 61 places the class tap extracting chip 64 and class classification chip 65 in the active mode, and places the other image signal input chip 62, prediction tap extracting chip 63, coefficient generating chip 66, and computation chip 67, in the sleep mode, as shown in FIG. 10. Thus, only the class classification chip 65 in the active mode receives the class tap of the pixel of interest sent with the airwaves for signal processing by the class tap extracting chip 64 in Step S53.

Figure 11:
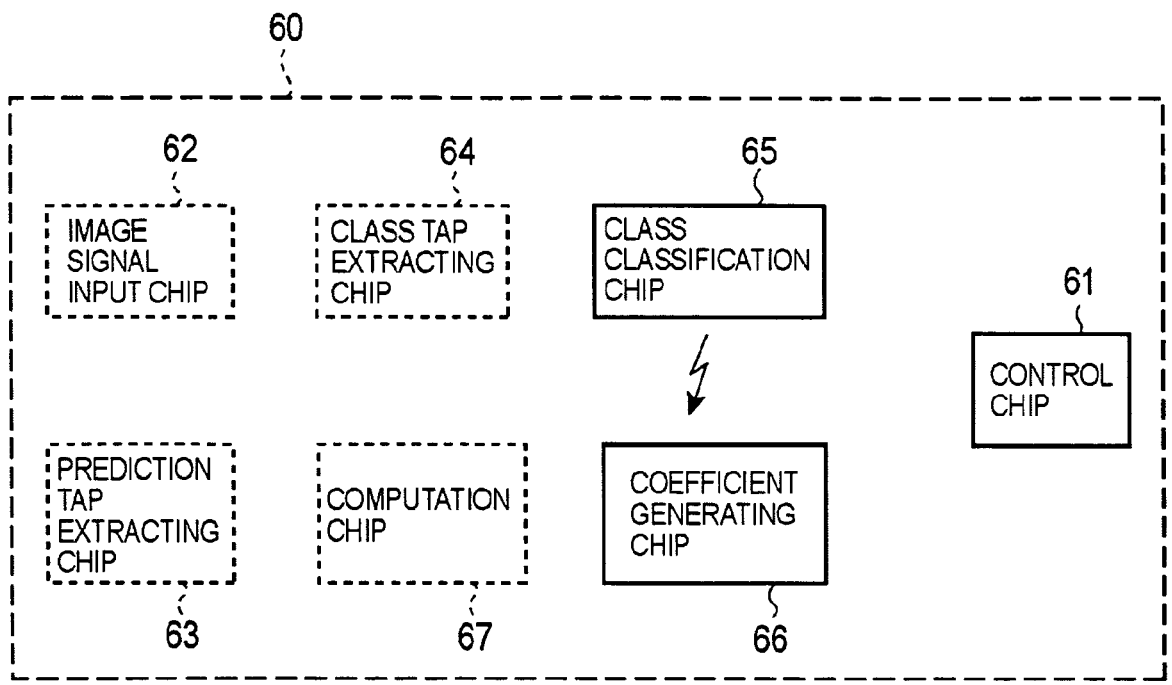
FIG. 11 is an explanatory diagram describing control of respective operating modes of the image signal input chip 62 through the computation chip 67.

When the processing in Step S54 of FIG. 8 is performed, the control chip 61 places the class classification chip 65 and coefficient generating chip 66, in the active mode, and places the other image signal input chip 62, prediction tap extracting chip 63, class tap extracting chip 64, and computation chip 67, in the sleep mode, as shown in FIG. 11. Thus, only the coefficient generating chip 66 in the active mode receives the class code of the pixel of interest sent with the airwaves for signal processing by the class classification chip 65 in Step S54.

Figure 12:
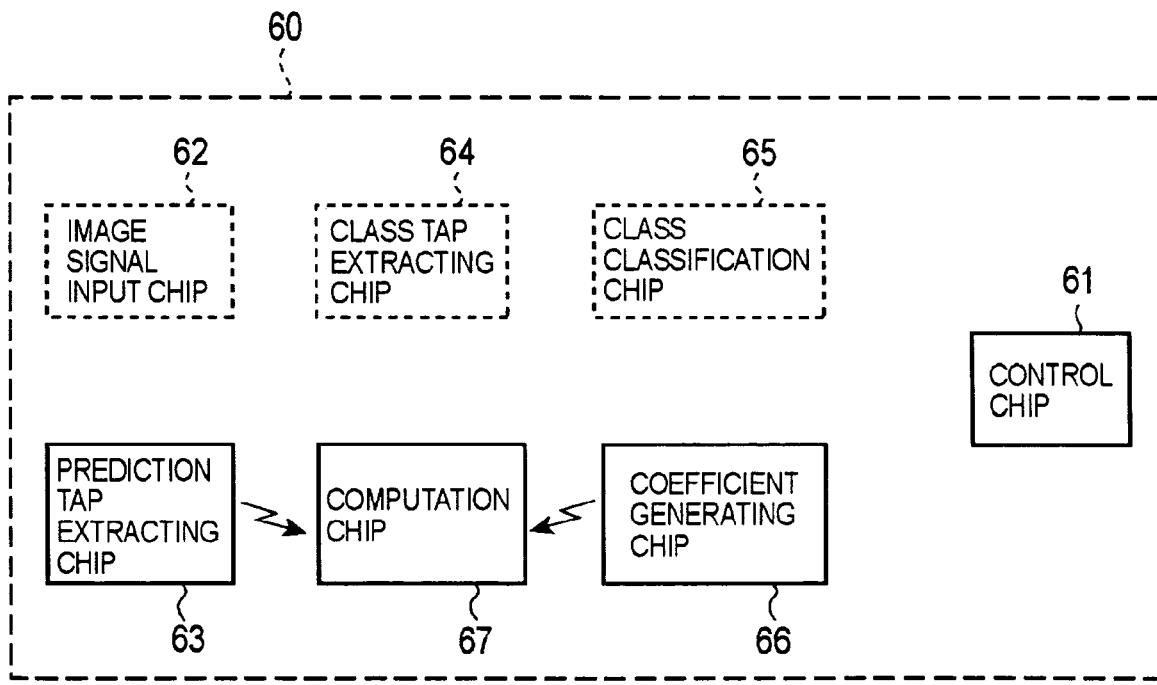
FIG. 12 is an explanatory diagram describing control of respective operating modes of the image signal input chip 62 through the computation chip 67.

When the processing in Step S55 of FIG. 8 is performed, the control chip 61 places the prediction tap extracting chip 63, coefficient generating chip 66, and computation chip 67, in the active mode, and places the other image signal input chip 62, class tap extracting chip 64, and class classification chip 65, in the sleep mode, as shown in FIG. 12. Thus, only the computation chip 67 in the active mode receives the class tap coefficient of the pixel of interest sent with the airwaves for signal processing by the coefficient generating chip 66 in Step S55.

In this case, if the prediction tap extracting chip 63 and coefficient generating chip 66 send the same airwaves for signal processing, interference occurs. In order to avoid this interference, the prediction tap extracting chip 63 and coefficient generating chip 66 preferably employ the airwaves for signal processing with a different carrier frequency, or the airwaves for signal processing with a spread spectrum method due to a different spread coding at the time of supplying a signal.

In addition, in order to avoid interference, an arrangement may be made wherein, first, any one of the prediction tap extracting chip 63 and the coefficient generating chip 66 is set to the active mode, the other is set to the sleep mode, the semiconductor chip set to the active mode sends the airwaves for signal processing to the computation chip 67, following which the other of the prediction tap extracting chip 63 and coefficient generating chip 66 is set to the active mode, one is set to the sleep mode, and the semiconductor chip set to the active mode sends the airwaves for signal processing to the computation chip 67.

Next, description will be made regarding the processing of the signal processing system in the case that a new semiconductor chip is disposed in the signal processing system 60 in FIG. 7.

Figure 13:
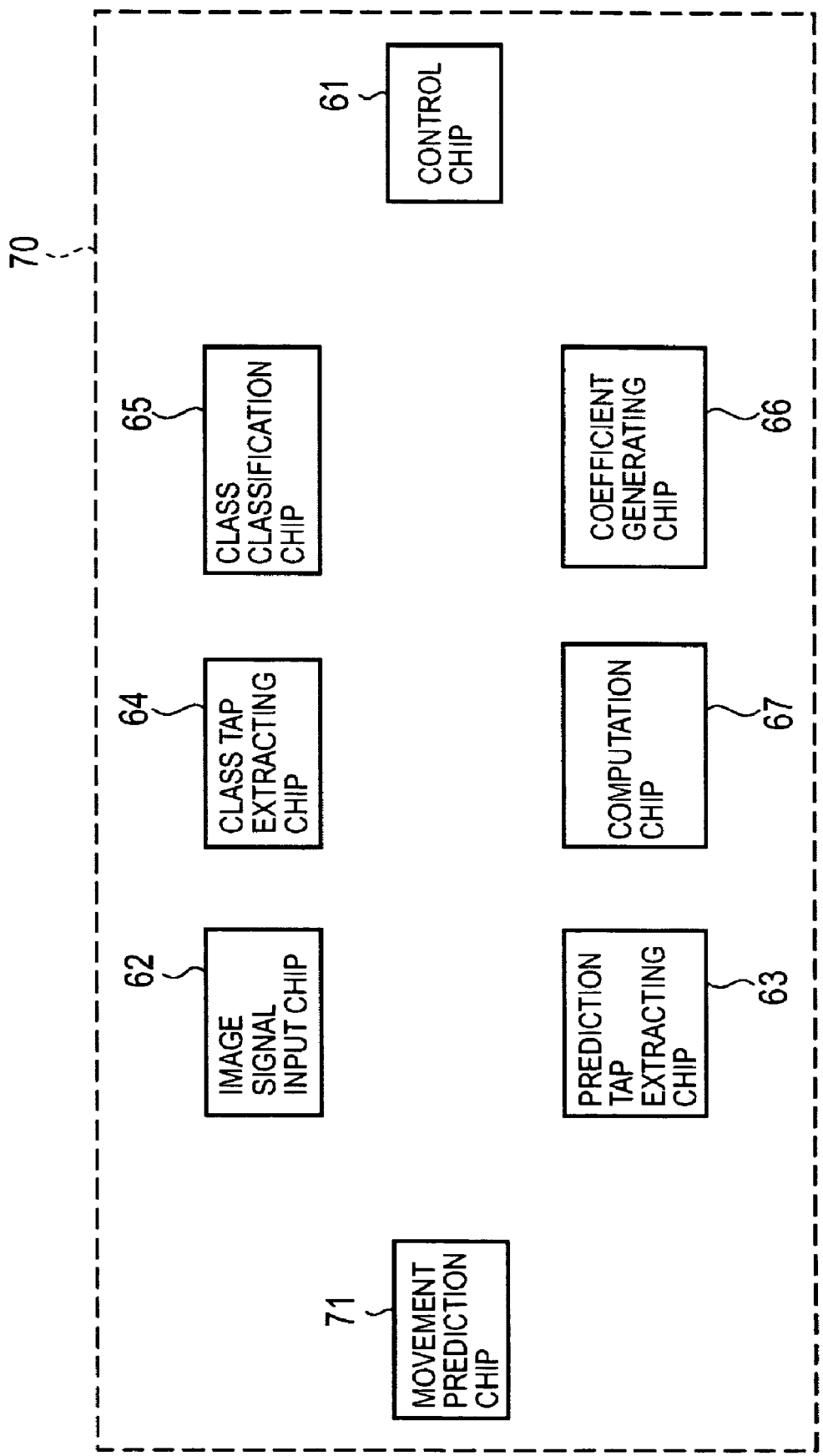
FIG. 13 is a block diagram illustrating a configuration example of an embodiment of a signal processing system as an image conversion apparatus to which the present invention is applied.

FIG. 13 illustrates a state (signal processing system 70) wherein a movement prediction chip 71 as a new semiconductor chip is disposed in a signal processing system 60 serving as an image conversion apparatus in FIG. 7.

The movement prediction chip 71 is configured as with the semiconductor chip shown in FIGS. 1 and 2 as well as the control chip 61 through computation chip 67, and includes a function for performing the movement prediction of the pixel of interest, i.e., detecting the movement of the pixel of interest, and outputting the movement vector representing the movement thereof.

In the event that the movement prediction chip 71 is newly disposed in the signal processing system in FIG. 7, the control chip 61 controls the image signal input chip 62 through computation chip 67, and movement prediction chip 71 such that the following functions are realized as the entire signal processing system with calibration sharing.

Figure 14:
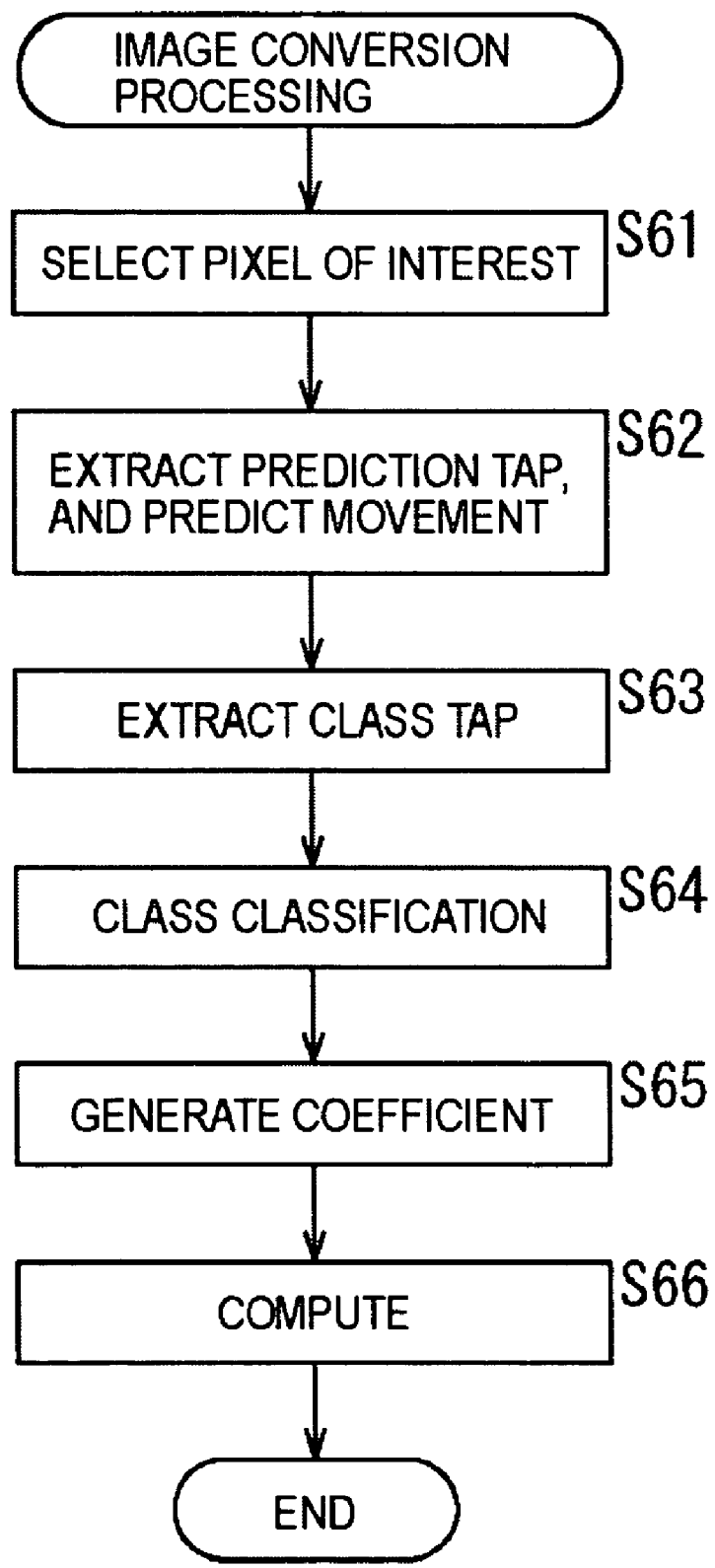
FIG. 14 is a flowchart describing image conversion processing.

FIG. 14 is a flowchart for describing the image conversion processing performed in the signal processing system 70 serving as the image conversion apparatus in FIG. 13.

In Step S61, the image signal input chip 62 selects one of the pixels making up the second image signal which have not been handled as the pixel of interest as with the case in Step S51 of FIG. 8, extracts some of (the pixel values of) the pixels making up the first image signal to be employed for obtaining the pixel value of the selected pixel of interest with the image conversion processing from the first image signal stored, and sends these with the airwaves for signal processing. Furthermore, in Step S61, the image signal input chip 62 extracts some of (the pixel values of) the pixels making up the first image signal to be employed for detecting the movement vector of the selected pixel of interest from the first image signal stored, and sends these with the airwaves for signal processing.

Subsequently, the flow proceeds to Step S62 from Step S61, the prediction tap extracting chip 63 and class tap extracting chip 64 receive the first image signal to be sent from the image signal input chip 62. Furthermore, the prediction tap extracting chip 63 extracts some of (the pixel values of) the pixels to be employed for predicting the pixel value of the pixel of interest from the first image signal as a prediction tap as with the case in Step S52 of FIG. 8. Also, in Step S62, the movement prediction chip 71 receives the first image signal to be sent from the image signal input chip 62, and detects the movement vector of the pixel of interest with the first image signal. In other words, the movement prediction chip 71 obtains the movement vector of the pixel of interest by performing block matching of some pixels of the first image signal having the same frame as the pixel of interest (hereinafter, referred to as "frame of interest") close to the pixel of interest as to the first image signal of the frame adjacent to the frame of interest.

Subsequently, the flow proceeds to Step S63 from Step S62, where the movement prediction chip 71 sends the movement vector of the pixel of interest with the airwaves for signal processing, and the class tap extracting chip 64 and class classification chip 65 receives the movement vector to be sent from the movement prediction chip 71. Furthermore, in Step S63, the class tap extracting chip 64 extracts some of (the pixel values of) the pixels to be employed for classifying the pixel of interest from the first image signal received from the image signal input chip 62 based on the movement vector of the pixel of interest received from the movement prediction chip 71 as a class tap. In other words, the class tap extracting chip 64 extracts, for example, the multiple pixels of the first image signal spatially close to the position offset from the position of the first image signal corresponding to the pixel of interest by the movement vector of the pixel of interest as a class tap.

Here in Step S52 of FIG. 8, while the class tap extracting chip 64 extracts the multiple pixels of the first image signal spatially close to the position of the first image signal corresponding to the pixel of interest as a class tap, the class tap extracting chip 64 extracts the multiple pixels of the first image signal spatially close to the position offset from the position of the first image signal corresponding to the pixel of interest by the movement vector of the pixel of interest as a class tap in Step S63 of FIG. 14. In other words, the function of the class tap extracting chip 64 for extracting a class tap is modified by the movement prediction chip 71 being newly disposed.

Subsequently, the flow proceeds to Step S64 from Step S63, where the class tap extracting chip 64 sends the class tap of the pixel of interest with the airwaves for signal processing. Furthermore in Step S64, the class classification chip 65 receives the class tap of the pixel of interest to be sent from the class tap extracting chip 64, obtains the class of the pixel of interest by performing class classification for classifying the pixel of interest into any one of the multiple classes based on the received class tap and the movement vector of the pixel of interest received from the movement prediction chip 71 in Step S63, and the flow proceeds to Step S65.

Here in Step S53 of FIG. 8, while the class classification chip 65 performs class classification with the class tap of the pixel of interest alone, the class classification chip 65 performs class classification with the movement vector of the pixel of interest as well as the class tap of the pixel of interest in Step S64 of FIG. 14. In other words, the function of the class classification chip 65 for performing class classification is modified by the movement prediction chip 71 being newly disposed. Note that examples of class classification with the class tap of the pixel of interest and the movement vector of the pixel of interest include ADRC processing and the like of which target includes all of the pixels making up the class tap of the pixel of interest, and the components of the movement vector of the pixel of interest.

In Step S65, the class classification chip 65 sends the class code representing the class of the pixel of interest with the airwaves for signal processing. Furthermore in Step S65, the coefficient generating chip 66 receives the class code of the pixel of interest to be sent from the class classification chip 65, generates the class tap coefficient of the class code, and the flow proceeds to Step S66. In other words, the coefficient generating chip 66 reads out the class tap coefficient of the pixel of interest from tap coefficients stored.

Here with the signal processing system 70 of FIG. 13, the class classification chip 65 performs class classification with the movement vector of the pixel of interest as well as the class tap of the pixel of interest. A first system of the class obtained by class classification using the class tap of the pixel of interest alone is different from a second system of the class obtained by class classification using the class tap and movement vector of the pixel of interest. Accordingly, the coefficient generating chip 66 needs to store at least the tap coefficient for each class corresponding to the first and second systems respectively. With the signal processing system 60 in FIG. 7, the coefficient generating chip 66 needs to read out the class tap coefficient of the pixel of interest from the tap coefficients for each class regarding the first system. On the other hand, with the signal processing system 70 in FIG. 13, the coefficient generating chip 66 needs to read out the class tap coefficient of the pixel of interest from the tap coefficients for each class regarding the second system. The function of the coefficient generating chip 66 for generating (reading out) the tap coefficient is modified by the movement prediction chip 71 being newly disposed.

In Step S66, the prediction tap extracting chip 63 sends the prediction tap of the pixel of interest with the airwaves for signal processing, and also the coefficient generating chip 66 sends the class tap coefficient of the pixel of interest with the airwaves for signal processing. Furthermore in Step S66, the computation chip 67 receives the prediction tap to be sent from the prediction tap extracting chip 63 and the tap coefficient to be sent from the coefficient generating chip 66, obtains (the pixel value of) the pixel of interest by performing the computation of Expression (1) with the prediction tap and tap coefficient, and then the processing ends.

Note that with the signal processing system, the above-described processing in Step S61 through S66 is performed wherein all of the pixels of the second image signal of one screen (frame or field) are sequentially handled as the pixel of interest.

The control chip 61, in order to perform the above-described image conversion processing as the entire signal processing system, sends the signal processing instruction signal for instructing signal processing to be performed by each chip to the image signal input chip 62 through computation chip 67, and movement prediction chip 71 respectively with the airwaves for signal processing, and also sends the mode signal for instructing whether to set the sleep mode or active mode to the above-described chips with the airwaves for signal processing.

Accordingly, description will be made regarding the control of the respective operating modes corresponding to the image signal input chip 62 through computation chip 67, and movement prediction chip 71 with the mode signal in the case that the image conversion processing in FIG. 14 is performed in the signal processing system 70 in FIG. 13.

Figure 15:
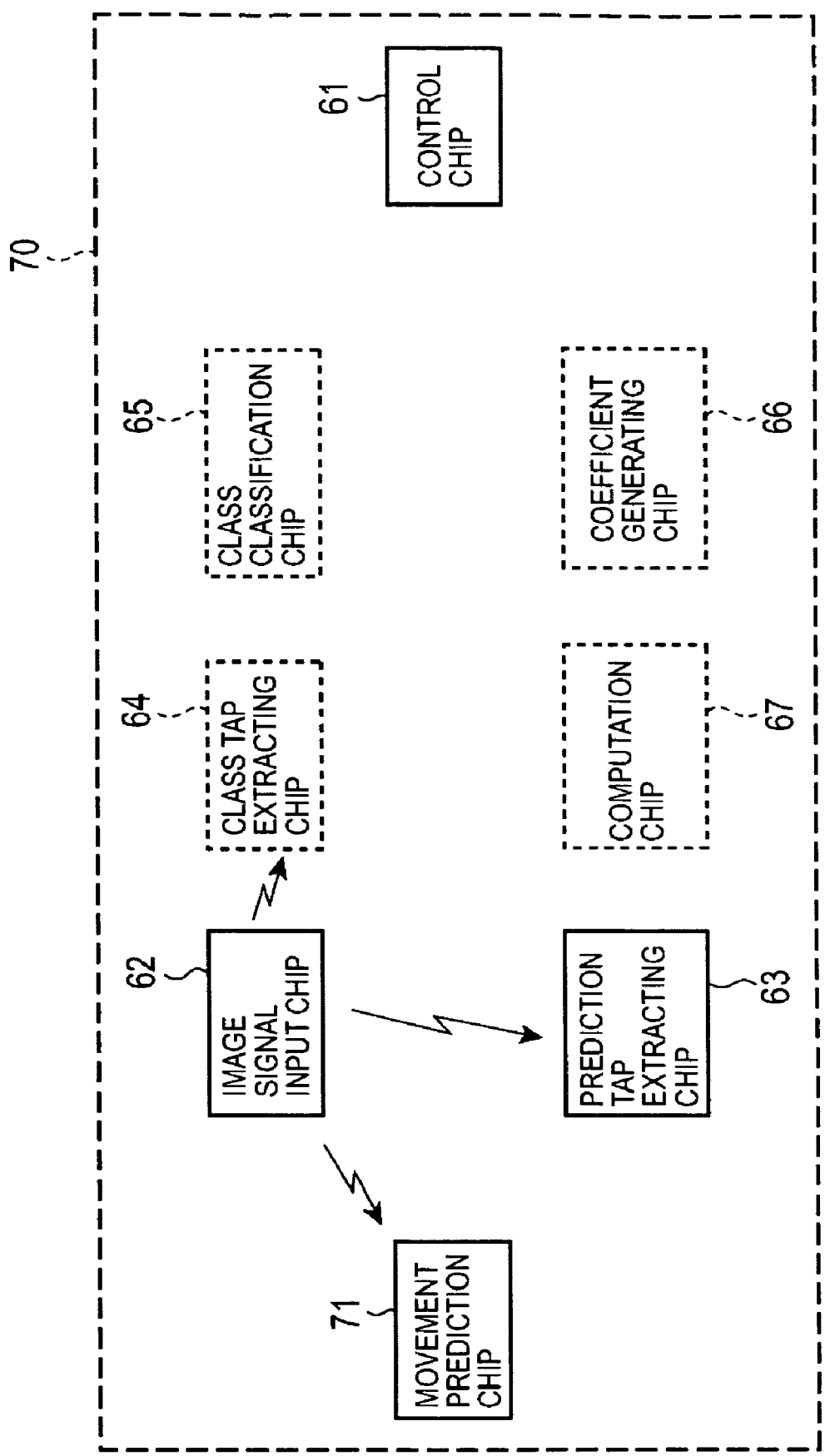
FIG. 15 is an explanatory diagram describing control of respective operating modes of the image signal input chip 62 through the computation chip 67, and a movement predicting chip 71.

When the processing in Step S61 of FIG. 14 is performed, the control chip 61 places the image signal input chip 62, prediction tap extracting chip 63, class tap extracting chip 64 and movement prediction chip 71, in the active mode, and places the other class classification chip 65, coefficient generating chip 66, and computation chip 67, in the sleep mode, as shown in FIG. 15. Thus, in Step S62, only the prediction tap extracting chip 63, class tap extracting chip 64, and movement prediction chip 71 in the active mode receive the first image signal to be sent with the airwaves for signal processing by the image signal input chip 62 in Step S61.

Figure 16:
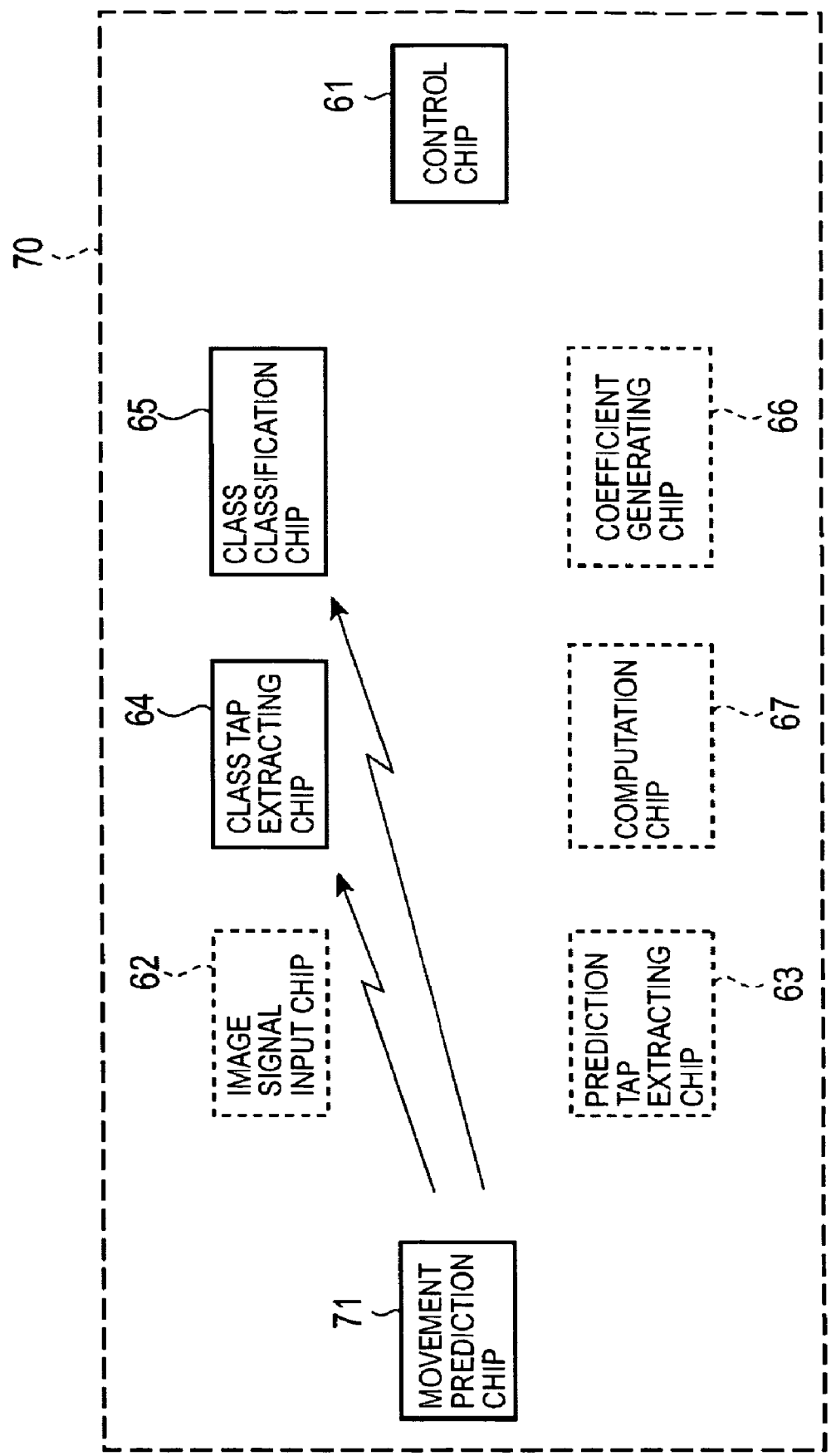
FIG. 16 is an explanatory diagram describing control of respective operating modes of the image signal input chip 62 through the computation chip 67, and the movement predicting chip 71.

When the processing in Step S63 of FIG. 14 is performed, the control chip 61 places the class tap extracting chip 64, class classification chip 65, and movement prediction chip 71, in the active mode, and places the other image signal input chip 62, prediction tap extracting chip 63, coefficient generating chip 66, and computation chip 67, in the sleep mode, as shown in FIG. 16. Thus, in Step S63, only the class tap extracting chip 64 and class classification chip 65 in the active mode receive the movement vector of the pixel of interest to be sent with the airwaves for signal processing by the movement prediction chip 71.

Figure 17:
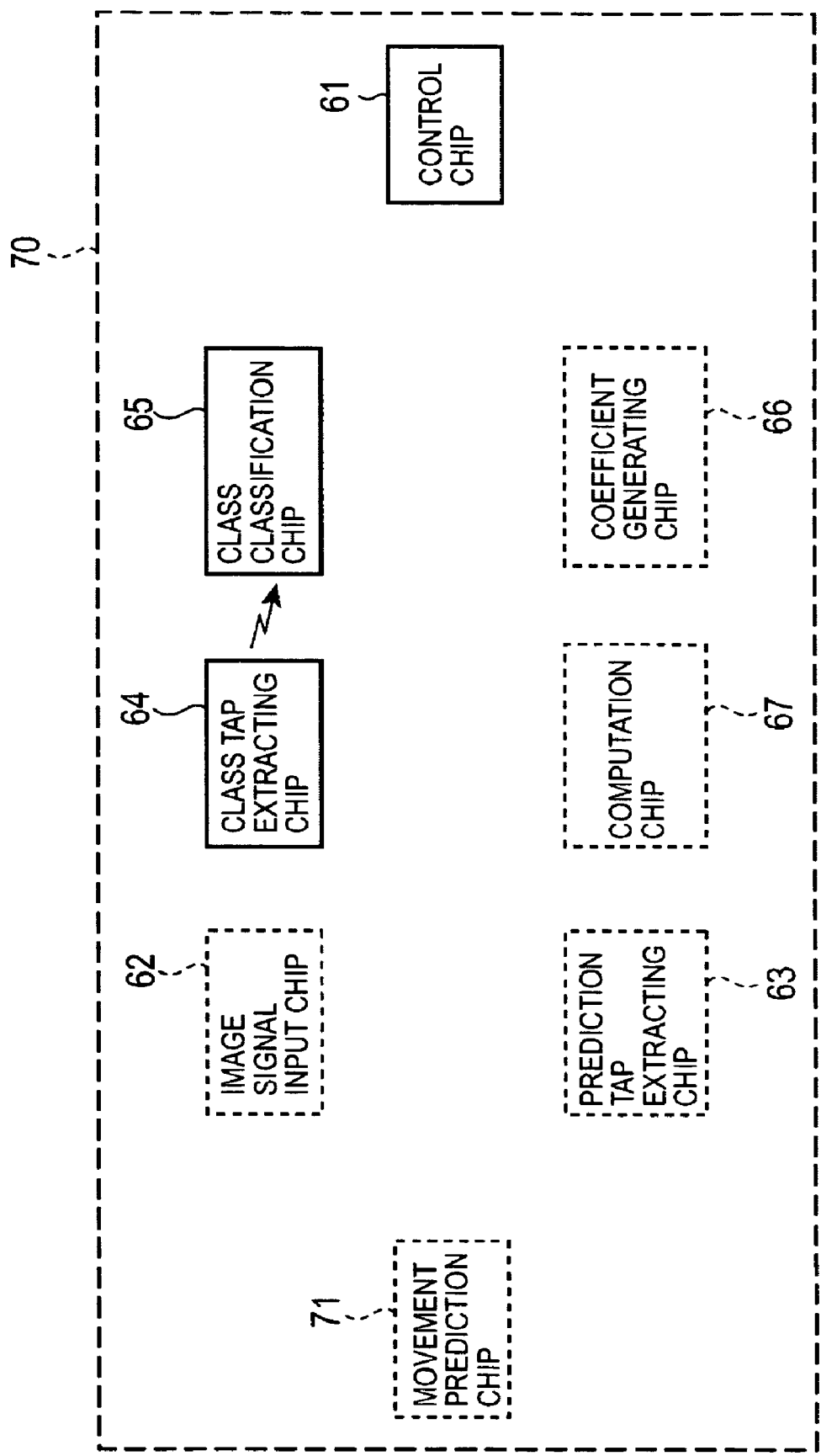
FIG. 17 is an explanatory diagram describing control of respective operating modes of the image signal input chip 62 through the computation chip 67, and the movement predicting chip 71.

When the processing in Step S64 of FIG. 14 is performed, the control chip 61 places the class tap extracting chip 64 and class classification chip 65, in the active mode, and places the other image signal input chip 62, prediction tap extracting chip 63, coefficient generating chip 66, computation chip 67, and movement prediction chip 71, in the sleep mode, as shown in FIG. 17. Thus, in Step S64, only the class classification chip 65 in the active mode receives the class tap of the pixel of interest to be sent with the airwaves for signal processing by the class tap extracting chip 64.

Figure 18:
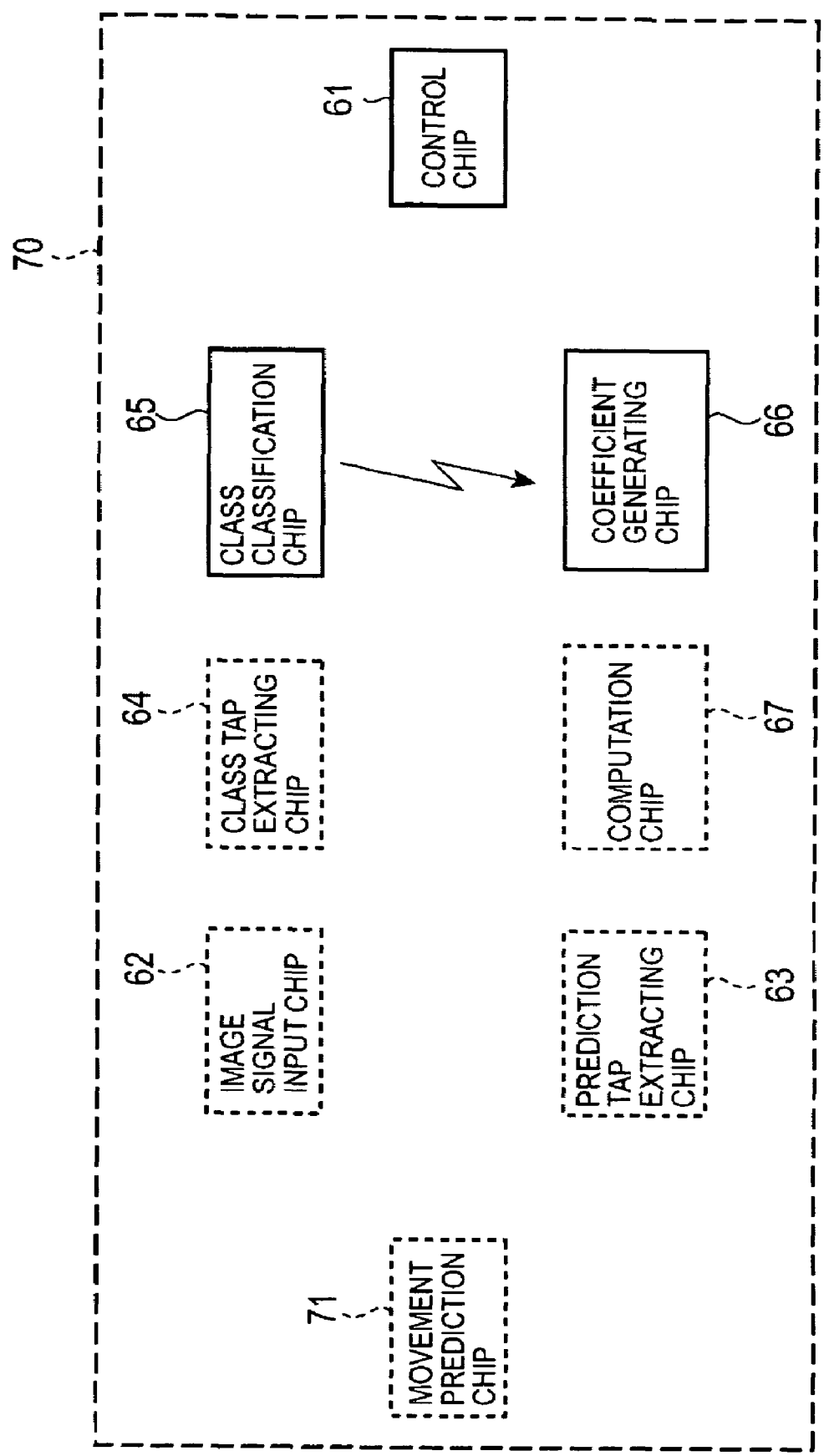
FIG. 18 is an explanatory diagram describing control of respective operating modes of the image signal input chip 62 through the computation chip 67, and the movement predicting chip 71.

When the processing in Step S65 of FIG. 14 is performed, the control chip 61 places the class classification chip 65 and coefficient generating chip 66 the active mode, and places the other image signal input chip 62, prediction tap extracting chip 63, class tap extracting chip 64, computation chip 67, and movement prediction chip 71, in the sleep mode, as shown in FIG. 18. Thus, in Step S65, only the coefficient generating chip 66 in the active mode receives the class code of the pixel of interest to be sent with the airwaves for signal processing by the class classification chip 65.

Figure 19:
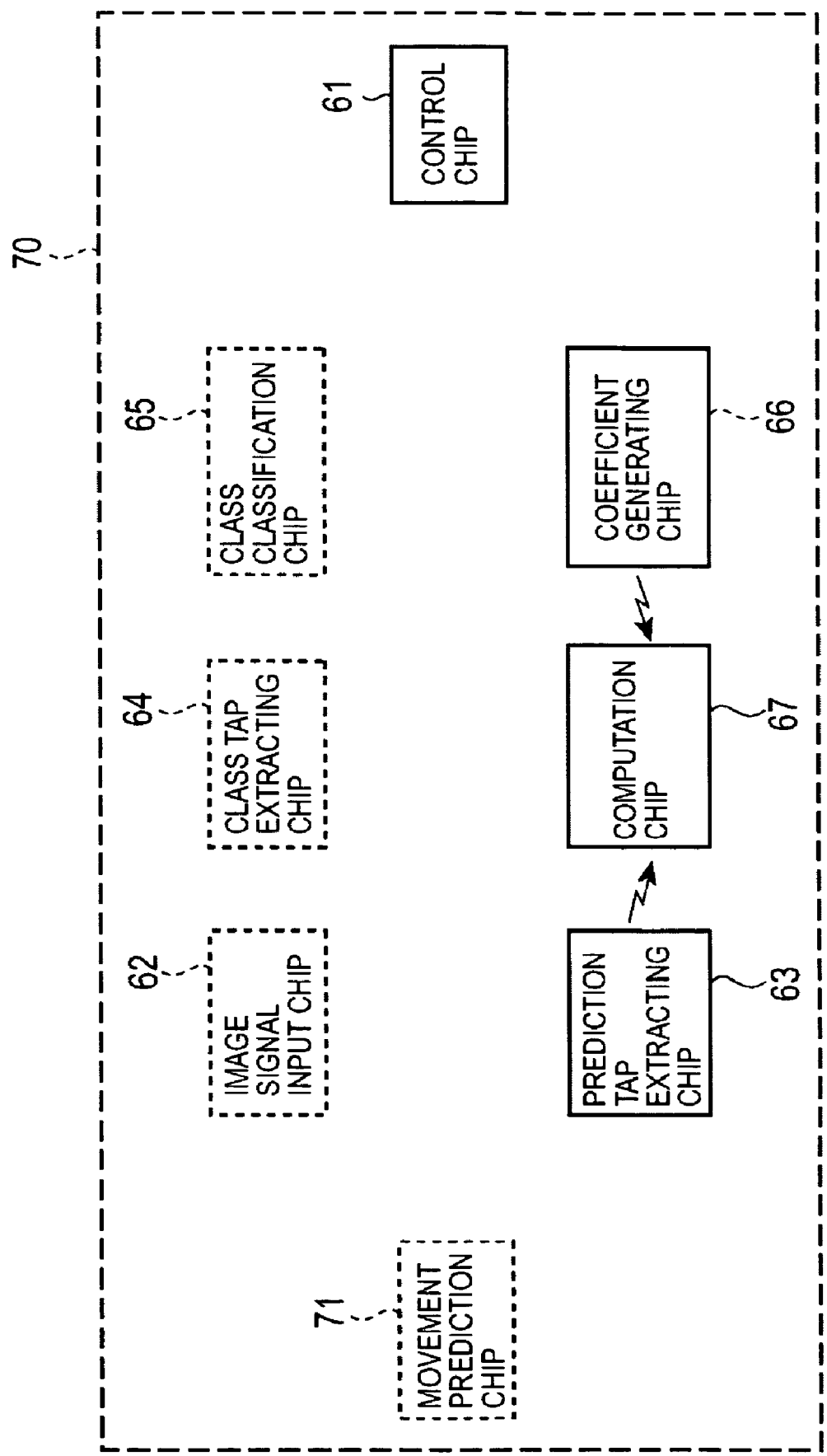
FIG. 19 is an explanatory diagram describing control of respective operating modes of the image signal input chip 62 through the computation chip 67, and the movement predicting chip 71.

When the processing in Step S66 of FIG. 14 is performed, the control chip 61 places the prediction tap extracting chip 63, coefficient generating chip 66, and computation chip 67, in the active mode, and places the other image signal input chip 62, class tap extracting chip 64, class classification chip 65, and movement prediction chip 71, in the sleep mode, as shown in FIG. 19. Thus, in Step S66, only the computation chip 67 in the active mode receives the prediction tap of the pixel of interest to be sent with the airwaves for signal processing by the prediction tap extracting chip 63 and the class tap coefficient of the pixel of interest to be sent with the airwaves for signal processing by the coefficient generating chip 66.

In this case, as described in FIGS. 7 through 12, if the prediction tap extracting chip 63 and coefficient generating chip 66 send the same airwaves for signal processing, interference occurs. In order to avoid this interference, the prediction tap extracting chip 63 and coefficient generating chip 66 preferably employ the airwaves for signal processing with a different carrier frequency, or the airwaves for signal processing with a spread spectrum method with a different spread coding. In addition, in order to avoid interference, it is necessary that, first, any one of the prediction tap extracting chip 63 and the coefficient generating chip 66 is set to the active mode, the others set to the sleep mode, and the semiconductor chip set to the active mode sends the airwaves for signal processing to the computation chip 67, following which the other of the prediction tap extracting chip 63 and coefficient generating chip 66 is set to the active mode, and the semiconductor chip set to the active mode sends the airwaves for signal processing to the computation chip 67.

As described above, while description has been made with regard to a case wherein the present invention is applied to a semiconductor chip, the present invention can be applied to a circuit board, for example. That is to say, the above description may be arranged wherein description corresponding to the semiconductor chip is substituted with the circuit board.

Figure 20A:
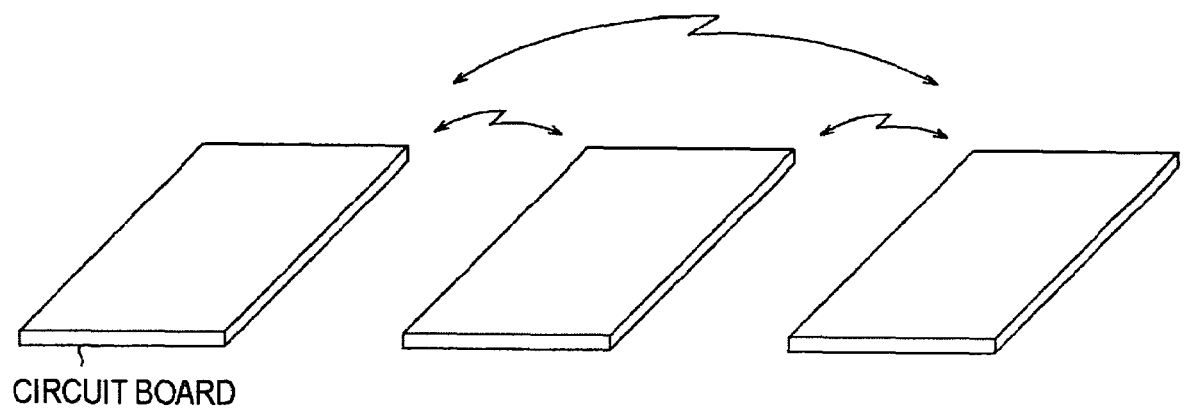
FIG. 20A is a perspective view illustrating a configuration example of an embodiment of a signal processing system made up of circuit boards to which the present invention is applied.

FIG. 20A illustrates a configuration example of another embodiment of the signal processing system to which the present invention is applied. In FIG. 20A, the signal processing system is configured with three circuit boards. Each circuit board is configured as with the semiconductor chip shown in FIG. 1 and FIG. 2, and the two circuit boards send and receive a signal with wireless communication.

Accordingly, even with the signal processing system in FIG. 20A, a function can be modified easily without restrictions due to wiring for exchanging signals between the two circuit boards as with the cases in FIG. 7 or 13.

Figure 20B:
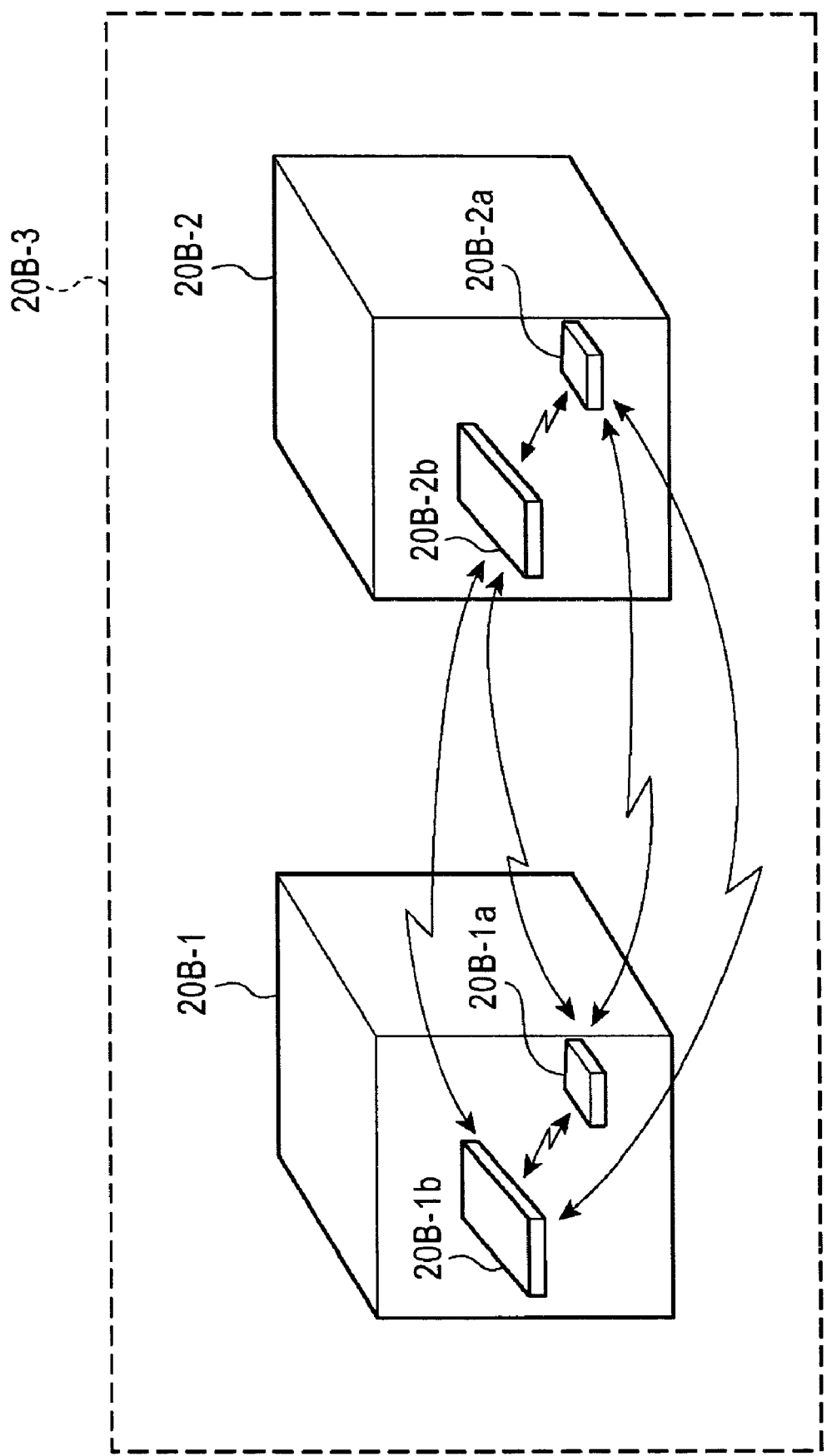
FIG. 20B is a perspective view illustrating a configuration example of an embodiment of a signal processing system made up of a signal processing apparatus to which the present invention is applied.

FIG. 20B is a configuration example of an embodiment of a signal processing system made up of a signal processing apparatus to which the present invention has been applied, illustrating a case wherein two pieces of electronic equipment are configured with the above-descried semiconductor chips and circuit boards. The signal processing apparatuses are configured with the semiconductor chips 20B-1a (20B-2a) and the circuit boards 20B-1b (20B2-b) shown in FIG. 20A. Exchange of signals (sending and receiving signals) within each apparatus and between the apparatuses is performed wirelessly.

Accordingly, with the signal processing system in FIG. 20B as well, a function can be modified easily without restrictions due to wiring for exchanging signals between the two circuit boards as with the cases in FIG. 7 or 13.

In the case wherein electronic equipment is configured with the above-described semiconductor chips or circuit boards, the function of each electronic equipment can be modified (upgraded) when such a plurality of electronic equipment is disposed close to each other. In other words, for example, the functions of a television receiver and VCR which are made up of semiconductor chips or circuit boards can be modified in the case that the television receiver and VCR are individually and separately disposed and in the case that the television receiver and VCR are disposed adjacent to each other.

Figure 21:
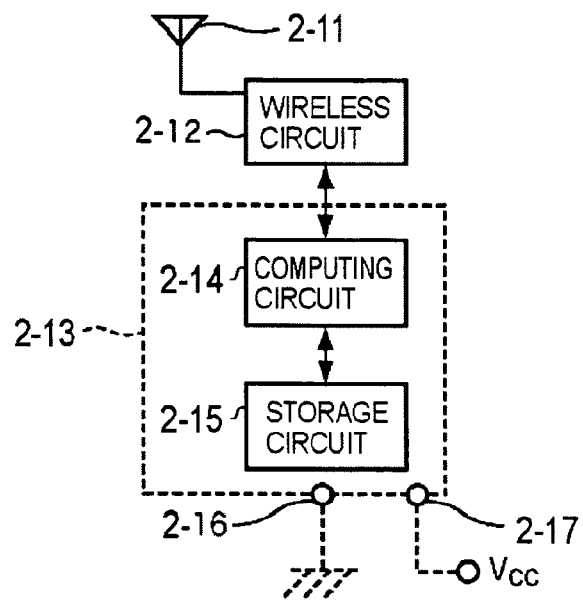
FIG. 21 is a block diagram illustrating a configuration example of an embodiment of an IC chip to which the present invention is applied.

FIG. 21 is a block diagram illustrating a function configuration example of the semiconductor chip to which the present invention is applied. In FIG. 21, the semiconductor chip comprises an antenna 2-11, wireless circuit 2-12, and signal processing circuit 2-13. The wireless circuit 2-12 and signal processing circuit 2-13 are configured on a 1-chip CMOS (Complementary Metal Oxide Semiconductor), for example. Accordingly, a semiconductor chip in FIG. 21 is a 1-chip IC (Integrated Circuit) or LSI (Large Scale Integration). Note that the antenna 2-11 may be configured on a CMOS as well.

With the semiconductor chip in FIG. 21, signal terminals (pins) for inputting and outputting a signal from or to the outside can be provided. However, the semiconductor chip according to the present embodiment does not include signal terminals except for an ground terminal 2-16 for connecting to the ground (ground) and a power supply terminal 2-17 for connecting to the power source Vcc. In other words, the semiconductor chip in FIG. 21 includes the ground terminal 2-16 and the power supply terminal 2-17 alone.

The antenna 2-11 receives a wireless signal (airwaves) sent externally, and supplies the corresponding received signal to the wireless circuit 2-12. Also, the antenna 2-11 sends a signal supplied from the wireless circuit 2-12 as airwaves. As for examples of the antenna 2-11, a loop antenna, stack antenna, or the like an arbitrary antenna may be employed. That is to say, the shape and kind of the antenna 2-11 is not restricted to any particular shape or kind.

The wireless circuit 2-12 performs wireless communication with the outside by means of electromagnetic waves. In other words, the wireless circuit 2-12 performs processing necessary for wireless communication such as the modulation of carriers and the like according to the signal supplied from the signal processing circuit 2-13, and supplies the modulated signal obtained as a result thereof to the antenna 2-11 so as to send this with airwaves (electromagnetic waves). Also, the wireless circuit 2-12 subjects the received signal (modulated signal), which are received with airwaves from the outside, supplied from the antenna 2-11 to the processing necessary for wireless communication such as demodulation and the like, and supplies the signal (demodulated signal) obtained as a result thereof to the signal processing circuit 2-13.

The signal processing circuit 2-13 subjects the signal supplied from the wireless circuit 2-12 to signal processing, and further, supplies the signal obtained as a result of the signal processing to the wireless circuit 2-12 as necessary.

The signal processing circuit 2-13 includes a computing circuit 2-14 and storage circuit 2-15.

The computing circuit 2-14 subjects the signal supplied from the wireless circuit 2-12 and the signal stored in the storage circuit 2-15 to predetermined signal processing, supplies the signal obtained as a result of the signal processing to the storage circuit 2-15 so as to store this, or supplies this to the wireless circuit 2-12 so as to send this as airwaves from the antenna 2-11. Also, the computing circuit 2-14 supplies the signal (data) stored in the storage circuit 2-15 to the wireless circuit 2-12 so as to send this as airwaves from the antenna 2-11.

The storage circuit 2-15 stores the signal necessary for the processing of the computing circuit 2-14 and so forth.

Note that the computing circuit 2-14 is made up of a logic circuit such as a NAND gate, or the other dedicated hardware, and predetermined signal processing can be performed by the dedicated hardware. Also, an arrangement may be made wherein the computing circuit 2-14 is made up of a processor (computer) capable of executing a program, and predetermined signal processing is performed by the processor executing the program.

In the event that the computing circuit 2-14 is made up of a processor, the program executed by the processor can be stored in the storage circuit 2-15 beforehand.

Alternatively, the program can be temporarily or eternally stored (recorded) in a removable recording medium such as a flexible disk, CD-ROM (Compact Disc Read Only Memory), MO (Magneto Optical) disk, DVD (Digital Versatile Disc), magnetic disk, semiconductor memory, and the like. Such a removable recording medium can be provided as so-called packaged software.

Note that the program is transferred to a semiconductor chip from a download site via a satellite for Digital Satellite Broadcasting, or a network such as a LAN (Local Area Network) or the Internet. The semiconductor chip receives the program thus transferred at the antenna 2-11, and can install the program in the storage circuit 2-15 via the wireless circuit 2-12 and computing circuit 2-14.

With the present specification, processing steps for describing the program for causing the computing circuit 2-14 to perform various processing are not always performed sequentially following the order described in a later-described flowchart, and processing executed in parallel or individually (for example, parallel processing or processing with an object) is also included.

Also, the program may be processed by the computing circuit 2-14 in FIG. 21, or may be processed separately by multiple computing circuits. Further, the program may be transferred to another computing circuit so as to execute the program.

The ground terminal 2-16 and power supply terminal 2-17 are terminals exposing outside of the package of the semiconductor chip, which are connected to the ground GND and the power source Vcc respectively.

Note that while the ground terminal 2-16 and power supply terminal 2-17 are connected to blocks necessary for configuring the semiconductor chip, the connection lines thereof are omitted in the drawing so as to prevent the drawing from becoming complicated.

With the semiconductor chip thus configured, airwaves are received at the antenna 2-11, and the received signal corresponding to the airwaves received at the antenna 2-11 is supplied to the signal processing circuit 2-13 via the wireless circuit 2-12. The signal processing circuit 2-13 subjects the received signal supplied via the wireless circuit 2-12 to signal processing. Furthermore, the signal processing circuit 2-13 supplies the signal obtained as a result of the signal processing to the antenna 2-11 via the wireless circuit 2-12 so as to send this with airwaves as necessary.

Figure 22:
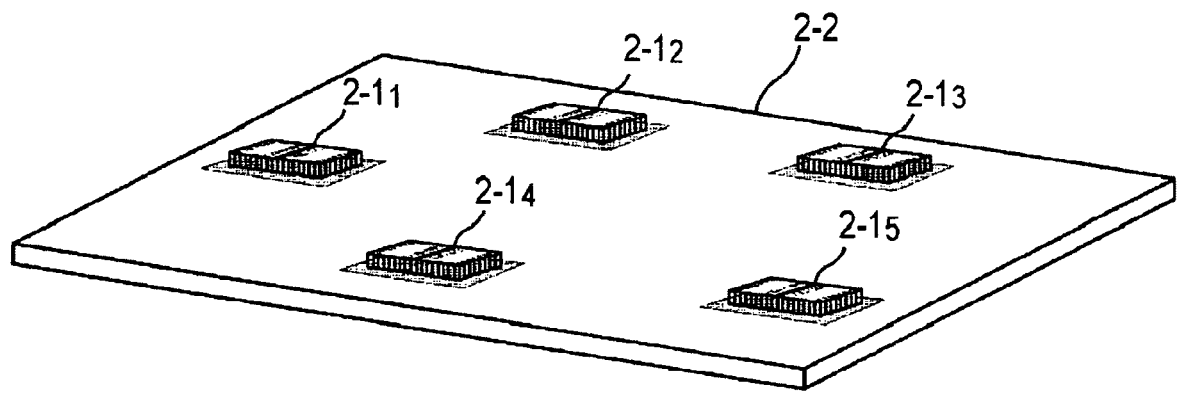
FIG. 22 is a perspective view illustrating a configuration example of an embodiment of a signal processing apparatus to which the present invention is applied.

FIG. 22 is a perspective view illustrating a configuration example of an embodiment of the signal processing apparatus to which the semiconductor chip in FIG. 21 is applied.

The signal processing apparatus in FIG. 22 is configured wherein five IC chips 2-11, 2-12, 2-13, 2-14, and 2-15 serving as multiple semiconductor chips are disposed on a connection board 2-2. Note that the other IC chips can be disposed on the connection board 2-2.

The IC chip $2\text{-}1_i$ ($i=1, 2, 3, 4, 5$) is configured as with the semiconductor chip described in FIG. 21. Accordingly, the IC chip $2\text{-}1_i$ includes the ground terminal 2-16 and power supply terminal 2-17. Furthermore, the IC chip $2\text{-}1_i$ is disposed on the connection board 2-2 such that the ground terminal 2-16 and power supply terminal 2-17 are connected to an arbitrary set of the ground terminal and power supply terminal provided on the connection board 2-2 respectively.

In other words, multiple sets of the ground terminal and power supply terminal (not shown) are provided on the connection board 2-2. Furthermore, the IC chip $2\text{-}1_i$ is disposed on the connection board 2-2 such that the ground terminal 2-16 and power supply terminal 2-17 are connected to an arbitrary set of the ground terminal and power supply terminal provided on the connection board 2-2 respectively.

Accordingly, the IC chip $2\text{-}1_i$ should be disposed such that the ground terminal 2-16 and power supply terminal 2-17 are the ground terminal and power supply terminal on the connection board 2-2, thereby facilitating mounting and detaching thereof. Furthermore, the IC chip $2\text{-}1_i$ has only the two terminals to be connected to the connection board 2-2, i.e., the ground terminal 2-16 and power supply terminal 2-17, whereby the IC chip $2\text{-}1_i$ can be disposed on the connection board 2-2 with high degree of freedom.

The IC chips $2\text{-}1_1$ through $2\text{-}1_5$ each provide a predetermined function by the signal processing circuit 2-13 performing predetermined signal processing. With the respective IC chips $2\text{-}1_1$ through $2\text{-}1_5$, the functions provided by the signal processing circuit 13 may be one function or multiple functions. The functions supplied by the respective IC chips $2\text{-}1_1$ through $2\text{-}1_5$ depend on the program installed in the storage circuit 15, for example.

With the signal processing system in FIG. 22, a predetermined function is provided by sending and receiving a signal to be required in the two or more IC chips of the five IC chips $2\text{-}1_1$ through $2\text{-}1_5$ with airwaves and performing signal processing.

In other words, the IC chip $2\text{-}1_i$ selects (switches) a first communication for performing wireless communication with all of the other IC chips $2\text{-}1_j$ (j being any one of 1 through 5 except for the value of i) at the same time without restricting communication parties, or a second communication for performing wireless communication with restricting communication parties among the other IC chips $2\text{-}1_j$, thereby providing a predetermined function as the entire signal processing system made up of the IC chips $2\text{-}1_1$ through $2\text{-}1_5$.

Here, with the first communication performed by the IC chip $2\text{-}1_i$, wireless communication with all of the other IC chips $2\text{-}1_j$ is performed simultaneously, and accordingly, sending and receiving a signal is performed in a so-called broadcasting mode. On the other hand, with the second communication, wireless communication is performed with restricting communication parties, and accordingly, sending and receiving a signal is performed in a so-called communicatory mode. According to the IC chip $2\text{-}1_i$, sending and receiving a signal is performed with a new communication mode for switching the first communication in the broadcasting mode and the second communication in the communicatory mode.

According to the first communication, the IC chip $2\text{-}1_i$ sends a signal to all of the other IC chips $2\text{-}1_j$ at the same time, and all of the other IC chips $2\text{-}1_j$ can receive the signal from the IC chip $2\text{-}1_i$ at the same time. Also, according to the second communication, the IC chip $2\text{-}1_i$ sends a signal to the required IC chips of the other IC chips $2\text{-}1_j$ at the same time, and only the required IC chips of the other IC chips $2\text{-}1_j$ can receive the signal from the IC chip $2\text{-}1_i$ at the same time.

In other words, according to the first communication, the IC chip $2\text{-}1_i$ can send a command for instructing the signal processing to be performed by each IC chip to all of the other IC chips $2\text{-}1_j$. Furthermore, according to the second communication, only the IC chips $2\text{-}1_j$ requiring a signal from the IC chip $2\text{-}1_i$, i.e., for example, only the IC chips $2\text{-}1_j$ for subjecting a signal from the IC chip $2\text{-}1_i$ to signal processing can receive the signal.

There is no need to perform signal processing or sending and receiving a signal while synchronizing the certain IC chip $2\text{-}1_i$ with the other IC chips $2\text{-}1_j$. In other words, the certain IC chip $2\text{-}1_i$ and the other IC chips $2\text{-}1_j$ can operate asynchronously (without a clock for synchronization).

Furthermore, the IC chip $2\text{-}1_i$ exchanges (sends and receives) a signal necessary for signal processing with wireless communication, thereby easily handling any upgrade such as a case wherein the number of signals to be exchanged with the other IC chips $2\text{-}1_j$ is reduced, or a case wherein the signal thereof varies (for example, the signal to be exchanged changes from an audio signal having relatively small amount of data).

Next, with the signal processing apparatus in FIG. 22, a certain IC chip $2\text{-}1k$ ($k=1, 2,$ and so on) can be easily disposed on the connection board 2-2, and further, signals can be sent and received with the first or second communication between the IC chip $2\text{-}1k$ and the other IC chips $2\text{-}1_j$ disposed on the connection board 2-2. Accordingly, the user can easily modify the functions of the entire signal processing apparatus by disposing a new IC chip $2\text{-}1k$ on the connection board 2-2, replacing the IC chip $2\text{-}1_i$ disposed on the connection board 2-2 with another IC chip $2\text{-}1k$, removing the IC chip $2\text{-}1_i$, or the like.

Briefly speaking, the user can add the function of the IC chip $2\text{-}1k$ to the functions of the signal processing apparatus by disposing a new IC chip $2\text{-}1k$ on the connection board 2-2.

More specifically, with the signal processing apparatus, in the case that the function as a decoder for MPEG streams is provided by the IC chips $2\text{-}1_1$ through $2\text{-}1_5$ already disposed on the connection board 2-2 for example, upon an IC chip for providing the function as a filter for reducing block distortion as a result of decoding of MPEG streams being newly disposed, the signal processing apparatus can decode the MPEG streams so as to reduce the block distortion as a result of the decoding.

In this case, with the signal processing apparatus, the function to be provided by the IC chip newly disposed on the connection board 2-2 is added to the original functions. In other words, the functions of the signal processing apparatus are modified (added) by the function provided by the IC chip newly disposed on the connection board 2-2.

Examples of modifying the functions of the signal processing apparatus include a method for modifying the functions of the signal processing apparatus by the function to be provided by the IC chip newly disposed, and a method for modifying the entire signal processing apparatus by the functions of the IC chips $2\text{-}1_1$ through $2\text{-}1_5$ already disposed on the connection board 2-2 changing according to the function to be provided by the IC chip newly disposed.

With the signal processing apparatus, in the case that an IC chip is newly disposed on the connection board 2-2, functions exceeding the functions obtained by simply adding the functions of the IC chips $2\text{-}1_1$ through $2\text{-}1_5$ already disposed on the connection board 2-2 with the function of the new IC chip can be provided.

That is to say, with the signal processing apparatus, the entire signal processing apparatus can be modified such that the functions of the IC chips $2\text{-}1_1$ through $2\text{-}1_5$ already disposed on the connection board 2-2 are changed according to the available function provided by the IC chip newly disposed, so as to speak, such that the IC chip newly disposed and the IC chips $2\text{-}1_1$ through $2\text{-}1_5$ already disposed collaborate on sharing signal processing.

As described above, in the case that collaboration on sharing signal processing is performed with the multiple IC chips disposed on the connection board 2-2, a large variety of functions can be modified.

Note that such a modification of the signal processing apparatus can be performed in the case that an IC chip is removed from the connection board 2-2, in the case that an IC chip disposed on the connection board 2-2 is replaced with another IC chip, in the case that a modification occurs regarding an IC chip disposed on the connection board 2-2, as well as the case wherein an IC chip is newly disposed on the connection board 2-2.

Now, as described above, a function manual, which describes the functions of the IC chip $2\text{-}1_i$, the functions to be realized with the IC chip $2\text{-}1_i$ and other one or more IC chips, and further, information such as a model number for identifying other one or more IC chips necessary for realizing the function, can be packed with the IC chip $2\text{-}1_i$. The user can obtain the desired function by referring to the function manual, preparing for the IC chips necessary for the desired function, and disposing the IC chips on the connection board 2-2.

Also, the function to be provided by an IC chip on the connection board 2-2 can be displayed on a monitor (not shown) or the like provided on the connection board 2-2. Furthermore, in the event that there are the multiple functions to be provided, an arrangement may be made wherein the user selects one of the multiple functions, and then the selected function can be provided.

With the first communication, communication parties are not restricted, and accordingly, the IC chip $2\text{-}1_i$ should perform communication such that all of the other IC chips $2\text{-}1_j$ can receive a signal. In other words, for example, a communication method (for example, the modulation method of signals, the frequency of carriers, and the like) is determined beforehand, and the IC chip $2\text{-}1_i$ should perform communication following the method.

On the other hand, the second communication is performed while restricting communication parties, and accordingly, there is the need to employ some kind of a method for restricting parties, which will become the communication parties of the IC chip $2\text{-}1_i$, among the other IC chips $2\text{-}1_j$.

Examples of the method for restricting communication parties include a method employing frequency division.

Figure 23:
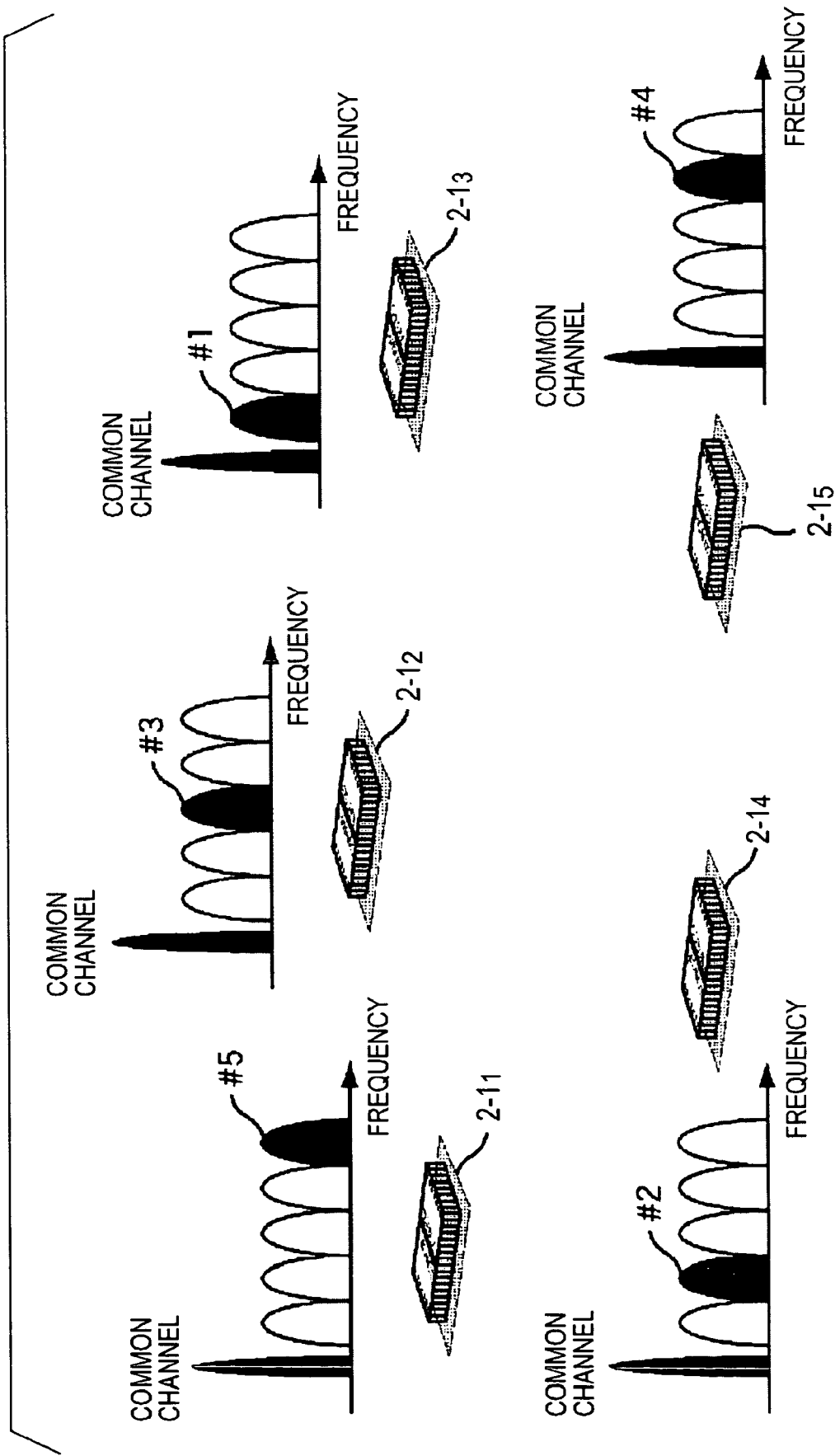
FIG. 23 is a diagram illustrating a scene wherein frequency division multiplex method communication is performed.

FIG. 23 schematically illustrates the scene wherein communication is performed with a frequency division multiplex method in each of the IC chips $2\text{-}1_1$ through $2\text{-}1_5$.

With the embodiment in FIG. 23, the frequency band assigned for communication performed by the IC chips $2\text{-}1_1$ through $2\text{-}1_5$ is divided into six frequency bands (hereinafter, referred to as channels as appropriate). One of the six channels is assigned to a common channel serving as a channel for performing the first communication. The rest five channels #1, #2, #3, #4, and #5 of the six channels are assigned to channels for performing the second communication.

Note that the channels for performing the second communication are not restricted to five channels.

In the case of performing the first communication, the IC chip $2\text{-}1_i$ sends or receives a signal with the common channel.

On the other hand, in the case of performing the second communication, the IC chip $2\text{-}1_i$ sets any one of the five channels #1 through #5 as the channel for performing the second communication, and then sends a signal with the set channel (hereinafter, referred to as "setting channel" as appropriate). Thus, communication parties are restricted at the second communication.

In other words, since the IC chip $2\text{-}1_i$, which attempts to send a signal with the second communication, sends the signal with a certain setting channel, the other IC chips $2\text{-}1_j$ serving as communication parties capable of receiving the signal are restricted to the IC chips which attempt to receive the setting channel.

Here in FIG. 23, the channels set for the respective IC chips $2\text{-}1_1$ through $2\text{-}1_5$ performing the second communication are illustrated with shading. That is to say, in FIG. 23, the channels #5, #3, #1, #2, and #4 are set as the setting channel for the respective IC chips $2\text{-}1_1$ through $2\text{-}1_5$ performing the second communication.

Accordingly, the IC chip $2\text{-}1_1$ can send a signal with the channel #5 serving as the setting channel to the other IC chip not shown in the drawing without interference with the signals to be sent from the other IC chips $2\text{-}1_2$ through $2\text{-}1_5$, and the other IC chip not shown in the drawing can receive the signal from the IC chip $2\text{-}1_1$. This is the same in the case of the other respective IC chips $2\text{-}1_2$ through $2\text{-}1_5$.

Note that the IC chip $2\text{-}1_1$ cannot send signals with the channel #5 serving as the setting channel but receive signals. This is the same in the case of the other respective IC chips $2\text{-}1_2$ through $2\text{-}1_5$.

Also, a fixed channel serving as a channel which can be set as the setting channel, can be assigned to the respective IC chips $2\text{-}1_1$ through $2\text{-}1_5$ disposed on the connection board 2-2 beforehand. Furthermore, an arrangement may be made wherein the setting channel can be selected from the channels not in use of the channels assigned as the channel for performing the second communication as to the respective IC chips $2\text{-}1_1$ through $2\text{-}1_5$ disposed on the connection board 2-2.

Next, with the respective IC chips $2\text{-}1_1$ through $2\text{-}1_5$ in FIG. 22, for example, the certain one or more IC chips $2\text{-}1_i$ become clients for requesting signal processing, the other one or more IC chips $2\text{-}1_j$, which accepts the request, become undertakers, and then the requested signal processing is performed.

Note that the IC chip $2\text{-}1_j$, which has become an undertaker, can further become a client for requesting the signal processing of the signal obtained as a result of the own signal processing to the other IC chips $2\text{-}1_{j'}$.

For example, upon the user operating the operating panel not shown in the drawing to instruct the start of signal processing, the certain one or more IC chips $2\text{-}1_i$ become the first client.

Figure 24:
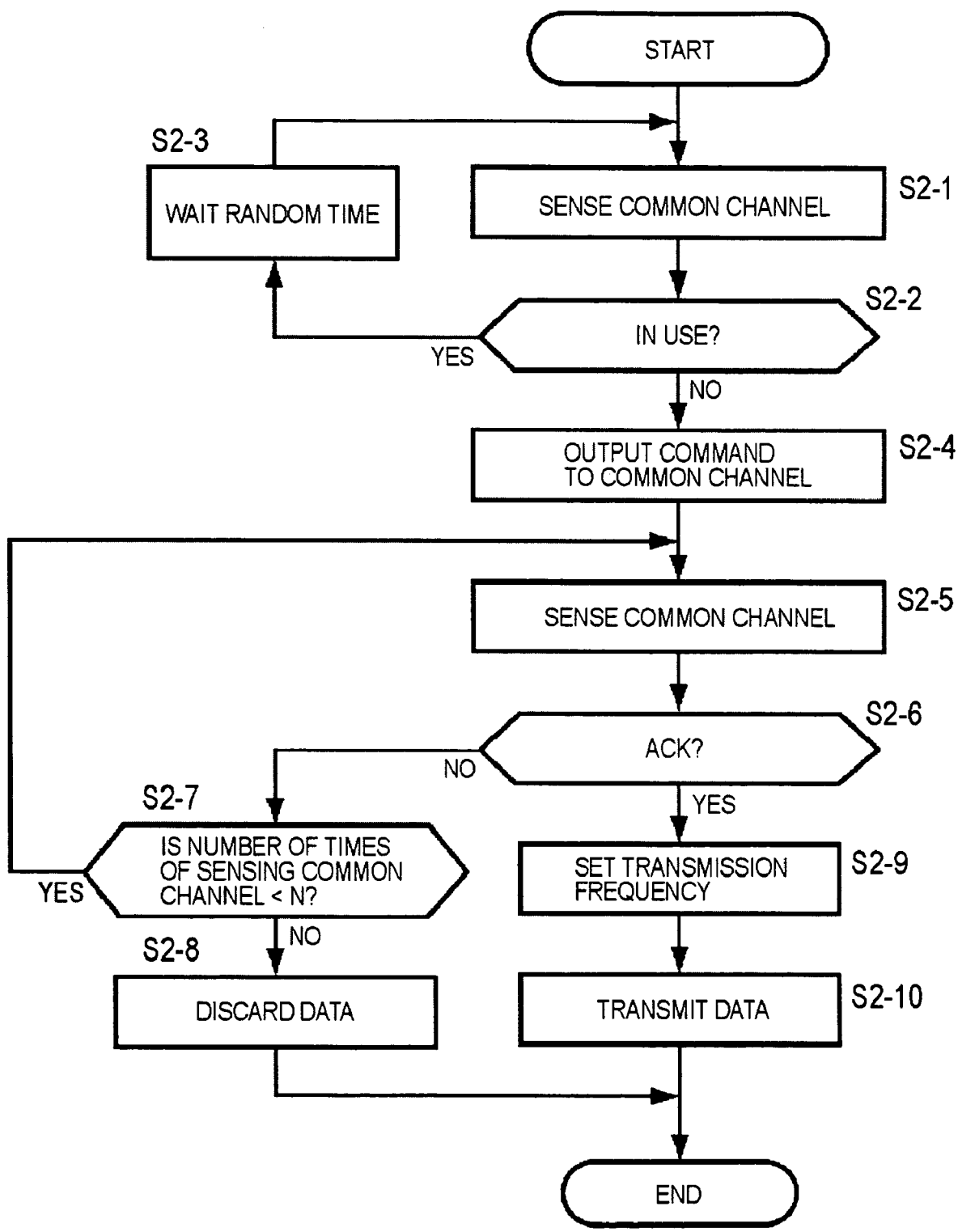
FIG. 24 is a flowchart describing the processing of an IC chip $1_i$ in a case wherein frequency division multiplex method communication is performed.

FIG. 24 is a flowchart for describing the processing performed by the client IC chip $2\text{-}1_i$ in the case that communication parties are restricted with frequency division in the second communication.

In Step S2-1, first, the client IC chip $2\text{-}1_i$ senses the common channel. That is to say, in Step S2-1, the antenna 2-11 of the client IC chip $2\text{-}1_i$ receives airwaves, and supplies the received signal to the wireless circuit 2-12. The wireless circuit 2-12 extracts the signal of the common channel of the received signal from the antenna 2-11, and supplies this to the computing circuit 2-14 of the signal processing circuit 2-13. Subsequently, the flow proceeds to Step S2-2 from Step S2-1, where the computing circuit 2-14 determines whether or not the common channel is used by the other IC chip, i.e., whether or not the first communication with the common channel is performed by the other IC chips based on the signal of the common channel from the wireless circuit 2-12.

In the event that determination is made that the common channel is used in Step S2-2, the flow proceeds to Step S2-3, where the computing circuit 2-14 awaits for time of period corresponding to random time, the flow returns to Step S2-1, subsequently the same processing is repeated. In other words, in the event that the common channel is used by the other IC chip, the client IC chip 2-1$_i$ repeats the processing in Steps S2-1 through S2-3, thereby waiting until the common channel is released.

On the other hand, in the case that determination is made that the common channel is not used in Step S2-2, the flow proceeds to Step S2-4, where the client IC chip 2-1$_i$ sends the signal for instructing signal processing to be requested to the other one or more IC chips 2-1$_j$, i.e., the command for controlling signal processing in the IC chips 2-1$_j$, with the common channel.

In other words, with the client IC chip 2-1$_i$, the computing circuit 2-14 generates data (hereinafter, referred to as "request data" as appropriate) in which the command for instructing signal processing to be requested to the one or more IC chips 2-1$_j$ respectively is disposed, and supplies this to the wireless circuit 2-12. The wireless circuit 2-12 modulates the request data from the computing circuit 2-14 to the signal of the common channel, and supplies this to the antenna 2-11 so as to emit.

The signal of the common channel sent from the client IC chip 2-1$_i$ in Step S2-4 is received by all of the IC chips on the connection board 2-2.

Figure 25:
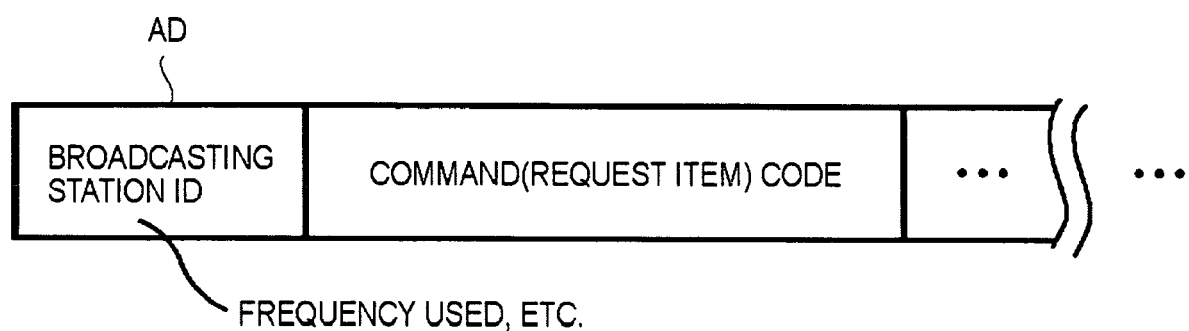
FIG. 25 is a diagram illustrating the flowchart of request data.

FIG. 25 illustrates the format of the request data AD to be sent with the common channel by the client IC chip 2-1$_i$ in Step S2-4.

In FIG. 25, a broadcasting station ID (Identification) is disposed at the head of the request data AD. The broadcasting station ID includes at least the information (for example, the frequency of carriers) of the channel used for performing the second communication for sending or receiving the signal to be subjected to signal processing with the one or more IC chips serving as a undertaker. In other words, the client IC chip 2-1$_i$ sets the channel used for the second communication, and includes the set channel (setting channel) information in the broadcasting station ID.

Note that the ID for identifying the IC chip 2-1$_i$ serving as a transmitter for sending the request data AD may be included in the broadcasting station ID as well as the setting channel information, for example.

With the request data AD, a command code representing one or more commands is disposed following the broadcasting station ID. In other words, the command code corresponding to the signal processing to be requested to the other one or more IC chips 2-1$_j$ respectively by the client IC chip 2-1$_i$ is sequentially disposed following the broadcasting station ID.

Now let us return to FIG. 24. The client IC chip 2-1$_i$ sends the request data AD in Step S2-4, and then the flow proceeds to Step S2-5, where the client IC chip 2-1$_i$ senses the common channel in the same way in the case in Step S2-1, and then the flow proceeds to Step S2-6.

In Step S2-6, the client IC chip 2-1$_i$ determines whether or not an acknowledge ACK serving as a response corresponding to the request data AD sent in Step S2-4 has been sent with the common channel based on the sensing results in Step S2-5.

In other words, the IC chip 2-1$_j$, which has received the request data AD, determines whether or not the signal processing instructed by the command included in the request data AD can be performed, and the like, as described later. In the case that the processing can be performed, the IC chip 2-1$_j$ sends an acknowledge ACK serving as a response for accepting the request of the signal processing with the common channel. In Step S2-6, determination is made whether or not the acknowledge ACK is thus sent.

In Step S2-6, in the case that determination is made that the acknowledge ACK necessary for performing the signal processing corresponding to all of the commands included in the request data AD is not sent, the flow proceeds to Step S2-7, where the computing circuit 2-14 of the client IC chip 2-1$_i$ determines whether or not the number of times of sensing the common channel in Step S2-5 is below (equal to or less than) a predetermined threshold N. In Step S2-7, in the event that determination is made that the number of times of sensing the common channel is below a predetermined threshold N, the flow returns to Step S2-5, subsequently the same processing is repeated.

Also, in Step S2-7, in the event that determination is made that the number of times of sensing the common channel is not below a predetermined threshold N, i.e., in the event that the acknowledge ACK necessary for performing signal processing cannot be obtained from the other IC chips 2-1$_j$ even if the channel is sensed N times, the flow proceeds to Step S2-8, where the computing circuit 2-14 of the client IC chip 2-1$_i$, in the event that the signal (data) to be subjected to signal processing is stored in the storage circuit 2-15 for example, discards the signal, or abandons the acknowledges ACK previously received, and the processing ends.

On the other hand, in the event that determination is made in Step S2-6 that the necessary acknowledge ACK is sent, i.e., the acknowledge ACK corresponding to the request data AD is sent with the common channel from the one or more IC chips 2-1$_j$ which can perform the signal processing corresponding to the command included in the request data AD, the signal of the common channel is received at the antenna 2-11 of the client IC chip 2-1$_i$, and is supplied to the computing circuit 2-14 of the signal processing circuit 2-13 via the wireless circuit 2-12, the flow proceeds to Step S2-9, the computing circuit 2-14 of the client IC chip 2-1$_i$ sets the frequency of carriers (transmission frequency) for sending a signal to the frequency of the setting channel represented by the broadcasting station ID included in the request data sent in Step S2-4 by controlling the wireless circuit 2-12.

Subsequently, the flow proceeds to Step S2-10 from Step S2-9, where the client IC chip 2-1$_i$ performs the second communication for sending the signal to be subjected to the signal processing corresponding to the command included in the request data AD with the channel (setting channel) set in Step S2-9, and the processing ends.

In other words, with the client IC chip 2-1$_i$, the computing circuit 2-14, for example, reads out the signal to be subjected to the signal processing corresponding to the command included in the request data AD from the storage circuit 2-15, and supplies this to the wireless circuit 2-12. The wireless circuit 2-12 modulates the signal from the computing circuit 2-14 to the signal of the setting channel represented by the broadcasting station ID included in the request data AD, and emits this from the antenna 2-11 as airwaves.

The signal of the setting channel sent by the client IC chip 2-1$_i$ in Step S2-10 is received by only the IC chips, which sent the acknowledge ACK corresponding to the request data, of the other IC chips.

Figure 26:
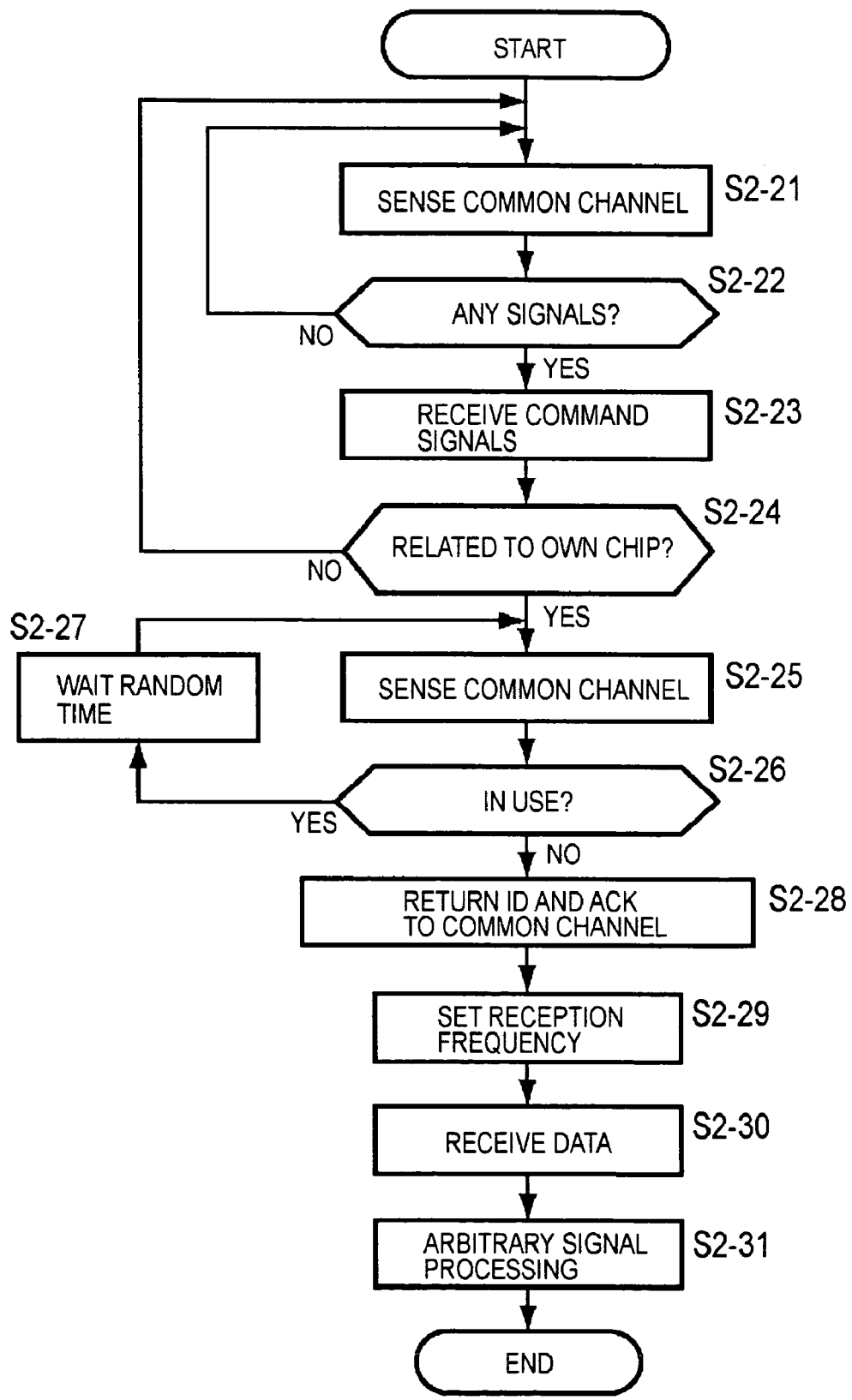
FIG. 26 is a flowchart describing the processing of an IC chip $1_j$ in a case wherein frequency division multiplex method communication is performed.

Next, FIG. 26 is a flowchart for describing the processing performed by the other IC chip 2-1$_j$ of the client IC chip 2-1$_i$, i.e., the undertaker-candidate IC chip 2-1$_j$ in the case that communication parties are restricted with frequency division in the second communication.

The undertaker-candidate IC chip $2\text{-}1_j$, first, senses the common channel in Step S2-21. In other words, in Step S2-21, the antenna 2-11 of the undertaker-candidate IC chip $2\text{-}1_j$ receives airwaves, and the received signal is supplied to the wireless circuit 2-12. The wireless circuit 2-12 extracts the signal of the common channel of the received signal from the antenna 2-11, and supplies this to the computing circuit 2-14 of the signal processing circuit 2-13. Subsequently, the flow proceeds to Step S2-22 from Step S2-21, where the computing circuit 2-14 determines whether or not there is a signal sent by the other IC chip, i.e., the client IC chip $2\text{-}1_i$ in the common channel based on the signal of the common channel from the wireless circuit 2-12.

In Step S2-22, in the case that determination is made that there is no signal in the common channel, the flow returns to Step S2-21, subsequently the same processing is repeated. In other words, the undertaker-candidate IC chip $2\text{-}1_j$ is in a standby state until the signal of the common channel is sent from the client IC chip $2\text{-}1_i$.

Note that description has been made regarding an arrangement wherein the undertaker-candidate IC chip $2\text{-}1_j$ senses the common channel all the time. However, with the wireless circuit 2-12 of the undertaker-candidate IC chip $2\text{-}1_j$, a squelch circuit for cutting or passing the received signal from the antenna 2-11 based on the reception intensity of airwaves may be employed. In other words, with the wireless circuit 2-12 of the undertaker-candidate IC chip, an arrangement may be made wherein the received signal from the antenna 2-11 is not output to the computing circuit 2-14 in the event that the reception intensity of airwaves of the common channel is equal to or less than (below) a predetermined threshold, and the received signal from the antenna 2-11 is output to the computing circuit 2-14 in the event that the reception intensity of airwaves of the common channel is greater than (equal to or greater than) a predetermined threshold.

In the event that determination is made that there is a signal in the common channel in Step S2-22, the flow proceeds to Step S2-23, the undertaker-candidate IC chip $2\text{-}1_j$ receives the request data sent with the common channel by the client IC chip $2\text{-}1_i$ in Step S2-4. In other words, with the undertaker-candidate IC chip $2\text{-}1_j$, airwaves are received at the antenna 2-11, and the received signal is supplied to the wireless circuit 2-12. The wireless circuit 2-12 extracts the signal of the common channel of the received signals from the antenna 2-11, i.e., in this case, the request data from the client IC chip $2\text{-}1_i$, and supplies this to the computing circuit 2-14 of the signal processing circuit 2-13.

Subsequently, the flow proceeds to Step S2-24 from Step S2-23, where with the undertaker-candidate IC chip $2\text{-}1_j$, the computing circuit 2-14 determines whether or not the command included in the request data from the client IC chip $2\text{-}1_i$ is related to itself, i.e., whether or not the signal processing corresponding to the command included in the request data can be performed, for example.

Here, with the respective IC chips $2\text{-}1_1$ through $2\text{-}1_5$ disposed on the connection board 2-2, the storage circuit 2-15 thereof stores a command LUT (Look Up Table) in which a command (command code) is correlated with the contents of the signal processing (task) represented by the command, as shown in FIG. 27, for example. The computing circuit 2-14 recognizes the signal processing corresponding to the command (command code) included in the request data by referring to the command LUT, and determines whether or not the signal processing can be performed.

In the event that determination is made in Step S2-24 that the signal processing corresponding to the command included in the request data from the client IC chip $2\text{-}1_i$ cannot be performed, i.e., in the event that the IC chip does not include the function for performing the signal processing corresponding to the command included in the request data, the flow returns to Step S2-21, subsequently the same processing is repeated.

On the other hand, in the event that determination is made in Step S2-24 that the signal processing corresponding to the command (any one of the commands) included in the request data from the client IC chip $2\text{-}1_i$ can be performed, the undertaker-candidate IC chip $2\text{-}1_j$ performs the signal processing corresponding to the command included in the request data from the client IC chip $2\text{-}1_i$, so as to speak, becomes a formal undertaker, and the flow proceeds to Step S2-25, and subsequently the processing for performing the signal processing is performed.

Here, an arrangement may be made wherein the undertaker-candidate IC chip $2\text{-}1_j$ determines whether or not the signal processing corresponding to the command included in the request data from the client IC chip $2\text{-}1_i$ in Step S2-24, and also determines whether or not the signal processing should be performed by itself. In this case, only in the case that the undertaker-candidate IC chip $2\text{-}1_j$ can perform the signal processing corresponding to the command included in the request data from the client IC chip $2\text{-}1_i$, and also the signal processing should be performed by itself, the flow proceeds to Step S2-25 from Step S2-24, otherwise, the flow returns to Step S2-21 from Step S2-24.

The determination whether or not the signal processing corresponding to the command included in the request data from the client IC chip $2\text{-}1_i$ should be performed by the undertaker-candidate IC chip $2\text{-}1_j$, may be made by providing a thermal sensor in the IC chip $2\text{-}1_j$, based on the temperature detected by the thermal sensor, for example.

In other words, for example, the IC chip $2\text{-}1_j$ detects the temperature of the surrounding IC chips with the thermal sensor. In the event that the temperature of the surrounding IC chips is high, determination is made that processing with heavy loading is being performed in the surrounding IC chips, so the signal processing corresponding to the command included in the request data from the client IC chip $2\text{-}1_i$ should be performed by itself to prevent the surrounding IC chips from further loading.

Alternatively, an arrangement may be made wherein the IC chip $2\text{-}1_j$ detects the own temperature with the thermal sensor, and in the event that the temperature is high, determination is made that processing with heavy loading is being performed, so the signal processing corresponding to the command included in the request data from the client IC chip $2\text{-}1_i$ should not be performed by itself to prevent further loading. On the other hand, in the event that the temperature detected by the thermal sensor is low, determination is made that loading is light, so the signal processing corresponding to the command included in the request data from the client IC chip $2\text{-}1_i$ should be performed by itself.

In Step S2-25, the IC chip $2\text{-}1_j$, which has become an undertaker, senses the common channel. In other words, in Step S2-25, the antenna 2-11 of the IC chip $2\text{-}1_j$ receives airwaves, and the received signal is supplied to the wireless circuit 2-12. The wireless circuit 2-12 extracts the signal of the common channel of the received signals from the antenna 2-11, and supplies this to the computing circuit 2-14 of the signal processing circuit 2-13. Subsequently, the flow proceeds to Step S2-26 from Step S2-25, where the computing circuit 2-14 determines whether or not the common channel is used by the other IC chip based on the signal of the common channel from the wireless circuit 2-12.

In the event that determination is made in Step S2-26 that the common channel is used, the flow proceeds to Step S2-27, where the computing circuit 2-14 awaits for time of period corresponding to random time, the flow returns to Step S2-25, following which the same processing is repeated. In other words, in the event that the common channel is used by another IC chip, the IC chip 2-1$_j$, which has become an undertaker, repeats the processing in Step S2-25 through S2-27, thereby awaiting until the common channel is released.

In the event that determination is made in Step S2-26 that the common channel is not being used, the flow proceeds to Step S2-28, where the IC chip 2-1$_j$, which has become an undertaker, sends an acknowledge ACK serving as a response corresponding to the request data from the client IC chip 2-1$_i$ with the common channel.

In other words, with the undertaker IC chip 2-1$_j$, the computing circuit 2-14 generates an acknowledge ACK serving as a response corresponding to the request data from the client IC chip 2-1$_i$, and supplies this to the wireless circuit 2-12. The wireless circuit 2-12 modulates the acknowledge ACK from the computing circuit 2-14 to the signal of the common channel, and supplies this to the antenna 2-11 so as to emit.

The signal of the common channel to be sent by the undertaker IC chip 2-1$_j$ in Step S2-28 is received by all of the other IC chips on the connection board 2-2. However, only the client IC chip 2-1$_i$ receives and processes the signal of the common channel, and the other IC chips do not perform any processing.

As for the format of the acknowledge ACK to be sent by the IC chip 2-1$_j$, which has become an undertaker, the same format as the format of the request data to be sent by the client IC chip 2-1$_i$ may be employed, for example.

In this case, the broadcasting station ID including the setting channel included in the broadcasting station ID disposed on the head of the request data is disposed on the head of the acknowledge ACK. Furthermore, the command (command code) corresponding to the signal processing to be performed by the IC chip 2-1$_j$, which has become an undertaker, is disposed following the broadcasting station ID. Note that an arrangement may be made wherein an ID for identifying the IC chip 2-1$_j$, which has become an undertaker, is included in the broadcasting station ID disposed on the head of the acknowledge ACK as well as the information of the setting channel.

Following the undertaker IC chip 2-1$_j$ sending the acknowledge ACK in Step S2-28, the flow proceeds to Step S2-29, where the computing circuit 2-14 sets the frequency (reception frequency) of carriers to be received to the frequency of the setting channel represented by the broadcasting station ID included in the request data received in Step S2-23 by controlling the wireless circuit 2-12.

In other words, thus, the same channel is set between the client IC chip 2-1$_i$ and undertaker IC chip 2-1$_j$ as a channel for sending and receiving the signal to be subjected to signal processing, thereby enabling the second communication.

Note that the IC chip to become an undertaker is not restricted to one chip, and in some cases, multiple chips may become undertakers. In the case that the number of the IC chips to become an undertaker is more than one, the same channel is set between the multiple undertaker IC chips and the client IC chip 2-1$_i$ as a channel for sending and receiving the signal to be subjected to signal processing. Consequently, the signal to be subjected to signal processing to be sent by the client IC chip 2-1$_i$ is received by the IC chip alone, which has become an undertaker.

Following the undertaker IC chip 2-1$_j$ performing the processing in Step S2-29, the flow proceeds to Step S2-30, where the undertaker IC chip 2-1$_j$ receives the signal to be subjected to signal processing to be sent with the setting channel by the client IC chip 2-1$_i$ in Step S2-10 in FIG. 24, and the flow proceeds to Step S2-31. In other words, with the undertaker IC chip 2-1$_j$, airwaves are received at the antenna 2-11, and the received signal is supplied to the wireless circuit 2-12. The wireless circuit 2-12 extracts the signal of the setting channel of the received signals from the antenna 2-11, i.e., in this case, the signal to be subjected to signal processing from the client IC chip 2-1$_i$, and supplies this to the computing circuit 2-14 of the signal processing circuit 2-13.

In Step S2-31, the computing circuit 2-14 of the undertaker IC chip 2-1$_j$ subjects the signal received in Step S2-30 to the signal processing corresponding to the command included in the acknowledge ACK in Step S2-28, stores the results of the signal processing in the storage circuit 2-15 as necessary, and the processing ends.

Note that the undertaker IC chip 2-1$_j$ can request the other IC chip to perform further signal processing regarding the signal obtained as a result of the signal processing in Step S2-31. In this case, the undertaker IC chip 2-1$_j$ becomes a client IC chip so as to perform the processing described in FIG. 24.

Figure 28:
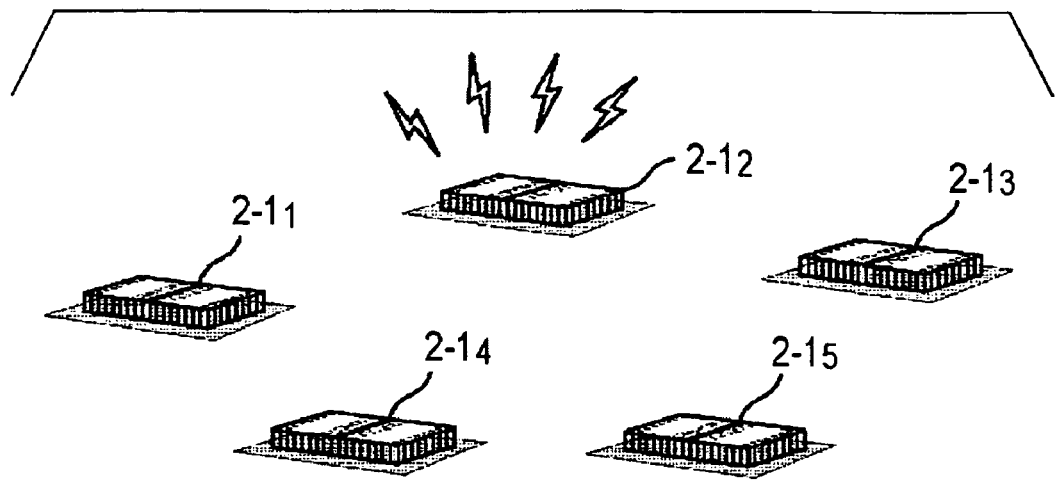
FIG. 28 is a diagram illustrating a scene wherein coding division multiplex method communication is performed.
Figure 29:
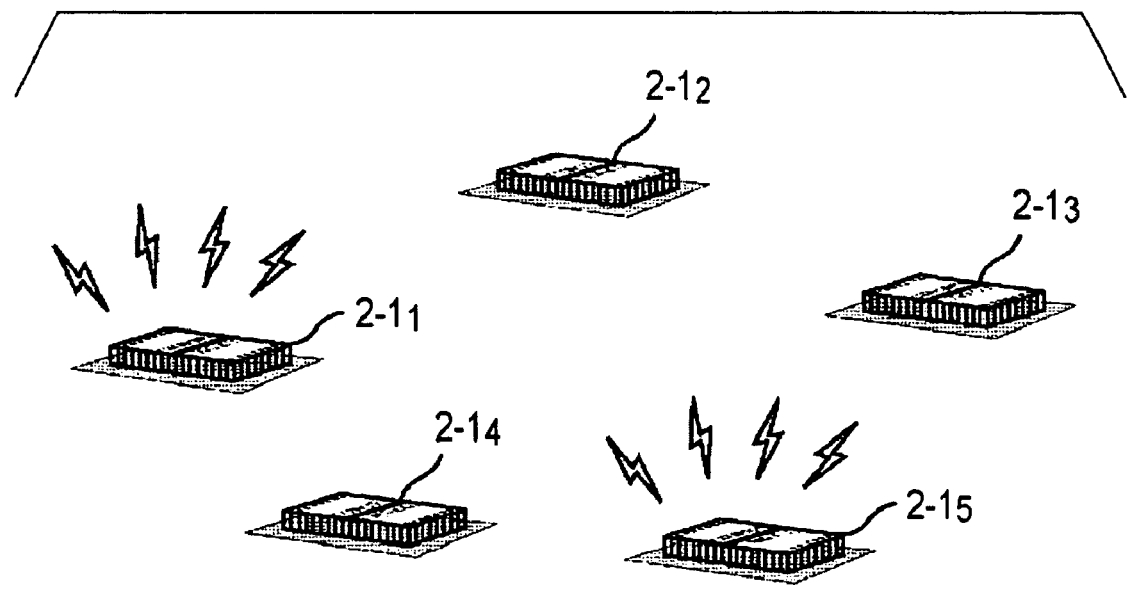
FIG. 29 is a diagram illustrating a scene wherein coding division multiplex method communication is performed.
Figure 30:
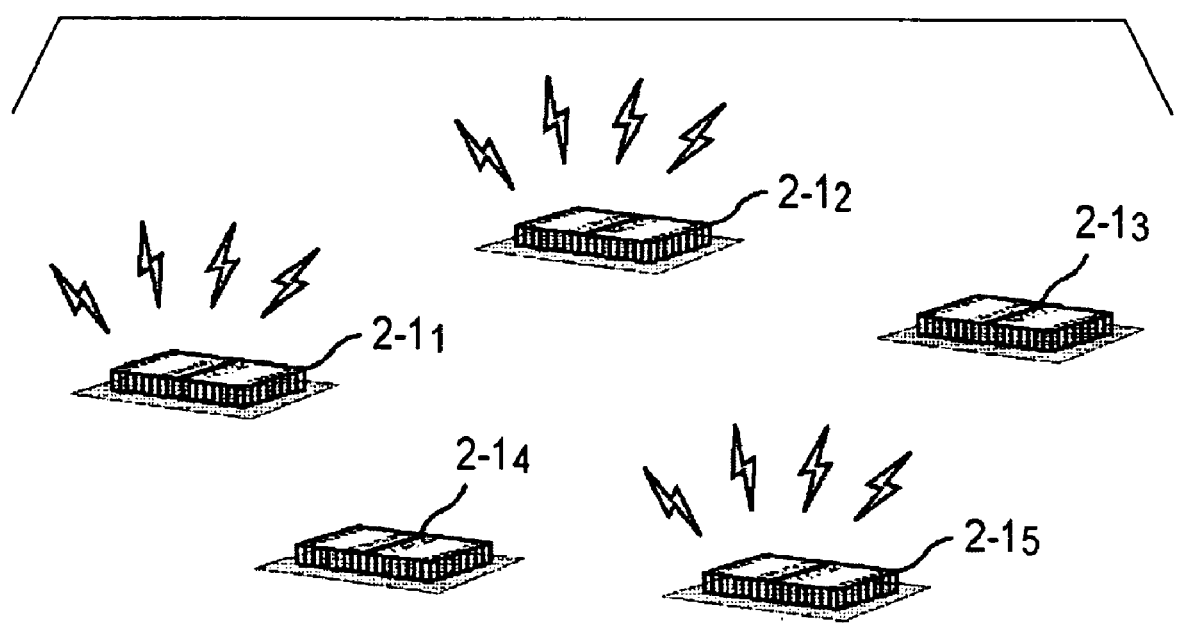
FIG. 30 is a diagram illustrating a scene wherein coding division multiplex method communication is performed.

Next, with the second communication, restriction of communication parties can be performed using coding division, for example. FIGS. 28 through 30 schematically illustrate communication being performed between the respective IC chips 2-1$_1$ through 2-1$_5$ with a coding division multiplex method.

Examples of the coding division multiplex method include a spread spectrum method. With the spread spectrum method, modulation is performed with spread coding (spread spectrum), and spread spectrum signals obtained by modulation with a different type of spread coding do not interfere each other. In other words, spread spectrum signals obtained with a different type of spread coding can be separated. Accordingly, independent communication can be performed with restricted communication parties by employing spread spectrum signals with a different type of spread coding.

Note that spread spectrum signals with spread coding having a predetermined phase-contrast can be separated even if the grouping of the code of spread coding is the same.

In the event that communication is performed between the IC chips 2-1$_1$ through 2-1$_5$ with the spread spectrum method serving as a coding division multiplex method, spread coding for performing the first communication (hereinafter, referred to as "common coding" as appropriate) and one or more spread coding for performing the second communication are assigned beforehand.

In the event that the first communication is performed, the IC chip 2-1$_i$ sends or receives a signal with the spectrum spread signal with the common coding. Also, in the event that the second communication is performed, the IC chip 2-1$_i$ sets any one of a singular or plurality of spread coding assigned to the second communication to the spread coding for performing the second communication, and sends a signal with the spread spectrum signal with the set spread coding (hereinafter, referred to as "setting coding" as appropriate). Thus, with the second communication, communication parties are restricted.

In other words, the IC chip 2-1$_i$, which attempts to send a signal with the second communication, sends a signal with the spread spectrum signal with certain setting coding, and accordingly, the communication parties which can receive the signal are restricted to the other IC chips $2\text{-}1_j$ which demodulate the spread spectrum signal with the setting coding.

As described above, in the event that communication is performed between the IC chips $2\text{-}1_1$ through $2\text{-}1_5$ with the coding division multiplex method, the client IC chip $2\text{-}1_i$ sends the request data with the spread spectrum signal with the common coding, as shown in FIG. 28. Here in FIG. 28, the IC chip $2\text{-}1_2$ becomes a client, and sends the request data with the spread spectrum signal with the common coding.

Subsequently, the undertaker-candidate IC chip, which performs the signal processing corresponding to the command disposed in the request data sent by the client IC chip $2\text{-}1_2$, sends an acknowledge ACK serving as a response corresponding to the request data with the spread spectrum signal with the common coding, as shown in FIG. 29. Here in FIG. 29, the IC chips 2-11 and 2-15 become undertakers, and send an acknowledge ACK with the spread spectrum signal with the common coding. Note that if the IC chips 2-11 and 2-15 send the acknowledge ACK with the spread spectrum signal with the common coding at the same time, interference occurs, and accordingly, the IC chips 2-11 and 2-15 preferably send the acknowledge ACK when the other IC does not send the spread spectrum signal with the common coding.

Following the undertaker IC chips 2-11 and 2-15 sending the acknowledge ACK and the client IC chip $2\text{-}1_2$ receiving the acknowledges ACK, the spread coding used for performing the second communication is set between the client and the undertakers, and the signal to be subjected to signal processing is sent to the undertakers from the client with the spread spectrum signal with the set spread coding (setting coding), as shown in FIG. 30. Subsequently, the undertakers receive the signal, and subject the received signal to signal processing. In FIG. 30, the signal to be subjected to signal processing is sent from the client IC chip 2-12 to the undertaker IC chips 2-11 and 2-15 respectively.

Note that fixed spread coding serving as setting coding can be assigned to the IC chips $2\text{-}1_1$ through $2\text{-}1_5$ on the connection board 2-2 beforehand. In this case, with the IC chip $2\text{-}1_i$, in the case that the second communication is performed, a signal can be sent and received with the spread spectrum signal with setting coding.

In other words, for example, as shown in FIG. 30, transmission of the signal corresponding to the undertaker IC chips 2-11 and 2-15 can be performed with the setting coding assigned to the client IC chip $2\text{-}1_2$ or with the setting coding assigned to the undertaker IC chips 2-11 and 2-15. However, in the event that the client IC chip $2\text{-}1_2$ sends a different signal to the undertaker IC chips 2-11 and 2-15 at the same time, transmission should be performed with the setting coding assigned to the undertaker IC chip $2\text{-}1_1$ and the setting coding assigned to the undertaker IC chip $2\text{-}1_5$ respectively. In other words, there is the need wherein transmission of the signal corresponding to the undertaker IC chip $2\text{-}1_1$ from the client IC chip $2\text{-}1_2$ is performed with the setting coding assigned to the IC chip $2\text{-}1_1$, and transmission of the signal corresponding to the undertaker IC chip $2\text{-}1_5$ from the client IC chip $2\text{-}1_2$ is performed with the setting coding assigned to the IC chip $2\text{-}1_5$.

Note that an arrangement may be made wherein the spread coding not used in communication is selected from the plurality of spread coding assigned to the IC chips $2\text{-}1_1$ through $2\text{-}1_5$ disposed on the connection board 2-2 for performing the second communication.

Next, description will be made regarding the processing performed by the client IC chip $2\text{-}1_i$ in the case that communication parties are restricted using coding division in the second communication with reference to the flowchart in FIG. 31.

First, the client IC chip $2\text{-}1_i$ sends the signal for instructing the signal processing for requesting the other one or more IC chips $2\text{-}1_j$ in Step S2-41, i.e., the request data including the command for controlling the signal processing in the IC chips $2\text{-}1_j$, by the spread spectrum signal with the common coding.

In other words, with the client IC chip $2\text{-}1_i$, the computing circuit 2-14 generates the request data in FIG. 25, in which the commands for instructing the signal processing to be requested to the other one or more IC chips $2\text{-}1_j$ are disposed, and supplies this to the wireless circuit 2-12. The wireless circuit 2-12 modulates the request data from the computing circuit 2-14 to the spread spectrum signal with the common coding, and supplies this to the antenna 2-11 so as to emit.

The signal of the common channel to be sent by the client IC chip $2\text{-}1_i$ in Step S2-41 is received by all of the other IC chips on the connection board 2-2. Note that the broadcasting station ID of the request data to be sent with the spread spectrum signal with the common coding by the client IC chip $2\text{-}1_i$ in FIG. 31 includes the information of the spread coding (setting coding) used for performing the second communication instead of the information of the channel used for performing the second communication as described in FIG. 25.

The processing in Step S2-41 is preferably performed following recognition being made that the spread spectrum signal with the common coding is not sent from the IC chip other than the client IC chip $2\text{-}1_i$.

Following the client IC chip $2\text{-}1_i$ sending the request data in Step S2-41, the flow proceeds to Step S2-42, where the client IC chip $2\text{-}1_i$ determines whether or not an acknowledge ACK serving as a response corresponding to the request data send in Step S2-41 is sent with the spread spectrum signal with the common coding.

In other words, the IC chip $2\text{-}1_j$, which has received the request data, determines whether or not the signal processing instructed by the command included in the request data can be performed by itself, as described later. In the case that the signal processing can be performed by itself, the IC chip $2\text{-}1_j$ sends an acknowledge ACK serving as a response representing that the request of the signal processing is accepted, with the spread spectrum signal with the common coding. In Step S2-42, determination is made whether or not the acknowledge ACK is thus sent.

In the event that determination is made that the acknowledge ACK necessary for performing the signal processing corresponding to all of the commands included in the request data is not sent in Step S2-42, the flow proceeds to Step S2-43, where the computing circuit 2-14 of the client IC chip $2\text{-}1_i$ determines whether or not the number of execution times of the determination processing in Step S2-42 is below (not more than) a predetermined threshold N. In Step S2-43, in the event that determination is made that the number of execution times of the determination processing in Step S2-42 is below the a predetermined threshold N, the flow returns to Step S2-42, subsequently the same processing is repeated.

On the other hand, in the event that determination is made in Step S2-43 that the number of execution times of the determination processing is not below a predetermined threshold N, i.e., in the event that the acknowledge ACK necessary for performing the signal processing cannot be obtained from the other IC chips $2\text{-}1_j$ during the determination processing in Step S2-42 being performed N times, the flow proceeds to Step S2-44, where the computing circuit 2-14 of the client IC chip $2\text{-}1_i$, in the event that the signal (data) to be subjected to signal processing is stored in the storage circuit 2-15, discards the signal, or abandons the acknowledges ACK previously received, and the processing ends.

On the other hand, in the event that determination is made in Step S2-42 that the necessary acknowledge ACK is sent, i.e., the acknowledge ACK corresponding to the request data is sent with the common channel from the one or more IC chips 2-1$_j$ which can perform the signal processing corresponding to the command included in the request data, the signal of the common channel is received at the antenna 2-11 of the client IC chip 2-1$_i$, and is supplied to the computing circuit 2-14 of the signal processing circuit 2-13 via the wireless circuit 2-12, the flow proceeds to Step S2-46, the computing circuit 2-14 of the client IC chip 2-1$_i$ sets the spread coding used for modulating a spread spectrum signal to the setting coding represented by the broadcasting station ID included in the request data sent in Step S2-41 by controlling the wireless circuit 2-12.

Subsequently, the flow proceeds to Step S2-47 from Step S2-46, where the client IC chip 2-1$_i$ performs the second communication for sending the signal to be subjected to the signal processing corresponding to the command included in the request data with the spread spectrum signal with the common coding (setting coding) set in Step S2-46, and the processing ends.

In other words, with the client IC chip 2-1$_i$, the computing circuit 2-14, for example, reads out the signal to be subjected to the signal processing corresponding to the command included in the request data from the storage circuit 2-15, and supplies this to the wireless circuit 2-12. The wireless circuit 2-12 modulates the signal from the computing circuit 2-14 to the spread spectrum signal with the setting coding represented by the broadcasting station ID included in the request data, and emits this from the antenna 2-11 as airwaves.

The spread spectrum signal with the setting coding sent by the client IC chip 2-1$_i$ in Step S2-47 is received (demodulated) by only the IC chips, which sent the acknowledge ACK corresponding to the request data, of the other IC chips on the connection board 2-2.

Figure 32:
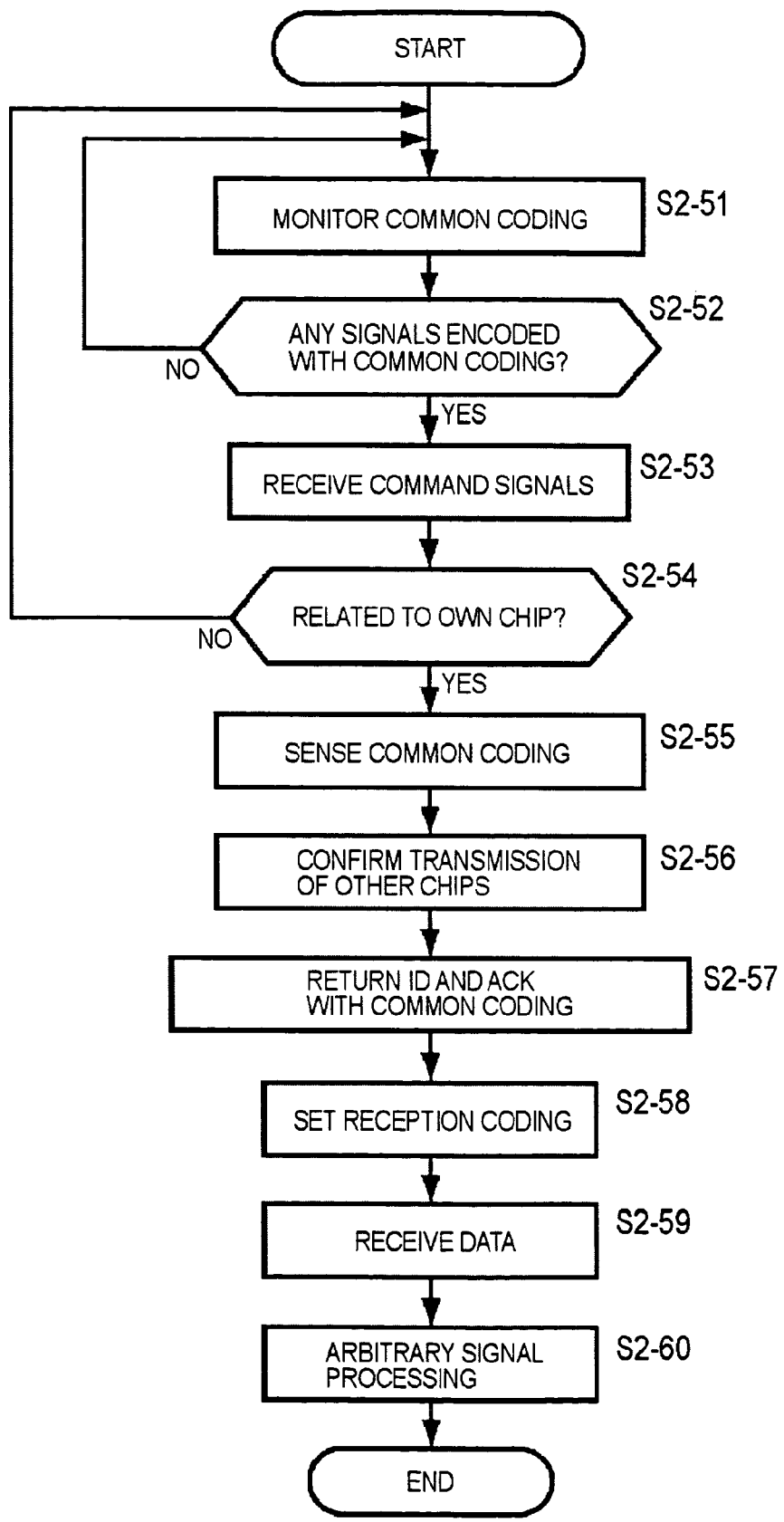
FIG. 32 is a flowchart describing the processing of the IC chip $1_j$ in a case wherein coding division multiplex method communication is performed.

Next, description will be made regarding the processing performed by the other IC chip 2-1$_j$ of the client IC chip 2-1$_i$, i.e., the undertaker-candidate IC chip 2-1$_j$ in a case wherein communication parties are restricted with coding division in the second communication with reference to the flowchart in FIG. 32.

The undertaker-candidate IC chip 2-1$_j$ first senses the spread spectrum signal with the common coding in Step S2-51. In other words, in Step S2-51, the antenna 2-11 of the undertaker-candidate IC chip 2-1$_j$ receives airwaves, and the received signal (spread spectrum signal) is supplied to the wireless circuit 2-12. The wireless circuit 2-12 demodulates the received signal from the antenna 2-11, and supplies the demodulated signal obtained as a result thereof to the computing circuit 2-14 of the signal processing circuit 2-13. Subsequently, the flow proceeds to Step S2-52 from Step S2-51, where the computing circuit 2-14 determines whether or not there is the spread spectrum signal with the common coding sent by the other IC chip, i.e., the client IC chip 2-1$_i$ based on the demodulated signal from the wireless circuit 2-12.

In Step S2-52, in the case that determination is made that there is no spread spectrum signal with the common coding, the flow returns to Step S2-51, subsequently the same processing is repeated. In other words, the undertaker-candidate IC chip 2-1$_j$ is in a standby state until the spread spectrum signal with the common coding is sent from the client IC chip 2-1$_i$.

Note that description has been made here regarding an arrangement wherein the undertaker-candidate IC chip 2-1$_j$ senses the spread spectrum signal with the common coding all the time. However, with the wireless circuit 2-12 of the undertaker-candidate IC chip 2-1$_j$, a squelch circuit for cutting or passing the received signal at the antenna 2-11 based on the reception intensity of airwaves may be employed. In other words, with the wireless circuit 2-12 of the undertaker-candidate IC chip 2-1$_j$, an arrangement may be made wherein the received signal from the antenna 2-11 is not output to the computing circuit 2-14 in the case that the reception intensity of the spread spectrum signal with the common coding is equal to or less than (below) a predetermined threshold, and the received signal from the antenna 2-11 is output to the computing circuit 2-14 in the case that the reception intensity of the spread spectrum signal with the common coding is greater than (equal to or greater than) a predetermined threshold.

Figure 31:
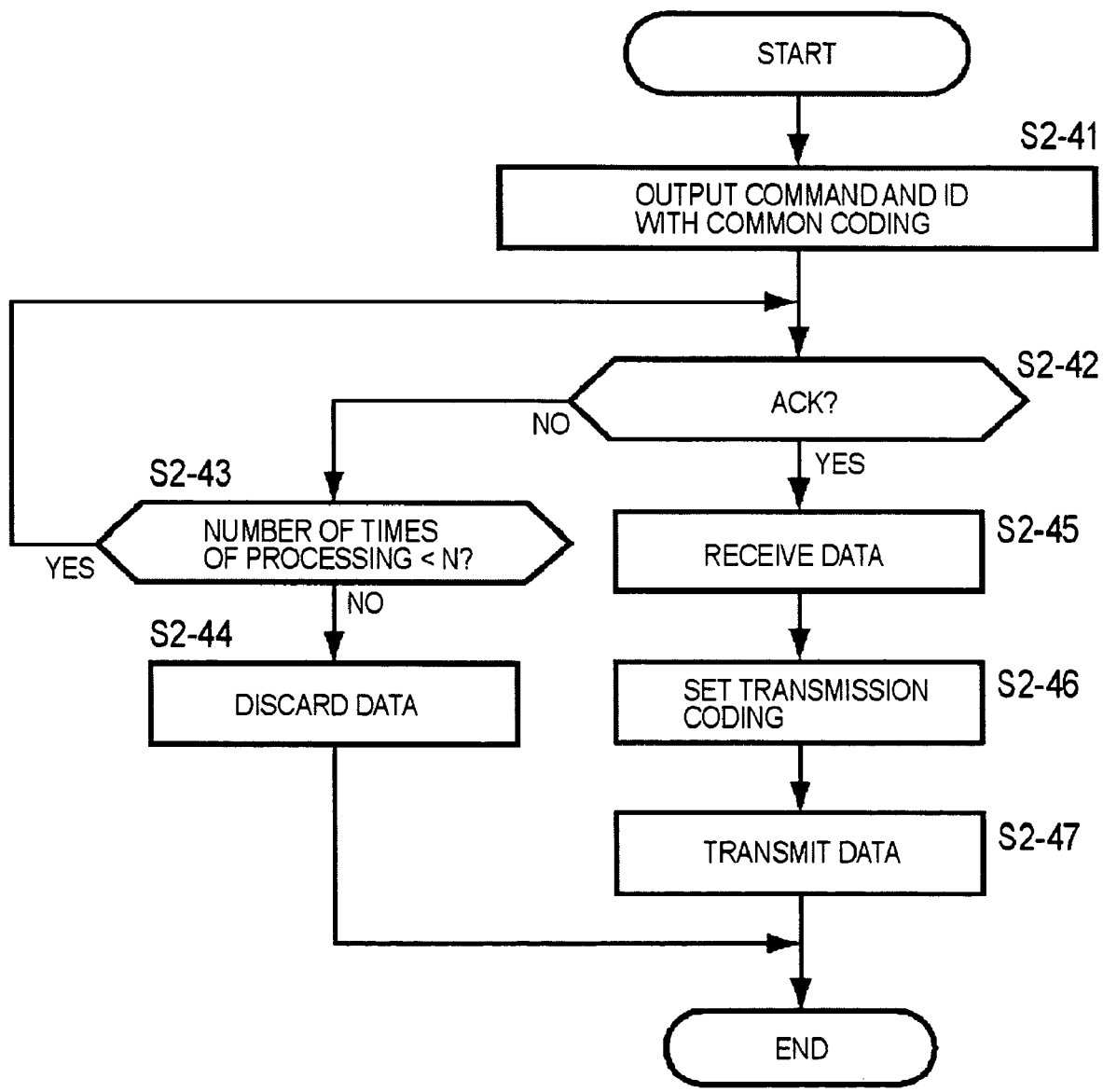
FIG. 31 is a flowchart describing the processing of the IC chip $1_i$ in a case wherein coding division multiplex method communication is performed.

In the event that determination is made in Step S2-52 that there is the spread spectrum signal with the common coding, the flow proceeds to Step S2-53, the undertaker-candidate IC chip 2-1$_j$ receives the request data sent with the common coding by the client IC chip 2-1$_i$ in Step S2-41 in FIG. 31. In other words, with the undertaker-candidate IC chip 2-1$_j$, airwaves are received at the antenna 2-11, and the received signal is supplied to the wireless circuit 2-12. The wireless circuit 2-12 demodulates the spread spectrum signal with the common coding of the received signals from the antenna 2-11, and thus obtains the request data from the client IC chip 2-1$_i$ and supplies this to the computing circuit 2-14 of the signal processing circuit 2-13.

Subsequently, the flow proceeds to Step S2-54 from Step S2-53, where with the undertaker-candidate IC chip 2-1$_j$, the computing circuit 2-14, in the same way as with the case in Step S2-24 in FIG. 26, determines whether or not the command included in the request data from the client IC chip 2-1$_i$ is related to itself, i.e., whether or not the signal processing corresponding to the command included in the request data can be performed, for example.

In the event that determination is made in Step S2-54 that the signal processing corresponding to the command included in the request data from the client IC chip 2-1$_i$ cannot be performed, the flow returns to Step S2-51, subsequently the same processing is repeated.

On the other hand, in the event that determination is made in Step S2-54 that the signal processing corresponding to the command included in the request data from the client IC chip 2-1$_i$ can be performed, the undertaker-candidate IC chip 2-1$_j$ performs the signal processing corresponding to the command included in the request data from the client IC chip 2-1$_i$, so as to speak, becomes a formal undertaker, and the flow proceeds to Step S2-55, subsequently the processing for performing the signal processing is performed.

In Step S2-55, the IC chip 2-1$_j$, which has become an undertaker, senses the spread spectrum signal with the common coding. In other words, in Step S2-55, the antenna 2-11 of the IC chip 2-1$_j$ receives airwaves, and the received signal is supplied to the wireless circuit 2-12. The wireless circuit 2-12 demodulates the received signal from the antenna 2-11 with the common coding, and supplies the demodulated signal obtained as a result thereof to the computing circuit 2-14 of the signal processing circuit 2-13. Subsequently, the flow proceeds to Step S2-56 from Step S2-55, where the computing circuit 2-14 determines whether or not the other IC chip 2-1$_j$, which has become an undertaker, sends an acknowledge ACK as to the request data to the client IC chip 2-1$_i$ based on the demodulated signal from the wireless circuit 2-12.

In other words, the IC chip, which has become an undertaker, sends an acknowledge ACK corresponding to the request data with the spread spectrum signal with the common coding in Step S2-57 described later. In the event that the IC chip $2\text{-}1_j$ confirms in Step S2-56 that the other IC chip $2\text{-}1_{j'}$, which has become an undertaker, has sent the acknowledge ACK corresponding to the request data to the client IC chip $2\text{-}1_i$, the IC chip $2\text{-}1_j$ awaits until transmission thereof is completed, and the flow proceeds to Step S2-57. In the case that the IC chip $2\text{-}1_j$ does not confirm in Step S2-56 that the other IC chip $2\text{-}1_{j'}$, which has become an undertaker, has sent the acknowledge ACK corresponding to the request data to the client IC chip $2\text{-}1_i$, i.e., in the case that sending and receiving the spread spectrum signal with the common coding is not performed, the flow immediately proceeds to Step S2-57.

In Step S2-57, the IC chip $2\text{-}1_j$, which has become an undertaker, sends an acknowledge ACK serving as a response corresponding to the request data from the client IC chip $2\text{-}1_i$ with the spread spectrum signal with the common coding.

In other words, with the undertaker IC chip $2\text{-}1_j$, the computing circuit 2-14 generates an acknowledge ACK serving as a response corresponding to the request data from the client IC chip $2\text{-}1_i$, and supplies this to the wireless circuit 2-12. The wireless circuit 2-12 modulates the acknowledge ACK from the computing circuit 2-14 to the spread spectrum signal of the common coding, and supplies this to the antenna 2-11 so as to emit this.

The spread spectrum signal with the common coding to be sent by the undertaker IC chip $2\text{-}1_j$ in Step S2-57 is received by all of the other IC chips on the connection board 2-2. However, only the client IC chip $2\text{-}1_i$, which performs the processing described in FIG. 31, receives and processes the spread spectrum signal with the common coding, and the other IC chips do not perform any processing.

As for the format of the acknowledge ACK to be sent by the IC chip $2\text{-}1_j$, which has become an undertaker, the same format as the format of the request data to be sent by the client IC chip $2\text{-}1_i$ may be employed, as shown in FIG. 25, for example.

In this case, the broadcasting station ID including the setting coding included in the broadcasting station ID disposed on the head of the request data is disposed on the head of the acknowledge ACK. Furthermore, the command (command code) corresponding to the signal processing to be performed by the IC chip $2\text{-}1_j$, which has become an undertaker, is disposed following the broadcasting station ID. Note that an arrangement may be made wherein an ID for identifying the IC chip $2\text{-}1_j$, which has become an undertaker, is included in the broadcasting station ID disposed on the head of the acknowledge ACK as well as the information of the setting coding.

Following the undertaker IC chip $2\text{-}1_j$ sending the acknowledge ACK in Step S2-57, the flow proceeds to Step S2-58, where the computing circuit 2-14 sets the spread coding used for demodulating a spread spectrum signal to the setting coding represented by the broadcasting station ID included in the request data received in Step S2-53 by controlling the wireless circuit 2-12.

In other words, thus, the same spread coding is set between the client IC chip $2\text{-}1_i$ and undertaker IC chip $2\text{-}1_j$ as the spread coding used for modulating and demodulating a spread spectrum signal for sending and receiving the signal to be subjected to signal processing, thereby enabling the second communication.

Note that the IC chip to become an undertaker is not restricted to one chip, in some cases, multiple chips may become undertakers. In the case that the number of the IC chips to become an undertaker is more than one, the same spread coding is set between the multiple undertaker IC chips and the client IC chip $2\text{-}1_i$ as the spread coding of a spread spectrum signal for sending and receiving the signal to be subjected to signal processing. Consequently, the signal to be subjected to signal processing to be sent by the client IC chip $2\text{-}1_i$ is received (demodulated) by the IC chip alone, which has become an undertaker.

Following the undertaker IC chip $2\text{-}1_j$ performing the processing in Step S2-58, the flow proceeds to Step S2-59, where the undertaker IC chip $2\text{-}1_j$ receives the signal to be subjected to signal processing to be sent with the spread spectrum signal with the setting coding by the client IC chip $2\text{-}1_i$ in Step S2-47 in FIG. 31, and the flow proceeds to Step S2-60. In other words, with the undertaker IC chip $2\text{-}1_j$, airwaves are received at the antenna 2-11, and the received signal is supplied to the wireless circuit 2-12. The wireless circuit 2-12 demodulates the received signal from the antenna 2-11 with the setting coding, thus, obtains the signal to be subjected to signal processing from the client IC chip $2\text{-}1_i$, and supplies this to the computing circuit 2-14 of the signal processing circuit 2-13.

In Step S2-60, the computing circuit 2-14 of the undertaker IC chip $2\text{-}1_j$ subjects the signal received in Step S2-59 to the signal processing corresponding to the command included in the acknowledge ACK in Step S2-57, stores the results of the signal processing in the storage circuit 2-15 as necessary, and the processing ends.

Note that the undertaker IC chip $2\text{-}1_j$ can request the other IC chip to perform further signal processing regarding the signal obtained as a result of the signal processing in Step S2-60. In this case, the undertaker IC chip $2\text{-}1_j$ becomes a client IC chip so as to perform the processing described in FIG. 31.

As for spread coding used for modulating and demodulating a spread spectrum signal, PN (Pseudo Noise) coding may be employed, for example. Examples of PN coding include M series.

Figure 33:
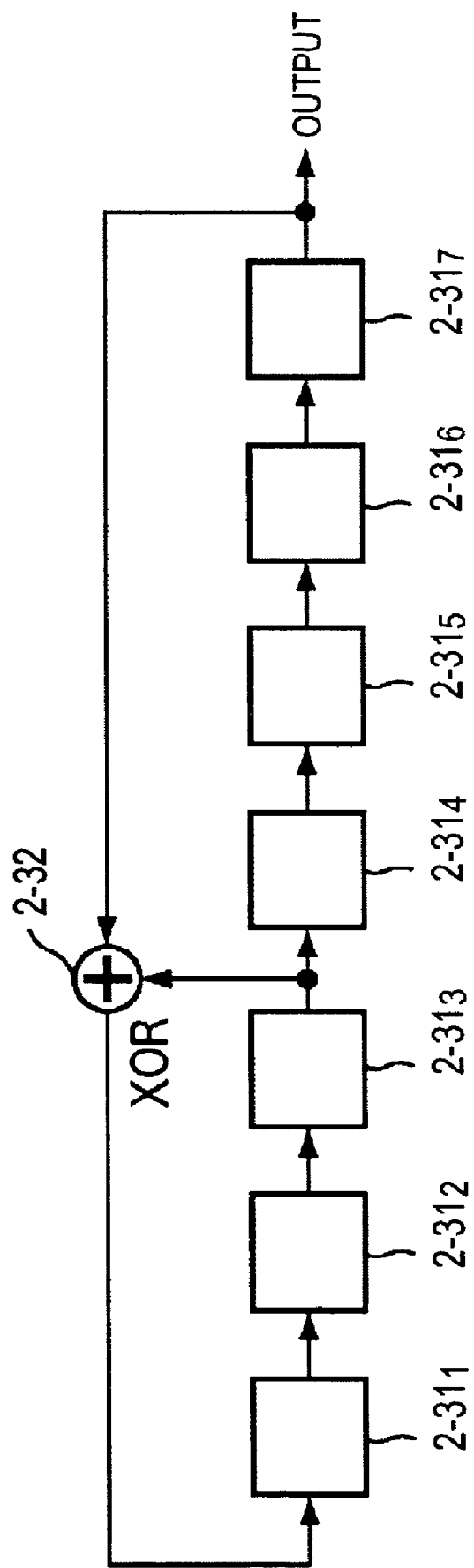
FIG. 33 is a circuit diagram illustrating configuration example of an M series generating circuit.

FIG. 33 illustrates a configuration example of M series generating circuit for generating M series with degree of 7, feedback tap of (3, 7), and cycle of 127. In FIG. 33, the M series generating circuit comprises seven shift registers $2\text{-}31_1$, $2\text{-}31_2$, $2\text{-}31_3$, $2\text{-}31_4$, $2\text{-}31_5$, $2\text{-}31_6$, and $2\text{-}31_7$, and one XOR (exclusive OR) gate 2-32.

The shift registers $2\text{-}31_1$, $2\text{-}31_2$, $2\text{-}31_3$, $2\text{-}31_4$, $2\text{-}31_5$, $2\text{-}31_6$, and $2\text{-}31_7$ are connected in series in that order. The shift register $2\text{-}31_p$ is synchronized with a predetermined clock, retains the value supplied from the previous step shift register $2\text{-}31_{p-1}$, and output the retained value to the following step shift register $2\text{-}31_{p+1}$.

However, an arrangement is made wherein the output of the XOR gate 2-32 is connected to the shift register $2\text{-}31_1$, and the shift register $2\text{-}31_1$ retains the output of the XOR gate 2-32. Also, an arrangement is made wherein the output of the shift register $2\text{-}31_3$ is supplied to the XOR gate 2-32 as well as the following step shift register $2\text{-}31_4$. Furthermore, an arrangement is made wherein the output of the shift register $2\text{-}31_7$ is supplied to the XOR gate 2-32.

The XOR gate 2-32 calculates exclusive OR (XOR) of the output of the shift registers $2\text{-}31_3$ and $2\text{-}31_7$, and supplies the calculated results to the shift register $2\text{-}31_1$.

With the M series generating circuit thus configured, values serving as an initial value are set to the shift registers $2\text{-}31_1$ through $2\text{-}31_7$ respectively. The shift registers $2\text{-}31_1$ through $2\text{-}31_7$ retain the value supplied from the previous step shift register while synchronizing with a predetermined clock, and output the retained value to the following step shift register respectively.

However, the shift register $2\text{-}31_1$ retains the output of the XOR gate 2-32, and the shift register $2\text{-}31_7$ supplies the retained value to the XOR gate 2-32.

On the other hand, the XOR gate 2-32, while synchronizing with a predetermined clock, calculates exclusive OR (XOR) of the output of the shift registers $2\text{-}31_3$ and $2\text{-}31_7$, and supplies the calculated results to the shift register $2\text{-}31_1$.

With the M series generating circuit in FIG. 33, the above-described processing is repeated, thereby outputting the M series with cycle of 127 described above from the shift register $2\text{-}31_7$. Examples of PN coding include Gold coding, Barker coding, and Walsh coding as well as the M series.

Next, with the second communication, the restriction of communication parties can be performed, for example, by adjusting the polarization of airwaves (electromagnetic waves) to be received at the antenna 2-11 as well as the above-described coding division.

More specifically, examples of the polarized wave of airwaves (electromagnetic waves) include a horizontal polarized wave of which the electric field components have amplitude in the horizontal direction of the ground, a vertical polarized wave of which the electric field components have amplitude in the vertical direction of the ground, and a rotational polarized wave of which the polarized surface rotates. Furthermore, examples of a circular polarized wave include a right-rotation polarized wave of which the polarized surface right-rotates as to the elapsed time direction, and a left-rotation polarized wave of which the polarized surface left-rotates as to the elapsed time direction.

In the case that the polarized wave of the antenna 2-11 is different from the polarized wave of airwaves, the antenna 2-11 cannot receive airwaves with sufficient reception intensity. Accordingly, employing the airwaves of a different polarized wave restricts communication parties, thereby performing independent communication.

In the event that communication is performed between the IC chips $2\text{-}1_1$ through $2\text{-}1_5$ by adjusting a polarized wave, a polarized wave for performing the first communication (hereinafter, referred to as "common polarized wave" as appropriate) and one or more polarized waves for performing the second communication are assigned beforehand.

The IC chip $2\text{-}1_i$, in the event of performing the first communication, sends or receives a signal with the airwaves with the common polarized wave. Also, the IC chip $2\text{-}1_i$ sets any one of the one or more polarized waves assigned to the second communication to the polarized wave for performing the second communication, and sends a signal with the airwaves with the set polarized wave (hereinafter, referred to as "setting polarized wave" as appropriate). Thus, communication parties are restricted at the second communication.

More specifically, the IC chip $2\text{-}1_i$, which attempts to send a signal with the second communication, sends a signal with the airwaves with a certain setting polarized wave, and accordingly, communication parties are restricted to the IC chip which attempts to receive the airwaves with the setting polarized wave, of the other IC chips $2\text{-}1_j$ serving as a communication party capable of receiving the airwaves (with sufficient intensity).

Note that the setting polarized wave may be set by either the client IC chip $2\text{-}1_i$ or the undertaker IC chip $2\text{-}1_j$. In the event that the client IC chip $2\text{-}1_i$ sets the setting polarized wave, the information of the setting polarized wave is included in the request data to be sent by the client IC chip $2\text{-}1_i$, and the polarized wave represented by the information included in the request data is handled as a setting polarized wave by the client IC chip $2\text{-}1_i$ and the undertaker IC chip $2\text{-}1_j$. On the other hand, in the event that the undertaker IC chip $2\text{-}1_j$ sets the setting polarized wave, the information of the setting polarized wave is included in an acknowledge ACK to be sent by the undertaker IC chip $2\text{-}1_j$, and the polarized wave represented by the information included in the acknowledge ACK is handled as a setting polarized wave by the client IC chip $2\text{-}1_i$ and the undertaker IC chip $2\text{-}1_j$.

Next, the adjustment of a polarized wave (surface) can be performed by rotating the antenna 2-11 with the MEMS (Micro Electro Mechanical System) technology, or the like, for example. Also, the adjustment of the polarized wave of airwaves can be performed by controlling the phase of a current flowing into the antenna 2-11 by changing the length of an electric supply line between the antenna 2-11 and wireless circuit 2-12.

Figure 34:
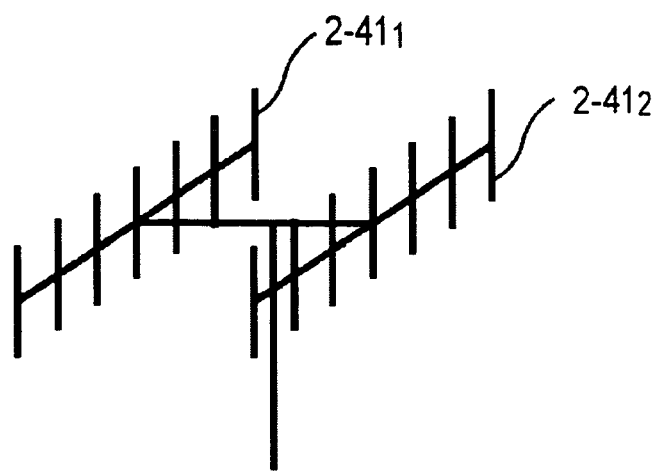
FIG. 34 is a perspective view illustrating configuration example of a stack antenna.

In the event that the adjustment of a polarized wave is performed by controlling the phase of a current flowing into the antenna 2-11, a stack antenna such as shown in FIG. 34 may be employed as the antenna 2-11, for example.

The stack antenna in FIG. 34 comprises two antennas $2\text{-}41_1$ and $2\text{-}41_2$. In FIG. 34, the two antennas $2\text{-}41_1$ and $2\text{-}41_2$ are disposed (stacked) such that the direction of the element is vertical respectively. Note that the two antennas $2\text{-}41_1$ and $2\text{-}41_2$ have the same specification.

Figure 35:
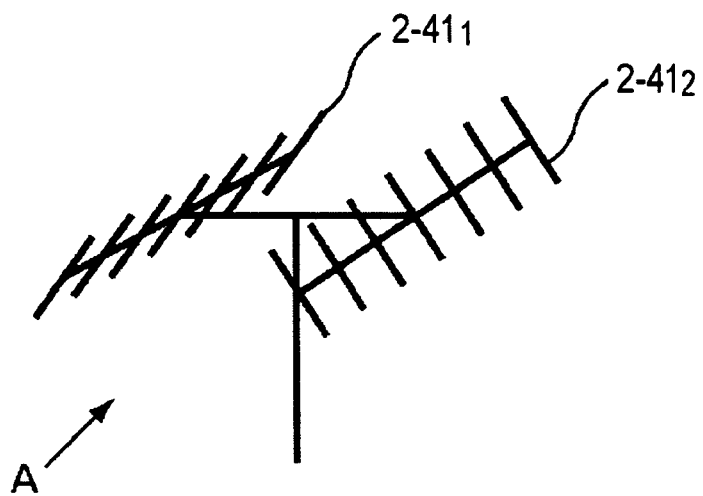
FIG. 35 is a perspective view illustrating configuration example of a stack antenna for adjusting polarization.

In the event that the adjustment of a polarized wave is performed by employing the stack antenna, the antennas $2\text{-}41_1$ and $2\text{-}41_2$ are disposed so as to incline as to the placements in FIG. 34, as shown in FIG. 35.

Figure 36:
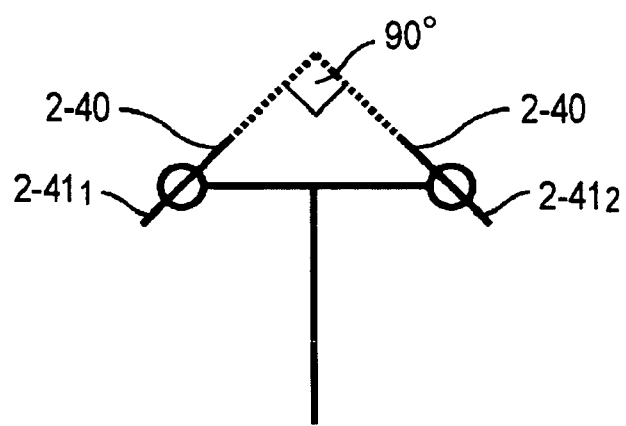
FIG. 36 is a front view illustrating configuration example of a stack antenna for adjusting polarization.

More specifically, in the case that the stack antenna in FIG. 35 is viewed from the direction A, the antennas $2\text{-}41_1$ and $2\text{-}41_2$ are disposed such that the directions of respective elements 2-40 are orthogonal, as shown in FIG. 36.

Subsequently, the wireless circuit 2-12 controls the phase-contrast between the currents flowing into the antennas $2\text{-}41_1$ and $2\text{-}41_2$, thereby adjusting polarized waves.

Figure 37:
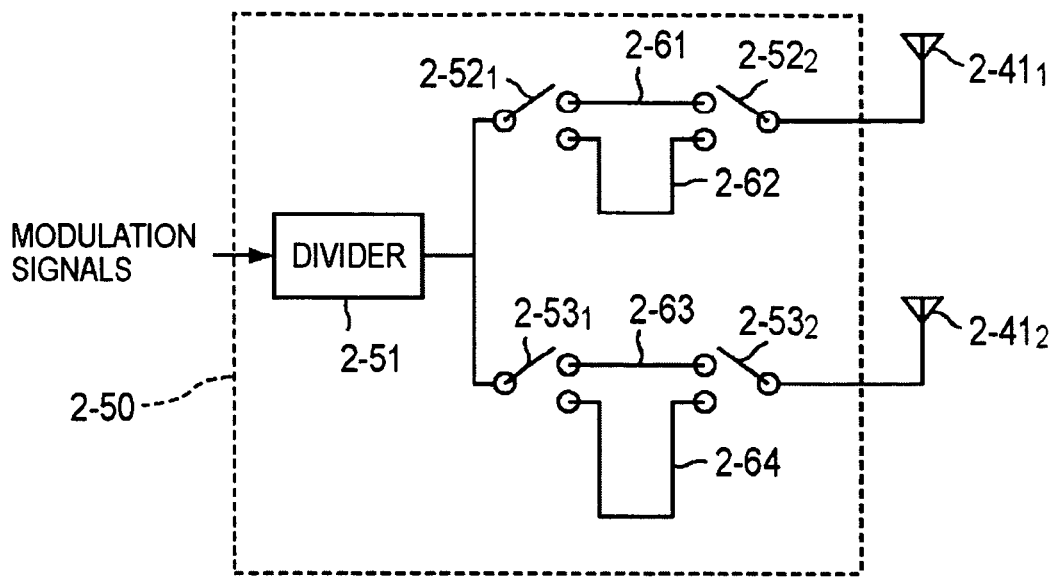
FIG. 37 is a block diagram illustrating configuration example of a circuit for adjusting polarization.

FIG. 37 illustrates a configuration example of a portion of which a polarized wave is adjusted (hereinafter, referred to as "polarized wave adjustment circuit 2-50" as appropriate) by adjusting the phase-contrast between the currents flowing into the antennas $2\text{-}41_1$ and $2\text{-}41_2$.

Description will be made here regarding the adjustment of a polarized wave in the event that airwaves are emitted from the antenna 2-11, for example. A modulated signal to be emitted as airwaves is input to the polarized wave adjustment circuit, and the modulated signal is supplied to a divider 2-51. The divider 2-51 distributes the modulated signal into the same two modulated signals, supplies one to a switch $2\text{-}52_1$, and supplies the other to a switch $2\text{-}53_1$.

The switch $2\text{-}52_1$ selects one end of either a reference cable 2-61 or 180-degree cable 2-62. The switch $2\text{-}52_2$ selects the other end of the selected cable, the reference cable 2-61 or 180-degree cable 2-62, by the switch $2\text{-}52_1$. Subsequently, the switch $2\text{-}52_2$ supplies the modulated signal supplied from the selected cable, the reference cable 2-61 or 180-degree cable 2-62, to the antenna $2\text{-}41_1$, thereby emitting the signal as airwaves.

Accordingly, in the case that the switch $2\text{-}52_1$ selects one end of the reference cable 2-61, the switch $2\text{-}52_2$ also selects the other end of the reference cable 2-61, thus, the modulated signal output from the divider 2-51 is supplied to the antenna $2\text{-}41_1$ via the switch $2\text{-}52_1$, reference cable 2-61, and switch $2\text{-}52_2$ so as to emit the signal as airwaves.

Alternatively, in the case that the switch $2\text{-}52_1$ selects one end of the 180-degree cable 2-62, the switch $2\text{-}52_2$ also selects the other end of the 180-degree cable 2-62, thus, the modulated signal output from the divider 2-51 is supplied to the antenna 2-41₁ via the switch 2-52₁, 180-degree cable 2-62, and switch 2-52₂ so as to emit the signal as airwaves.

The reference cable 2-61 is a cable (electric supply line) with a predetermined length, and the 180-degree cable 2-62 is a cable with a length obtained by changing the phase of the modulated signal passing through the 180-degree cable 2-62 by 180 degree as to the phase of the modulated signal passing through the reference cable 2-61.

Accordingly, the phase-contrast between the modulated signal supplied to the antenna 2-41₁ via the reference cable 2-61 and the modulated signal supplied to the antenna 2-41₁ via the 180-degree cable 2-62 is 180 degree.

The switch 2-53₁ selects one end of either a reference cable 2-63 or 270-degree cable 2-64. The switch 2-53₂ selects the other end of the selected cable, the reference cable 2-63 or 270-degree cable 2-64, by the switch 2-53₁. Subsequently, the switch 2-53₂ supplies the modulated signal supplied from the selected cable, the reference cable 2-63 or 270-degree cable 2-64, to the antenna 2-41₂, thereby emitting the signal as airwaves.

Accordingly, in the case that the switch 2-53₁ selects one end of the reference cable 2-63, the switch 2-53₂ also selects the other end of the reference cable 2-63, thus, the modulated signal output from the divider 2-51 is supplied to the antenna 2-41₂ via the switch 2-53₁, reference cable 2-63, and switch 2-53₂ so as to emit the signal as airwaves.

Alternatively, in the case that the switch 2-53₁ selects one end of the 270-degree cable 2-64, the switch 2-53₂ also selects the other end of the 270-degree cable 2-64, thus, the modulated signal output from the divider 2-51 is supplied to the antenna 2-41₂ via the switch 2-53₁, 270-degree cable 2-64, and switch 2-53₂ so as to emit the signal as airwaves.

The reference cable 2-63 is a cable (electric supply line) with the same length as the reference cable 2-61, and the 270-degree cable 2-64 is a cable with a length obtained by changing the phase of the modulated signal passing through the 270-degree cable 2-64 by 270 degree as to the phase of the modulated signal passing through the reference cable 2-63.

Accordingly, the phase-contrast between the modulated signal supplied to the antenna 2-41₂ via the reference cable 2-63 and the modulated signal supplied to the antenna 2-41₂ via the 270-degree cable 2-64 is 270 degree.

Also, a cable for connecting between the switch 2-52₂ and the antenna 2-41₁ and a cable for connecting between the switch 2-53₂ and antenna 2-41₂ are the same in length.

Accordingly, the modulated signal supplied to the antenna 2-41₁ via the reference cable 2-61 and the modulated signal supplied to the antenna 2-41₂ via the reference cable 2-63 are the same in phase.

Also, the phase-contrast between the modulated signal supplied to the antenna 2-41₁ via the reference cable 2-61 and the modulated signal supplied to the antenna 2-41₂ via the 270-degree cable 2-64 is 270 degree.

Furthermore, the phase-contrast between the modulated signal supplied to the antenna 2-41₂ via the reference cable 2-63 and the modulated signal supplied to the antenna 2-41₁ via the 180-degree cable 2-62 is 180 degree.

Also, the phase-contrast between the modulated signal supplied to the antenna 2-41₁ via the 180-degree cable 2-62 and the modulated signal supplied to the antenna 2-41₂ via the 270-degree cable 2-64 is 90 degree.

The antennas 2-41₁ and 2-41₂ are disposed such that the directions of respective elements 2-40 are orthogonal, as shown in FIG. 36.

Figure 38:
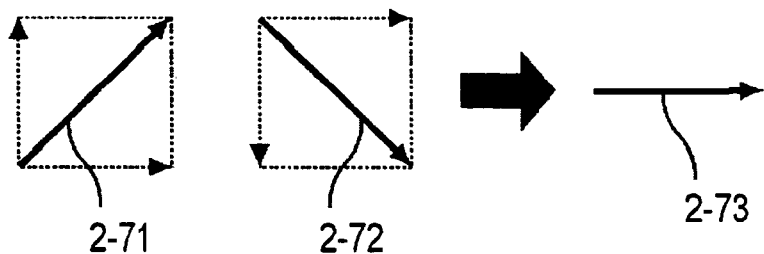
FIG. 38 is a diagram illustrating the airwaves of horizontal polarized waves.

Accordingly, in the case that the switches 2-52₁ and 2-52₂ select the reference cable 2-61, and also the switches 2-53₁ and 2-53₂ select the reference cable 2-63, the electric field component 2-71 of the airwaves to be emitted from the antenna 2-41₁ are represented by a vector in the right upper direction, and the electric field component 2-72 of the airwaves to be emitted from the antenna 2-41₂ are represented by a vector in the right lower direction, for example, as shown in FIG. 38. Consequently, the electric field component 2-73 to be emitted as the entire antenna 2-11 made up of the antennas 2-41₁ and 2-41₂ are represented by a vector in the horizontal direction (left direction in FIG. 38), which is obtained by synthesizing the electric field components 2-71 and 2-72, as shown in FIG. 38. That is to say, in this case, airwaves with a horizontal polarized wave are emitted from the antenna 2-11.

Figure 39:
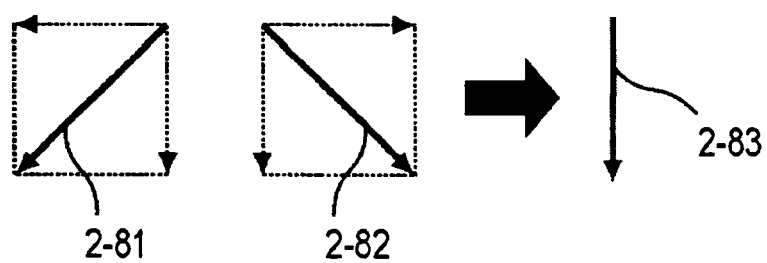
FIG. 39 is a diagram illustrating the airwaves of vertical polarized waves.

Accordingly, in the case that the switches 2-52₁ and 2-52₂ select the 180-degree cable 2-62, and also the switches 2-53₁ and 2-53₂ select the reference cable 2-63, the electric field component 2-81 of the airwaves to be emitted from the antenna 2-41₁ are represented by a vector in the left lower direction, and the electric field component 2-82 of the airwaves to be emitted from the antenna 2-41₂ are represented by a vector in the right lower direction, for example, as shown in FIG. 39. Consequently, the electric field component 2-83 to be emitted as the entire antenna 2-11 made up of the antennas 2-41₁ and 2-41₂ are represented by a vector in the vertical direction (lower direction in FIG. 39), which is obtained by synthesizing the electric field components 2-81 and 2-82, as shown in FIG. 39. That is to say, in this case, airwaves with a vertical polarized wave are emitted from the antenna 2-11.

Also, in the event that the switches 2-52₁ and 2-52₂ select the reference cable 2-61, and also the switches 2-53₁ and 2-53₂ select the 270-degree cable 2-64, airwaves with a right-rotation polarized wave are emitted from the antenna 2-11.

Also, in the event that the switches 2-52₁ and 2-52₂ select the 180-degree cable 2-62, and also the switches 2-53₁ and 2-53₂ select the 270-degree cable 2-64, airwaves with a left-rotation polarized wave are emitted from the antenna 2-11.

As described above, the wireless circuit 2-12 can adjust the polarized wave of airwaves to be emitted by the antenna 2-11.

Note that the adjustment of a polarized wave in the event that the antenna 2-11 receives airwaves is also performed in the same way as the case that the antenna 2-11 emits airwaves as described above.

Next, description will be made regarding the processing performed by the client IC chip 2-1ᵢ in the event that communication parties are restricted with the adjustment of a polarized wave in the second communication with reference to the flowchart in FIG. 40.

The client IC chip 2-1ᵢ, first, senses airwaves with the common polarized wave (surface) in Step S2-71. In other words, in Step S2-71, with the client IC chip 2-1ᵢ, the wireless circuit 2-12 adjusts the antenna 2-11 so as to receive airwaves with the common polarized wave, the antenna 2-11 receives airwaves, and the received signal is supplied to the wireless circuit 2-12. The wireless circuit 2-12 demodulates the received signal from the antenna 2-11, and supplies the demodulated signal to the computing circuit 2-14 of the signal processing circuit 2-13. Subsequently, the flow proceeds to Step S2-72 from Step S2-71, where the computing circuit 2-14 determines whether or not airwaves with the common polarized wave are used by another IC chip, i.e., the first communication is performed by another IC chip using airwaves with the common polarized wave based on the demodulated signal from the wireless circuit 2-12.

In Step S2-72, in the event that determination is made that airwaves with the common polarized wave are used, the flow proceeds to Step S2-73, where the computing circuit 2-14 awaits for time of period corresponding to random time, and then the flow returns to Step S2-71, subsequently the same processing is repeated. In other words, in the event that airwaves with the common polarized wave are used by another IC chip, the client IC chip $2-1_i$ repeats the processing in Steps S2-71 through S2-73, thereby waiting until airwaves with the common polarized wave are released.

Subsequently, in Step S2-72, in the case that determination is made that airwaves with the common polarized wave are not used, the flow proceeds to Step S2-74, where the client IC chip $2-1_i$ sends the signal for instructing the signal processing to be requested to the other one or more IC chips $2-1_j$, i.e., the command for controlling the signal processing in the IC chips $2-1_j$, with airwaves with the common polarized wave.

In other words, with the client IC chip $2-1_i$, the computing circuit 2-14 generates the request data, in which the commands for instructing the signal processing to be requested to the other one or more IC chips $2-1_j$ are disposed, and supplies this to the wireless circuit 2-12. The wireless circuit 2-12 modulates the request data from the computing circuit 2-14, and supplies this to the antenna 2-11 so as to emit this.

Airwaves with the common polarized wave to be sent by the client IC chip $2-1_i$ in Step S2-74 is received by all of the other IC chips on the connection board 2-2.

Figure 40:
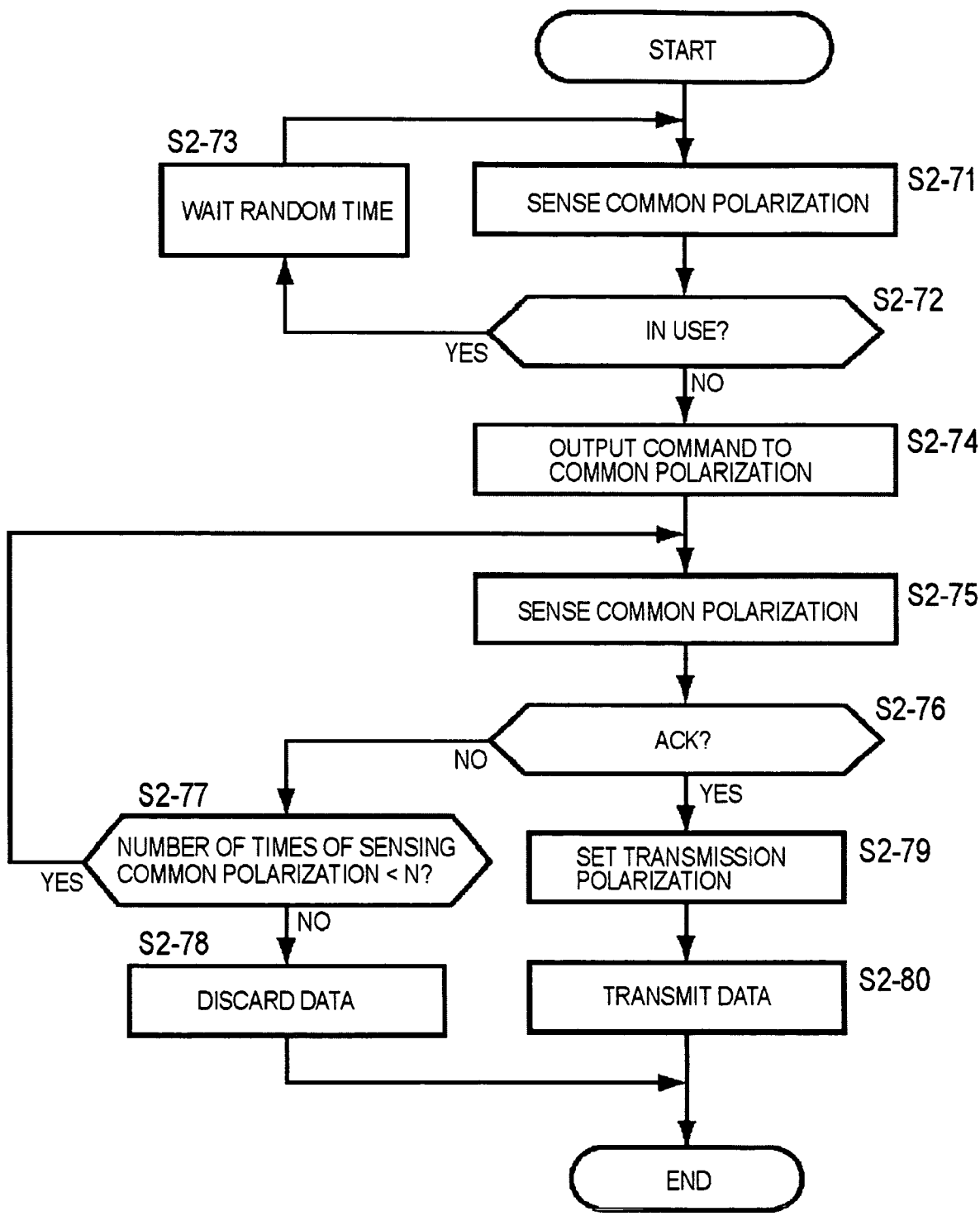
FIG. 40 is a flowchart describing the processing of the IC chip $1_i$ in the case of communication with the airwaves with which polarization has been adjusted.

Note that the broadcasting station ID of the request data to be sent with airwaves with the common polarized wave by the client IC chip $2-1_i$ in FIG. 40 includes the information of the polarized wave (surface) used for performing the second communication instead of the information of the channel used for performing the second communication as described in FIG. 25.

Following the client IC chip $2-1_i$ sending the request data in Step S2-74, the flow proceeds to Step S2-75, where the client IC chip $2-1_i$ senses airwaves with the common polarized wave in the same way as the case in Step S2-71, and then the flow proceeds to Step S2-76.

In Step S2-76, the client IC chip $2-1_i$ determines whether or not an acknowledge ACK serving as a response corresponding to the request data sent in Step S2-74 is sent with airwaves with the common polarized wave based on the sensed results in Step S2-75.

In other words, the IC chip $2-1_j$, which has received the request data, determines whether or not the signal processing instructed by the command included in the request data can be performed by itself, as described later. In the case that the signal processing can be performed by itself, the IC chip $2-1_j$ sends an acknowledge ACK serving as a response representing that the request of the signal processing is accepted, with airwaves with the common polarized wave. In Step S2-76, determination is made whether or not the acknowledge ACK has been thus sent.

In the event that determination is made that the acknowledge ACK necessary for performing the signal processing corresponding to all of the commands included in the request data is not sent in Step S2-76, the flow proceeds to Step S2-77, where the computing circuit 2-14 of the client IC chip $2-1_i$ determines whether or not the number of sensing times of airwaves with the common polarized wave in Step S2-75 is below (not more than) a predetermined threshold N. In Step S2-77, in the event that determination is made that the number of sensing times of airwaves with the common polarized wave is below the a predetermined threshold N, the flow returns to Step S2-75, and subsequently the same processing is repeated.

On the other hand, in the event that determination is made in Step S2-77 that the number of sensing times of airwaves with the common polarized wave is not below a predetermined threshold N, i.e., in the event that the acknowledge ACK necessary for performing the signal processing cannot be obtained from the other IC chips $2-1_j$ during sensing of airwaves with the common polarized wave being performed N times, the flow proceeds to Step S2-78, where the computing circuit 2-14 of the client IC chip $2-1_i$, and in the event that the signal (data) to be subjected to signal processing is stored in the storage circuit 2-15, discards (deletes) the signal, or abandons the acknowledges ACK previously received, and the processing ends.

On the other hand, in the event that determination is made in Step S2-76 that the necessary acknowledge ACK is sent, i.e., the acknowledge ACK corresponding to the request data is sent due to airwaves with the common polarized wave from the one or more IC chips $2-1_j$ which can perform the signal processing corresponding to the command included in the request data, the signal of airwaves with the common polarized wave is received at the antenna 2-11 of the client IC chip $2-1_i$, and is supplied to the computing circuit 2-14 of the signal processing circuit 2-13 via the wireless circuit 2-12, the flow proceeds to Step S2-79, the computing circuit 2-14 of the client IC chip $2-1_i$ sets the polarized wave of airwaves for sending a signal to the polarized wave represented by the broadcasting station ID included in the request data sent in Step S2-74 by controlling the wireless circuit 2-12.

Subsequently, the flow proceeds to Step S2-80 from Step S2-79, where the client IC chip $2-1_i$ performs the second communication for sending the signal to be subjected to the signal processing corresponding to the command included in the request data with airwaves with the polarized wave (setting polarized wave) set in Step S2-79, and the processing ends.

In other words, with the client IC chip $2-1_i$, the computing circuit 2-14, for example, reads out the signal to be subjected to the signal processing corresponding to the command included in the request data from the storage circuit 2-15, and supplies this to the wireless circuit 2-12. The wireless circuit 2-12 emits the signal from the computing circuit 2-14 from the antenna 2-11 as airwaves with the setting polarized wave represented by the broadcasting station ID included in the request data.

Airwaves with the setting polarized wave sent by the client IC chip $2-1_i$ in Step S2-80 are received by only the IC chips which have sent the acknowledge ACK corresponding to the request data, of the other IC chips on the connection board 2-2.

Figure 41:
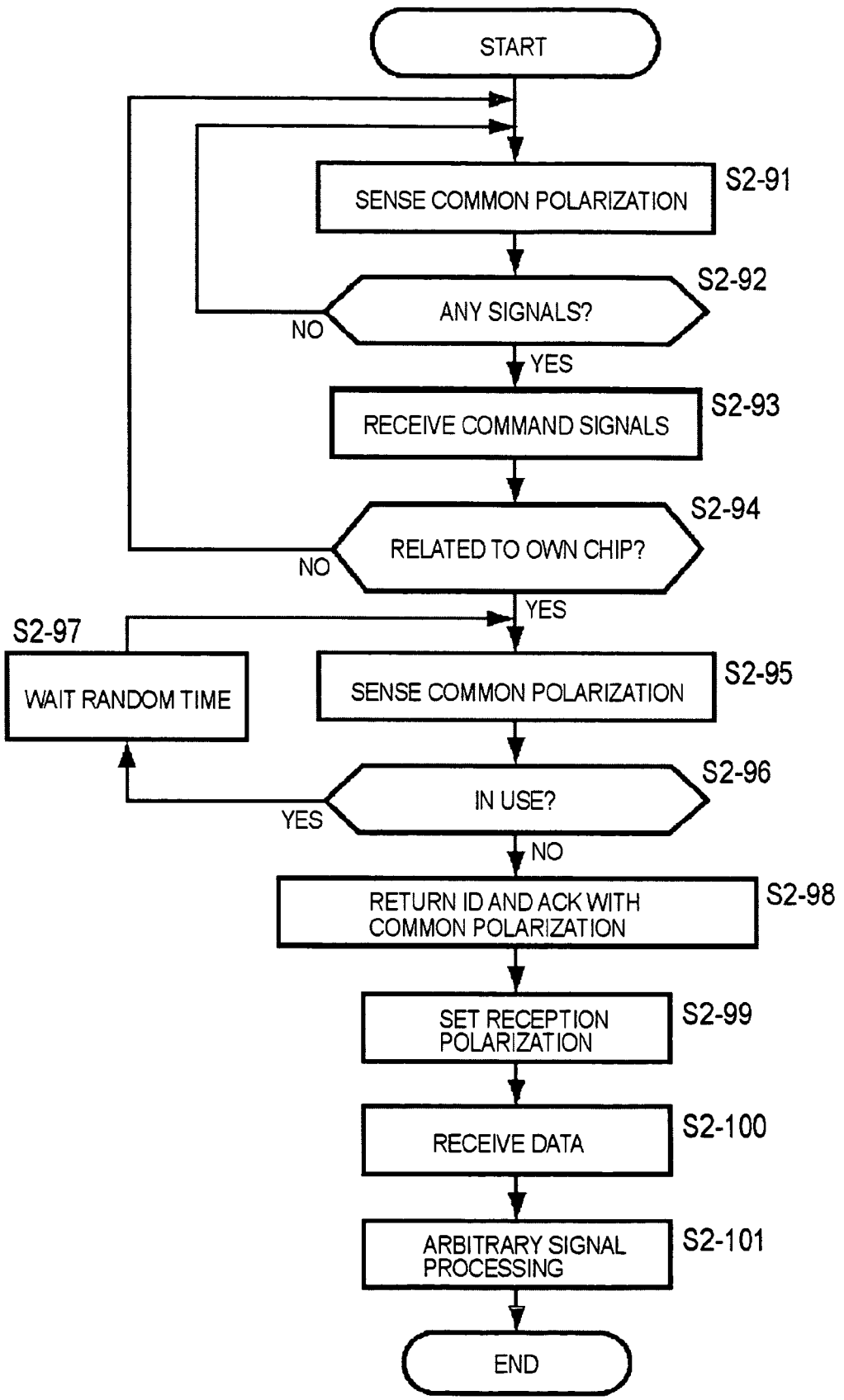
FIG. 41 is a flowchart describing the processing of the IC chip $1_j$ in the case of communication with the airwaves with which polarization has been adjusted.

Next, description will be made regarding the processing performed by the other IC chip $2-1_j$ of the client IC chip $2-1_i$, i.e., the undertaker-candidate IC chip $2-1_j$ in the case wherein communication parties are restricted with the adjustment of a polarized wave in the second communication with reference to the flowchart in FIG. 41.

The undertaker-candidate IC chip $2-1_j$ first senses the airwaves with the common polarized wave in Step S2-91. In other words, in Step S2-91, with the undertaker-candidate IC chip $2-1_j$, the wireless circuit 2-12 adjusts the antenna 2-11 so as to receive airwaves with the common polarized wave, the antenna 2-11 receives airwaves, and the received signal is supplied to the wireless circuit 2-12. The wireless circuit 2-12 demodulates the received signal from the antenna 2-11, and supplies the demodulated signal to the computing circuit 2-14 of the signal processing circuit 2-13. Subsequently, the flow proceeds to Step S2-92 from Step S2-91, where the computing circuit 2-14 determines whether or not there are airwaves with the common polarized wave sent by the other IC chip, i.e., the client IC chip $2-1_i$ based on the demodulated signal from the wireless circuit 2-12.

In Step S2-92, in the event that determination is made that there are no airwaves with the common polarized wave, the flow returns to Step S2-91, subsequently the same processing is repeated. In other words, the undertaker-candidate IC chip $2-1_j$ is in a standby state until airwaves with the common polarized wave are sent from the client IC chip $2-1_i$.

Note that description has been made here regarding an arrangement wherein the undertaker-candidate IC chip $2-1_j$ senses airwaves with the common polarized wave all the time. However, with the wireless circuit 2-12 of the undertaker-candidate IC chip $2-1_j$, a squelch circuit for cutting or passing the received signal at the antenna 2-11 based on the reception intensity of airwaves may be employed. In other words, with the wireless circuit 2-12 of the undertaker-candidate IC chip $2-1_j$, an arrangement may be made wherein the received signal from the antenna 2-11 is not output to the computing circuit 2-14 in the event that the reception intensity of airwaves with the common polarized wave is equal to or less than (below) a predetermined threshold, and the received signal from the antenna 2-11 is output to the computing circuit 2-14 in the event that the reception intensity of airwaves with the common polarized wave is greater than (equal to or greater than) a predetermined threshold.

In the event that determination is made in Step S2-92 that there are airwaves with the common polarized wave, the flow proceeds to Step S2-93, where the undertaker-candidate IC chip $2-1_j$ receives the request data sent with airwaves with the common polarized wave by the client IC chip $2-1_i$ in Step S2-74 in FIG. 40. In other words, with the undertaker-candidate IC chip $2-1_j$, airwaves are received at the antenna 2-11, and the received signal is supplied to the wireless circuit 2-12. The wireless circuit 2-12 extracts the request data sent from the client IC chip $2-1_i$ from the received signal from the antenna 2-11, and supplies this to the computing circuit 2-14 of the signal processing circuit 2-13.

Subsequently, the flow proceeds to Step S2-94 from Step S2-93, where with the undertaker-candidate IC chip $2-1_j$, the computing circuit 2-14 determines, in the same way as the case in Step S2-24 in FIG. 26, whether or not the command included in the request data from the client IC chip $2-1_i$ is related to itself, i.e., whether or not the signal processing corresponding to the command included in the request data can be performed, for example.

In the determines that determination is made in Step S2-94 that the signal processing corresponding to the command included in the request data from the client IC chip $2-1_i$ cannot be performed, the flow returns to Step S2-91, subsequently the same processing is repeated.

On the other hand, in the event that determination is made in Step S2-94 that the signal processing corresponding to the command included in the request data from the client IC chip $2-1_i$ can be performed, the undertaker-candidate IC chip $2-1_j$ performs the signal processing corresponding to the command included in the request data from the client IC chip $2-1_i$, so as to speak, becomes a formal undertaker, and the flow proceeds to Step S2-95, and subsequently the processing for performing the signal processing is performed.

In Step S2-95, the IC chip $2-1_j$, which has become an undertaker, senses airwaves with the common polarized wave. In other words, in Step S2-95, the antenna 2-11 of the IC chip $2-1_j$ receives airwaves, and the received signal is supplied to the wireless circuit 2-12. The wireless circuit 2-12 supplies the received signal from the antenna 2-11 to the computing circuit 2-14 of the signal processing circuit 2-13. Subsequently, the flow proceeds to Step S2-96 from Step S2-95, where the computing circuit 2-14 determines whether or not airwaves with the common polarized wave are used (sent) by another IC chip based on the signal from the wireless circuit 2-12.

In the event that determination is made in Step S2-96 that airwaves with the common polarized wave are used, the flow proceeds to Step S2-97, where the computing circuit 2-14 awaits for time of period corresponding to random time, the flow returns to Step S2-95, subsequently the same processing is repeated. In other words, in the event that airwaves with the common polarized wave are used by another IC chip, the IC chip $2-1_j$, which has become an undertaker, repeats the processing in Step S2-95 through S2-97, thereby awaiting until airwaves with the common polarized wave are released.

In the event that determination is made in Step S2-96 that airwaves with the common polarized wave are not used, the flow proceeds to Step S2-98, where the IC chip $2-1_j$, which has become an undertaker, sends an acknowledge ACK serving as a response corresponding to the request data from the client IC chip $2-1_i$ with airwaves with the common polarized wave.

In other words, with the undertaker IC chip $2-1_j$, the computing circuit 2-14 generates an acknowledge ACK serving as a response corresponding to the request data from the client IC chip $2-1_i$, and supplies this to the wireless circuit 2-12. The wireless circuit 2-12 emits the acknowledge ACK from the computing circuit 2-14 from the antenna 2-11 as airwaves with the common polarized wave.

Airwaves with the common polarized wave to be sent by the undertaker IC chip $2-1_j$ in Step S2-98 is received by all of the other IC chips on the connection board 2-2. However, only the client IC chip $2-1_i$, which performs the processing described in FIG. 40, receives and processes airwaves with the common polarized wave, and the other IC chips do not perform any processing.

As for the format of the acknowledge ACK to be sent by the IC chip $2-1_j$, which has become an undertaker, the same format as the format of the request data to be sent by the client IC chip $2-1_i$ may be employed, as shown in FIG. 25, for example.

In this case, the broadcasting station ID including the setting polarized wave included in the broadcasting station ID disposed on the head of the request data is disposed on the head of the acknowledge ACK. Furthermore, the command (command code) corresponding to the signal processing to be performed by the IC chip $2-1_j$, which has become an undertaker, is disposed following the broadcasting station ID. Note that an arrangement may be made wherein an ID for identifying the IC chip $2-1_j$, which has become an undertaker, is included in the broadcasting station ID disposed on the head of the acknowledge ACK as well as the information of the setting coding.

Following the undertaker IC chip $2-1_j$ sending the acknowledge ACK in Step S2-98, the flow proceeds to Step S2-99, where the computing circuit 2-14 of the undertaker IC chip $2-1_j$ sets the polarized wave of airwaves to be emitted from the antenna 2-11 to the setting polarized wave represented by the broadcasting station ID included in the request data received in Step S2-93 by controlling the wireless circuit 2-12.

In other words, thus, the airwaves with the same polarized wave are set between the client IC chip $2-1_i$ and undertaker IC chip $2-1_j$ as airwaves for sending and receiving the signal to be subjected to signal processing, thereby enabling the second communication.

Note that the IC chip to become an undertaker is not restricted to one chip, in some cases, multiple chips may become undertakers. In the case that the number of the IC chips to become an undertaker is more than one, the same polarized wave is set between the multiple undertaker IC chips and the client IC chip $2-1_i$ as the polarized wave of airwaves for sending and receiving the signal to be subjected to signal processing. Consequently, the signal to be subjected to signal processing to be sent by the client IC chip $2-1_i$ is received by the IC chip alone, which has become an undertaker.

Following the undertaker IC chip $2-1_j$ performing the processing in Step S2-99, the flow proceeds to Step S2-100, where the undertaker IC chip $2-1_j$ receives the signal to be subjected to signal processing to be sent with airwaves with the setting polarized wave by the client IC chip $2-1_i$ in Step S2-80 in FIG. 40, and the flow proceeds to Step S2-101. In other words, with the undertaker IC chip $2-1_j$, airwaves with the setting polarized wave are received at the antenna 2-11, and the received signal is supplied to the wireless circuit 2-12. The wireless circuit 2-12 extracts the received signal from the antenna 2-11, i.e., in this case, the signal to be subjected to signal processing from the client IC chip $2-1_i$, and supplies this to the computing circuit 2-14 of the signal processing circuit 2-13.

In Step S2-101, the computing circuit 2-14 of the undertaker IC chip $2-1_j$ subjects the signal received in Step S2-100 to the signal processing corresponding to the command included in the acknowledge ACK in Step S2-98, stores the results of the signal processing in the storage circuit 2-15 as necessary, and the processing ends.

Note that the undertaker IC chip $2-1_j$ can request the other IC chip to perform further signal processing regarding the signal obtained as a result of the signal processing in Step S2-101. In this case, the undertaker IC chip $2-1_j$ becomes a client IC chip so as to perform the processing described in FIG. 40.

As described above, the IC chip $2-1_i$ can perform the first communication wherein communication with all of the IC chips $2-1_j$ is performed at the same time and the second communication wherein communication with communication parties restricted among the other IC chips is performed. The second communication is performed while restricting communication parties by frequency division, coding division, or adjusting a polarized wave. In other words, sending/receiving signals can be performed with a new communication arrangement made up of a first communication arrangement, which is a broadcasting arrangement, and a second communication arrangement, which is a communicatory arrangement, thereby enabling flexible signal processing with high-degree of freedom. Furthermore, the signal necessary for signal processing can be sent and received effectively, thereby performing signal processing effectively.

Also, the undertaker-candidate IC chip $2-1_j$ receives the request data from the client IC chip $2-1_i$, according to the command (signal) for instructing the signal processing included in the request data, performs or does not perform the signal processing. Furthermore, in the event that multiple types of signal processing can be performed, the undertaker-candidate IC chip $2-1_j$ can modify the signal processing to be performed according to the command included in the request data from the client IC chip $2-1_i$. Consequently, with the signal processing apparatus made up of the IC chips $2-1_1$ through $2-1_5$, signal processing to be performed as the entire apparatus can be modified easily.

Note that, in the event that the undertaker-candidate IC chip $2-1_j$ does not become a undertaker, the signal processing circuit 2-13 does not perform any processing as to the signal corresponding to airwaves from the outside, and accordingly, does not always perform no signal processing. In other words, even in the case that the undertaker-candidate IC chip $2-1_j$ does not become an undertaker, the signal processing circuit 2-13 can perform some signal processing independently.

As described above, while description has been made regarding the case wherein the present invention is applied to IC chips, the present invention can be applied to circuit boards, for example. In other words, with the above description, the portions corresponding to IC chips may be substituted with circuit boards.

In the case wherein electronic equipment is made up of the above-described IC chips or circuit boards as shown in FIG. 20B, and multiple pieces of electronic equipment thus configured are disposed adjacent to each other, the function of each piece of electronic equipment can be modified (upgraded). In other words, in the event that a television receiver 20B-1 and a VCR 20B-2, which are made up of semiconductor chips or circuit boards, are independently disposed apart from each other, while predetermined signal processing is performed by performing communication between the IC chips or the like (20B-1a and 20B-1b) making up the television receiver, predetermined processing is performed by performing communication between the IC chips or the like (20B-2a and 20B-2b) making up the VCR.

On the other hand, in the event that the television receiver and VCR are disposed adjacent to each other, communication between the IC chips or the like (20B-1a and 20B-1b) making up the television receiver and the IC chips or the like (20B-2a and 20B-2b) making up the VCR can be performed as well as communication between the IC chips or the like making up the television and communication between the IC chips or the like making up the VCR. Performing such communication enables new signal processing to be performed as an entire system including the television receiver and VCR.

With this embodiment, these apparatuses are disposed within substance 20B-3 which shields electromagnetic waves.

With this embodiment shown in FIG. 20B, each apparatus has one IC chip and one circuit board; however, the number of IC chips and circuit boards configured for a apparatus is not restricted.

Note that with the present embodiment, while activating wireless communication is referred to as the active mode, and deactivated wireless communication is referred to as the sleep mode, an arrangement may be made wherein activating the signal processing with the signal processing circuit 13 is called the active mode, and deactivated signal processing with the signal processing circuit 13 is called the sleep mode, for example.

Also, with the present embodiment, while one of the semiconductor chips making up the signal processing system is the control chip $51_C$ (control chip 61), the function of the control chip $51_C$ may be included in the shielded housing 41 beforehand. In this case, there is no need to provide the control chip $51_C$ as a semiconductor chip making up the signal processing system.

Furthermore, multiple control chips $51_C$ may be included in the signal processing system. In this case, one of the multiple chips may be functioned as the control chip $51_C$. Furthermore, in this case, the other chips of the multiple chips may be in the sleep mode, or may be functioned as the slave chip $51_N$.

Also, with the present embodiment, while the slave chip $51_N$ enters the active mode or sleep mode depending on the mode signal sent from the control chip $51_C$ with airwaves for control, the slave chip $51_N$ may set its own operating mode. In other words, in the event that processing with heavy loading is performed in the signal processing circuit 13 (computing circuit 14) for example, the slave chip 51$_N$ may change its own operating mode to the sleep mode to prevent a signal with airwaves for signal processing from entering itself from the outside thereof.

Furthermore, with the present embodiment, while only the mode signal is sent or received with airwaves for control, the signal of poling, the signal of a response, the ID, or the function information may be sent or received with airwaves for control as well, for example.

Also, with the present embodiment, while communication for sending and receiving a signal is performed with airwaves (electromagnetic waves), communication may be performed with light such as infrared light as well, for example. Furthermore, communication may be performed with cables such as optical fiber instead of wireless.

Furthermore, the signal to be subjected to signal processing performed by the signal processing circuit 13 is not restricted to image signals, audio signals and the like may be employed as well.

Note that with the present embodiment, while communication for sending and receiving a signal is performed with electromagnetic waves, in addition, communication may be performed with light as well. Furthermore, communication may be performed with cables such as optical fiber instead of wireless as well.

Also, of the undertaker-candidate IC chips, the IC chips which do not send (respond) an acknowledge ACK, i.e., the IC chips which do not become an undertaker may receive airwaves to be exchanged between the other IC chips. However, even if the IC chip which does not become an undertaker receives airwaves exchanged between the other IC chips, the received signal is ignored.

Furthermore, regarding what kind of signal processing is performed as the entire signal processing apparatus in FIG. 22, a certain IC chip and the like an arbitrary apparatus may inform all of the IC chips with the first communication.

Also, with the present embodiment, while one frequency to be employed in the second communication is assigned to singular request data, in addition, as to each signal processing corresponding to one or more commands disposed in request data, a frequency for sending and receiving the signal with the second communication may be assigned. This can be applied to the case wherein the communication parties in the second communication are restricted by coding division or adjusting polarization.

Also, with the present embodiment, while description has been made regarding the image conversion processing for converting the low-resolution first image signal to the high-resolution second image signal with reference to FIGS. 7 through 20, this image conversion processing can be performed similarly in the case of performing the other communication for performing communication with communication parties restricted by frequency division, coding division, adjusting polarization, or the like, and accordingly, detailed description thereof will be omitted.

Also, with the embodiment in FIGS. 1 through 6, description has been made regarding the case that the present invention is applied to the signal processing apparatus including the IC chips 51$_1$ through 51$_7$ serving as three or more signal processing means, wherein each of the IC chips 51$_1$ through 51$_7$ includes the wireless circuit 12 serving as a communication unit for performing communication with another IC chip, and the signal processing circuit 13 serving as a signal processing unit for performing signal processing based on the signal received at the wireless circuit 12, and wherein at least one of the IC chips 51$_1$ through 51$_7$ performs the first communication for performing communication with all of the other IC chips simultaneously, and the second communication for performing communication with the restricted communication parties among the other IC chips.

In addition, the present invention may be applied to a signal processing apparatus including first, second, and third signal processing means, wherein the first signal processing means include a first communication unit for performing communication with another signal processing means, and a first signal processing unit for performing signal processing based on the signal received at the first communication unit, wherein the second signal processing means include a second communication unit for performing communication with another signal processing means, and a second signal processing unit for performing signal processing based on the signal received at the second communication unit, wherein the third signal processing means include a third communication unit for performing communication with another signal processing means, and a third signal processing unit for performing signal processing based on the signal received at the third communication unit, and wherein the first through third communication units perform first communication for performing communication with all of the other signal processing means simultaneously, and second communication for performing communication with the restricted communication parties among the other signal processing means.

Furthermore, with the present embodiment, description has been made regarding the case that the present invention is applied to the signal processing apparatus including the IC chips 2-1$_1$ through 2-1$_5$ serving as three or more signal processing means, wherein each of the IC chips 2-1$_1$ through 2-1$_5$ includes the wireless circuit 2-12 serving as a communication unit for performing communication with another IC chip, and the signal processing circuit 2-13 serving as a signal processing unit for performing signal processing based on the signal received at the wireless circuit 2-12, and wherein at least one of the IC chips 2-1$_1$ through 2-1$_5$ performs the first communication for performing communication with all of the other IC chips simultaneously, and the second communication for performing communication with the restricted communication parties among the other IC chips, wherein the second communication is performed while restricting communication parties with frequency division.

In addition, the present invention may be applied to a signal processing apparatus including first, second, and third signal processing means, wherein the first signal processing means include a first communication unit for performing communication with the second or third signal processing means, and a first signal processing unit for performing signal processing based on the signal received at the first communication unit, wherein the second signal processing means include a second communication unit for performing communication with the first or third signal processing means, and a second signal processing unit for performing signal processing based on the signal received at the second communication unit, wherein the third signal processing means include a third communication unit for performing communication with the first and second signal processing means, and a third signal processing unit for performing signal processing based on the signal received at the third communication unit, and wherein the first through third communication units perform communication with a frequency division multiplex method, coding division multiplex method, or airwaves of a predetermined polarization, and communication with non-restricted communication parties and communication with restricted communication parties by employing different frequencies, coding, or airwaves with different polarizations.

The present application contains subject matter related to Japanese patent applications No. JP2003-317710 and JP2003-317711, both filed in the JPO on Sep. 10, 2003, the entire contents of which being incorporated herein by reference.

What is claimed is:

1. A signal processing apparatus comprising:
    three or more signal processing devices, each of which include
        a communication unit for performing communication with the other signal processing means, and
        a signal processing unit for performing signal processing based on the signal received at said communication unit,
    wherein at least one of said three or more signal processing devices performs a first communication with all of the other signal processing devices at the same time in a broadcast mode on a single frequency.

2. A signal processing apparatus according to claim 1, wherein said communication unit of other signal processing devices receives a signal for controlling said signal processing, and
    wherein the signal processing unit of said other signal processing devices performs signal processing corresponding to the signal received at said communication unit.

3. A signal processing apparatus according to claim 1, wherein said communication unit of the other signal processing devices receives a signal for controlling said signal processing,
    wherein, according to the signal received at said communication unit, a part of said other signal processing devices enter a state for performing said signal processing, and the rest of said other signal processing devices enter a state for nonperforming said signal processing, and
    wherein said other signal processing devices in the state for performing said signal processing perform signal processing corresponding to the signal received at said communication.

4. A signal processing apparatus according to claim 1, wherein at least one of said three or more signal processing devices perform:
    said first communication, and
    second communication for performing communication while restricting communication parties among the other signal processing devices.

5. A signal processing apparatus according to claim 1, wherein said communication unit performs communication with electromagnetic waves.

6. A signal processing apparatus according to claim 1, wherein said communication unit sends or receives a signal for controlling said signal processing.

7. A signal processing apparatus according to claim 1, wherein said communication unit sends or receives a signal to be subjected to said signal processing.

8. A signal processing apparatus according to claim 1, wherein said signal processing devices are disposed within a housing shielding electromagnetic waves.

9. A signal processing apparatus according to claim 1, wherein at least one of said three or more signal processing devices perform:
    said first communication, and
    second communication for performing communication while restricting communication parties among the other signal processing devices;
    wherein said second communication is performed while restricting communication parties with frequency division.

10. A signal processing apparatus according to claim 1, wherein said three or more signal processing devices each further comprise an antenna, and
    wherein said communication unit performs communication with electromagnetic waves via said antenna.

11. A signal processing apparatus according to claim 1, wherein at least one of said three or more signal processing devices allow:
    said first communication, and
    second communication for performing communication while restricting communication parties among the other signal processing devices, and
    wherein said second communication is performed while restricting communication parties with coding division.

12. A signal processing apparatus according to claim 1, wherein at least one of said three or more signal processing devices allow:
    said first communication, and
    second communication for performing communication while restricting communication parties among the other signal processing devices, and
    wherein said second communication is performed while restricting communication parties by adjustment of the polarization of said electromagnetic waves.

13. A signal processing method for a signal processing apparatus including three or more signal processing devices, each of which includes a communication unit for performing communication with the other signal processing devices, and a signal processing unit for performing signal processing based on the signal received at said communication unit, the method comprising:
    performing a first communication, using at least one of the three or more signal processing devices, with all of the other signal processing devices at the same time in a broadcast mode on a single frequency.

14. A signal processing method according to claim 13, further comprising:
    performing a second communication while restricting communication parties among the other signal processing devices.

15. A recording medium storing a program for controlling a signal processing apparatus including three or more signal processing devices, each of which includes a communication unit for performing communication with the other signal processing devices, and a signal processing unit for performing signal processing based on the signal received at said communication unit, the method comprising:
    performing a first communication, using at least one of the three or more signal processing devices, with all of the other signal processing devices at the same time in a broadcast mode on a single frequency.

16. A signal processing apparatus disposed within a shielded housing, comprising:
    a communication unit configured to perform communication with other signal processing apparatuses disposed within the shielded housing; and
    a signal processing unit for performing signal processing based on a signal received at said communication unit,
    wherein a first communication is performed with all of the other signal processing apparatuses at the same time in a broadcast mode on a single frequency.

17. A signal processing apparatus according to claim 16, further configured to perform a second communication while restricting communication parties among the other signal processing apparatuses,
wherein said second communication is performed while restricting communication parties with frequency division.

18. A signal processing apparatus according to claim 16, further comprising an antenna,
wherein said communication unit performs communication with electromagnetic waves via said antenna.

19. A signal processing apparatus according to claim 16, wherein said communication unit sends or receives a signal for controlling said signal processing.

20. A signal processing apparatus according to claim 16, wherein said communication unit sends or receives a signal to be subjected to said signal processing.

21. A signal processing apparatus according to claim 16, further configured to perform a second communication while restricting communication parties among the other signal processing apparatuses,
wherein said second communication is performed while restricting communication parties with coding division.

22. A signal processing apparatus according to claim 16, further configured to perform a second communication while restricting communication parties among the other signal processing apparatuses,
wherein said second communication is performed while restricting communication parties by adjustment of the polarization of said electromagnetic waves.

23. A signal processing method for a signal processor disposed within a shielded housing including a communication unit configured to perform communication with other signal processing apparatuses disposed within the shielded housing and a signal processing unit for performing signal processing based on the signal received at said communication unit, the method comprising:
performing a first communication with all of the other signal processing apparatuses at the same time in a broadcast mode on a single frequency.

24. A signal processing method according to claim 23, further comprising performing a second communication while restricting communication parties among the other signal processing apparatuses,
wherein said step of second communication is performed while restricting communication parties with frequency division.

25. A signal processing method according to claim 23, further comprising performing a second communication while restricting communication parties among the other signal processing apparatuses,
wherein said step of second communication is performed while restricting communication parties with coding division.

26. A signal processing method according to claim 23, further comprising performing a second communication while restricting communication parties among the other signal processing apparatuses,
wherein said step of second communication is performed while restricting communication parties by adjustment of the polarization of said electromagnetic waves.

27. A recording medium storing a program for controlling a signal processing apparatus disposed within a shielded housing including a communication unit configured to perform communication with other signal processing apparatuses disposed within the shielded housing and a signal processing unit for performing signal processing based on the signal received at said communication unit, the method comprising:
performing a first communication with all of the other signal processing apparatuses at the same time in a broadcast mode on a single frequency.

28. A signal processing apparatus comprising:
three or more signal processing means, each of which include
means for performing communication with the other signal processing means, and
means for performing signal processing based on the signal received at said communication section,
wherein at least one of said three or more signal processing means performs first communication with all of the other signal processing means at the same time in a broadcast mode on a single frequency.

* * * * *